(12) United States Patent
Shaw et al.

(10) Patent No.: US 11,409,414 B2
(45) Date of Patent: Aug. 9, 2022

(54) DEVICE, METHOD, AND GRAPHICAL USER INTERFACE FOR SHARING CONTENT FROM A RESPECTIVE APPLICATION

(71) Applicant: Apple Inc., Cupertino, CA (US)

(72) Inventors: Jeremiah D. Shaw, San Jose, CA (US); Chanaka G. Karunamuni, San Jose, CA (US); Stephen O. Lemay, San Francisco, CA (US); Martin O. Pedrick, San Francisco, CA (US); Marcel van Os, San Francisco, CA (US); Imran Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 368 days.

(21) Appl. No.: 16/181,205

(22) Filed: Nov. 5, 2018

(65) Prior Publication Data

US 2019/0073102 A1 Mar. 7, 2019

Related U.S. Application Data

(63) Continuation of application No. 14/290,973, filed on May 29, 2014, now Pat. No. 10,120,541.

(Continued)

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS

| | | | |
|---|---|---|---|
| 7,254,786 B2 | 8/2007 | Henriquez | |
| 7,685,530 B2 * | 3/2010 | Sherrard | H04M 15/8066 715/764 |

(Continued)

FOREIGN PATENT DOCUMENTS

| | | |
|---|---|---|
| CN | 101102211 A | 1/2008 |
| CN | 101170745 A | 4/2008 |

(Continued)

OTHER PUBLICATIONS

Rakesh, "WiFi Direct is Better Than Bluetooth for Sharing Files Between Android Devices," http://www.droidviews.com/wifi-direct-is-better-than-bluetooth-for-exchanging-files-between-android-devices, Mar. 7, 2013, 12 pages.

(Continued)

*Primary Examiner* — Justin S Lee
(74) *Attorney, Agent, or Firm* — Morgan, Lewis & Bockius LLP

(57) ABSTRACT

A device with a display and, optionally, a touch-sensitive surface detects a first input corresponding to a request to share first content from a first application while displaying the first application on the display. In response to detecting the first input, the device displays a sharing interface that includes a plurality of options for sharing the first content. While displaying the sharing interface, the device detects selection of an affordance in the sharing interface. In accordance with a determination that the affordance is a respective user-first sharing option for a respective user, the device initiates a process for sharing the first content with the respective user. In accordance with a determination that the affordance is a protocol-first sharing option for a respective (Continued)

protocol, the device initiates a process for sharing the first content using the respective protocol.

33 Claims, 47 Drawing Sheets

Related U.S. Application Data

(60) Provisional application No. 61/832,939, filed on Jun. 9, 2013.

(51) Int. Cl.
  *G06F 3/04817* (2022.01)
  *G06F 3/0488* (2022.01)
  *H04L 67/06* (2022.01)

(52) U.S. Cl.
  CPC .......... *G06F 3/04817* (2013.01); *H04L 67/06* (2013.01); *G06F 2203/04808* (2013.01)

(56) References Cited

U.S. PATENT DOCUMENTS

| | | | |
|---|---|---|---|
| 7,783,980 B1* | 8/2010 | Herold | G06F 3/0482 715/740 |
| 8,291,349 B1 | 10/2012 | Park et al. | |
| 8,417,225 B2 | 4/2013 | Mock et al. | |
| 8,634,861 B2* | 1/2014 | Repka | H04M 3/4931 455/466 |
| 9,055,404 B2* | 6/2015 | Setlur | G06F 3/017 |
| 9,507,512 B1* | 11/2016 | Turner | G06F 3/0488 |
| 2005/0165920 A1* | 7/2005 | Kerr | G06Q 10/10 709/223 |
| 2005/0289470 A1* | 12/2005 | Pabla | G06F 21/41 715/751 |
| 2006/0020904 A1* | 1/2006 | Aaltonen | G06F 3/0481 715/850 |
| 2006/0135142 A1 | 6/2006 | Repka | |
| 2006/0146765 A1* | 7/2006 | Van De Sluis | H04L 67/34 370/338 |
| 2006/0224989 A1* | 10/2006 | Pettiross | G06F 3/0481 715/779 |
| 2007/0035513 A1 | 2/2007 | Sherrard et al. | |
| 2007/0118809 A1* | 5/2007 | Ozugur | H04L 67/24 715/776 |
| 2007/0150444 A1* | 6/2007 | Chesnais | H04L 67/18 |
| 2007/0157094 A1 | 7/2007 | Lemay et al. | |
| 2008/0079539 A1* | 4/2008 | Daley | H04L 67/18 340/7.29 |
| 2008/0125180 A1* | 5/2008 | Hoffman | H04M 1/72583 455/566 |
| 2008/0165210 A1 | 7/2008 | Platzer et al. | |
| 2008/0219427 A1* | 9/2008 | Naono | H04L 65/1059 379/218.01 |
| 2009/0007014 A1 | 1/2009 | Coomer et al. | |
| 2009/0049049 A1* | 2/2009 | Cheah | G06Q 30/02 |
| 2009/0300649 A1 | 12/2009 | Gopal et al. | |
| 2010/0122195 A1* | 5/2010 | Hwang | G06F 3/0488 715/769 |
| 2011/0083111 A1* | 4/2011 | Forutanpour | G06F 3/017 715/863 |
| 2011/0117898 A1* | 5/2011 | Pereira | H04L 51/066 455/414.4 |
| 2011/0163969 A1 | 7/2011 | Anzures et al. | |
| 2011/0202834 A1 | 8/2011 | Mandryk et al. | |
| 2012/0089698 A1* | 4/2012 | Tseng | G06Q 10/101 709/217 |
| 2012/0210253 A1* | 8/2012 | Luna | H04L 51/04 715/753 |
| 2012/0216143 A1* | 8/2012 | Shiplacoff | G06F 3/0416 715/784 |
| 2012/0225652 A1* | 9/2012 | Martinez | H04L 67/24 455/435.1 |
| 2012/0240041 A1 | 9/2012 | Lim et al. | |
| 2012/0246228 A1* | 9/2012 | Udezue | H04L 51/02 709/204 |
| 2012/0284638 A1* | 11/2012 | Cutler | G06Q 10/00 715/751 |
| 2013/0036382 A1 | 2/2013 | Yuan et al. | |
| 2013/0047123 A1 | 2/2013 | May et al. | |
| 2013/0054826 A1* | 2/2013 | Hong | H04W 4/14 709/231 |
| 2013/0067404 A1* | 3/2013 | Morrow | G06F 3/167 715/810 |
| 2013/0117365 A1* | 5/2013 | Padmanabhan | H04W 4/21 709/204 |
| 2013/0120295 A1* | 5/2013 | Kim | G06F 3/0482 345/173 |
| 2013/0125020 A1 | 5/2013 | Lee et al. | |
| 2013/0185368 A1* | 7/2013 | Nordstrom | H04W 4/023 709/206 |
| 2013/0187861 A1* | 7/2013 | Lavallee | G06F 9/543 345/173 |
| 2013/0212470 A1 | 8/2013 | Karunamuni et al. | |
| 2013/0219342 A1* | 8/2013 | Nosou | G06Q 10/107 715/835 |
| 2013/0246345 A1* | 9/2013 | Eisler | G06F 16/93 707/608 |
| 2013/0268331 A1 | 10/2013 | Bitz et al. | |
| 2013/0275883 A1* | 10/2013 | Bharshankar | H04L 67/1095 715/753 |
| 2013/0303190 A1* | 11/2013 | Khan | H04W 64/00 455/456.2 |
| 2013/0332297 A1* | 12/2013 | Forutanpour | G01C 21/3461 705/26.1 |
| 2014/0030980 A1* | 1/2014 | D'Ambrosio | H04W 76/40 455/41.3 |
| 2014/0362056 A1 | 12/2014 | Zambetti et al. | |
| 2014/0365882 A1 | 12/2014 | Lemay | |
| 2014/0365912 A1 | 12/2014 | Shaw et al. | |
| 2014/0365919 A1 | 12/2014 | Shaw et al. | |
| 2014/0365953 A1 | 12/2014 | Zambetti et al. | |
| 2015/0081783 A1* | 3/2015 | Gong | H04L 65/60 709/204 |
| 2016/0103668 A1* | 4/2016 | Srinivasan | G06F 3/04817 717/178 |
| 2016/0334967 A1* | 11/2016 | Rottier | H04L 67/10 |

FOREIGN PATENT DOCUMENTS

| | | |
|---|---|---|
| CN | 101884036 A | 11/2010 |
| CN | 102487382 A | 6/2012 |
| CN | 102567108 A | 7/2012 |
| CN | 102687485 A | 9/2012 |
| CN | 103023965 A | 4/2013 |
| CN | 103139369 A | 6/2013 |
| GB | 2 237 486 A | 5/1991 |
| JP | 2014-532208 | 12/2014 |
| WO | WO 2011/100623 A2 | 8/2011 |
| WO | WO 2013/039528 | 3/2013 |

OTHER PUBLICATIONS

Wallen, "Five Useful Tips for Your Samsung Galaxy S III," TechRepublic, http:www.techrepublic.com/blog.smartphones/five-useful-tips-for-your-Samsung-Galaxy-S-III, Nov. 1, 2012, 12 pages.
Office Action, dated Mar. 24, 2016, received in U.S. Appl. No. 14/290,973, 18 pages.
Final Office Action, dated Jan. 27, 2017, received in U.S. Appl. No. 14/290,973, 17 pages.
Office Action, dated Jun. 30, 2017, received in U.S. Appl. No. 14/290,973, 25 pages.
Final Office Action, dated Feb. 13, 2018, received in U.S. Appl. No. 14/290,973, 24 pages.
Notice of Allowance, dated Jun. 25, 2018, received in U.S. Appl. No. 14/290,973, 14 pages.
Office Action, dated Sep. 2, 2016, received in Australian Patent Application No. 2014278594, which corresponds with U.S. Appl. No. 14/290,973, 2 pages.

(56) References Cited

OTHER PUBLICATIONS

Certificate of Grant, dated Sep. 14, 2017, received in Australian Patent Application No. 2014278594, which corresponds with U.S. Appl. No. 14/290,973, 4 pages.
Office Action, dated Jun. 12, 2018, received in Chinese Patent Application No. 201480032760.9, which corresponds with U.S. Appl. No. 14/290,973, 5 pages.
Notice of Allowance, dated Mar. 21, 2017, received in Japanese Patent Application No. 2016-518361, which corresponds with U.S. Appl. No. 14/290,973, 5 pages.
Patent, Apr. 14, 2017, received in Japanese Patent Application No. 2016-518361, which corresponds with U.S. Appl. No. 14/290,973, 3 pages.
Office Action, dated Feb. 20, 2018, received in Japanese Patent Application No. 12017-076173, which corresponds with U.S. Appl. No. 14/290,973, 8 pages.
Office Action, dated May 19, 2017, received in Korean Patent Application No. 2015-7036974, which corresponds with U.S. Appl. No. 14/290,973, 4 pages.
Notice of Allowance, dated Nov. 30, 2017, received in Korean Patent Application No. 2015-7036974, which corresponds with U.S. Appl. No. 14/290,973, 4 pages.
Patent, dated Feb. 19, 2018, received in Korean Patent Application No. 2015-7036974, which corresponds with U.S. Appl. No. 14/290,973, 3 pages.
Decision to Grant, dated Jul. 29, 2015, received in Dutch Patent Application No. 2012929, which corresponds with U.S. Appl. No. 14/290,973, 4 pages.
Decision to Grant, dated Jul. 29, 2015. received in Dutch Patent Application No. 2012928, which corresponds with U.S. Appl. No. 14/290,973, 4 pages.
Office Action, dated Mar. 10, 2016, received in U.S. Appl. No. 14/290,960, 10 pages.
Final Office Action, dated Jul. 26, 2016, received in U.S. Appl. No. 14/290,960, 15 pages.
Notice of Allowance, dated Mar. 10, 2017, received in U.S. Appl. No. 14/290.960, 8 pages.
Dutch Search Report, dated May 12, 2015, received in Dutch Patent Application No. 2012929, which corresponds with U.S. Appl. No. 14/290,973, 13 pages.
Dutch Search Report, dated May 12, 2015, received in Dutch Patent Application No. 2012928, which corresponds with U.S. Appl. No. 14/290,973, 11 pages.
International Search Report and Written Opinion, dated Nov. 27, 2014, received in International Patent Application No. PCT/US2014/040398, which corresponds with U.S. Appl. No. 14/290,973, 15 pages.
International Preliminary Report of Patentability, dated Dec. 15, 2015, received in International Patent Application No. PCT/US2014/040398, which corresponds with U.S. Appl. No. 14/290,973, 11 pages.
Office Action, dated Jan. 28, 2019, received in Chinese Patent Application No. 201480032760.9, which corresponds with U.S. Appl. No. 14/290,973, 4 pages.
Patent, dated Nov. 16, 2018, received in Japanese Patent Application No. 2017-076173, which corresponds with U.S. Appl. No. 14/290,973, 3 pages.
Office Action, dated Dec. 14, 2018, received in European Patent Application No. 14735751.1, which corresponds with U.S. Appl. No. 14/290,973, 5 pages.
Notice of Allowance, dated Oct. 12, 2018, received in Japanese Patent Application No. 2017-076173, which corresponds with U.S. Appl. No. 14/290,973, 5 pages.
Notice of Allowance, dated May 14, 2019, received in Chinese Application No. 201480032760.9, which corresponds with U.S. Appl. No. 14/290,973, 3 pages.
Patent, dated Jul. 12, 2019, received in Chinese Patent Application No. 201480032760.9, which corresponds with U.S. Appl. No. 14/290,973, 6 pages.
Oral Summons, dated Jan. 16, 2020, received in European Patent Application No. 14735751.1, which corresponds with U.S. Appl. No. 14/290,973, 9 pages.
Notice of Allowance, dated Jan. 17, 2020, received in Japanese Patent Application No. 2018-212428, which corresponds with U.S. Appl. No. 16/181,939, 5 pages.
Patent, dated Feb. 14, 2020, Japanese Patent Application No. 2018-212428, which corresponds with U.S. Appl. No. 16/181,939, 4 pages.
U.S. Appl. No. 14/290,973, filed May 29, 2014. This application issued as U.S. Pat. No. 10,120,541.
U.S. Appl. No. 14/290,960, filed May 29, 2014. This application issued as U.S. Pat. No. 9,712,577.
Office Action, dated Jan. 29, 2022, received in Chinese Patent Application No. 201910623992.6, which corresponds with U.S. Appl. No. 14/290,973, 5 pages.
Office Action, dated Mar. 30, 2022, received in Chinese Patent Application No. 201910624937.9, which corresponds with U.S. Appl. No. 16/181,205, 5 pages.
Decision to Grant, dated Jan. 21, 2021, received in European Patent Application No. 14735751.1, which corresponds with U.S. Appl. No. 14/290,973, 2 pages.
Patent, dated Apr. 15, 2021, received in European Patent Application No. 14735751.1, which corresponds with U.S. Appl. No. 14/290,973, 4 pages.
Extended European Search Report, dated May 3, 2021, received in European Patent Application No. 21153116.5, which corresponds with U.S. Appl. No. 14/290,960, 11 pages.

* cited by examiner

612 — In response to detecting the first input, display a sharing interface that includes a plurality of options for sharing the first content, where the sharing interface includes:
A first predefined region for displaying one or more user-first sharing options for sharing content directly with other users; and A second predefined region separate from the first predefined region for displaying protocol-first sharing options for sharing content using a user-selected protocol of a plurality of protocols (A)

616 — The first predefined region includes a first row of icons that represent different users with whom content can be shared directly; and The second predefined region includes a second row of icons that represent different protocols that can be used to share the content.

618 — Display, in the first predefined region at an edge of the first predefined region, a portion of an icon that represents a respective user without displaying the entire icon 620 — The icons in the first row of icons have an appearance that is different from the icons in the second row of icons 622 — A first subset of the icons in the first row of icons each include a picture of a user that corresponds to the icon in the first subset of icons; and A second subset of the icons in the first row of icons each include initials of a name of a user that corresponds to the icon in the second subset of icons 624 — The sharing interface includes a third predefined region separate from the first predefined region and the second predefined region for displaying application-related options for performing non-sharing operations that are available in the application from which the sharing interface was opened 626 — The sharing user interface is a standardized user interface that includes common portions that are displayed in a plurality of different applications in response to a request from a user to share content from a respective application in the plurality of different applications.

(B)

Figure 6B

DEVICE, METHOD, AND GRAPHICAL USER INTERFACE FOR SHARING CONTENT FROM A RESPECTIVE APPLICATION

RELATED APPLICATIONS

This application is a continuation of U.S. patent application Ser. No. 14/290,973, filed May 29, 2014, which claims priority to U.S. Provisional Patent Application No. 61/832,939, filed Jun. 9, 2013, both of which are incorporated by reference herein in their entireties.

TECHNICAL FIELD

This relates generally to electronic devices with touch-sensitive surfaces, including but not limited to electronic devices with touch-sensitive surfaces that share content from a respective application.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display and navigate through menus and various other interfaces to share content.

But methods for sharing content are cumbersome and inefficient. In addition, these methods take longer than necessary, thereby wasting energy. This latter consideration is particularly important in battery-operated devices.

SUMMARY

Accordingly, there is a need for electronic devices with faster, more efficient methods and interfaces for sharing content from a respective application. Such methods and interfaces optionally complement or replace conventional methods for sharing content from a respective application. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices, which enable a user to send and receive content to other users by performing fewer steps in simpler user interfaces. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display and, optionally, a touch-sensitive surface. The method includes, while displaying a first application on the display, detecting a first input that corresponds to a request to share first content from the first application. The method further includes, in response to detecting the first input, displaying a sharing interface that includes a plurality of options for sharing the first content, where the sharing interface includes: a first predefined region for displaying one or more user-first sharing options for sharing content directly with other users; and a second predefined region separate from the first predefined region for displaying protocol-first sharing options for sharing content using a user-selected protocol of a plurality of protocols. The method also includes, while displaying the sharing interface, detecting selection of an affordance in the sharing interface. The method includes, in accordance with a determination that the affordance is a respective user-first sharing option for a respective user, initiating a process for sharing the first content with the respective user; and in accordance with a determination that the affordance is a protocol-first sharing option for a respective protocol, initiating a process for sharing the first content using the respective protocol.

In accordance with some embodiments, an electronic device includes a display unit configured to display a user interface for a first application an, optionally, a touch-sensitive surface unit configured to receive one or more touch inputs. The electronic device also includes a processing unit coupled to the display unit (and, optionally, coupled to the touch-sensitive surface unit). The processing unit is configured to, while displaying the first application on the display unit, detect a first input that corresponds to a request to share first content from the first application. The processing unit is configured to, in response to detecting the first input, enable display of a sharing interface that includes a plurality of options for sharing the first content, where the sharing interface includes: a first predefined region for displaying one or more user-first sharing options for sharing content directly with other users; and a second predefined region separate from the first predefined region for displaying protocol-first sharing options for sharing content using a user-selected protocol of a plurality of protocols. The processing unit is configured to, while displaying the sharing interface, detect selection of an affordance in the sharing interface. The processing unit is configured to, in accordance with a determination that the affordance is a respective user-first sharing option for a respective user, initiate a process for sharing the first content with the respective user; and in accordance with a determination that the affordance is a protocol-first sharing option for a respective protocol, initiate a process for sharing the first content using the respective protocol.

In accordance with some embodiments, a method is performed at an electronic device with a display and, optionally, a touch-sensitive surface. The method includes, while displaying a user interface for a first application on the display, receiving a sharing request to share respective content with the electronic device that was initiated by another device, where the respective content is not compatible with the first application. The method further includes, in response to receiving the sharing request, displaying a sharing confirmation dialog that includes a plurality of options for responding to the sharing request. The method also includes detecting activation of a respective option of the plurality of options for responding to the sharing request. The method further includes, in accordance with a determination that the respective option is an option to accept the sharing request, identifying one or more applications that are compatible with the respective content and performing a preparatory operation that prepares the device to display the respective content on the display using an application that is compatible with the respective content and in accordance with a determination that the respective option is an option to deny the sharing request canceling sharing of the respective content with the electronic device and returning to the user interface for the first application.

In accordance with some embodiments, an electronic device includes a display unit configured to display a user interface for a first application an, optionally, a touch-sensitive surface unit configured to receive one or more touch inputs. The electronic device also includes a processing unit coupled to the display unit (and, optionally, coupled to the touch-sensitive surface unit). The processing unit is configured to, while displaying the user interface for the first application on the display unit, receive a sharing request to share respective content with the electronic device that was initiated by another device, where the respective content is not compatible with the first application. The processing unit is configured to, in response to receiving the sharing request: enable display of a sharing confirmation dialog that includes a plurality of options for responding to the sharing request; and detect activation of a respective option of the plurality of options for responding to the sharing request. The processing unit is configured to, in accordance with a determination that the respective option is an option to accept the sharing request, the processing unit is configured to identify one or more applications that are compatible with the respective content and perform a preparatory operation that prepares the electronic device to display the respective content on the display using an application that is compatible with the respective content and in accordance with a determination that the respective option is an option to deny the sharing request, cancel sharing of the respective content with the electronic device and return to the user interface for the first application.

In accordance with some embodiments, an electronic device includes a display, one or more processors, memory, and one or more programs; the one or more programs are stored in the memory and configured to be executed by the one or more processors and the one or more programs include instructions for performing the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred described herein. In accordance with some embodiments, an electronic device includes: a display, a touch-sensitive surface, and optionally one or more sensors to detect intensity of contacts with the touch-sensitive surface; and means for performing the operations of any of the methods described herein. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods described herein.

Thus, electronic devices with displays, touch-sensitive surfaces are provided with faster, more efficient methods and interfaces for sharing content from a respective application, thereby increasing the effectiveness, efficiency, and user satisfaction with such devices. Such methods and interfaces may complement or replace conventional methods for sharing content from a respective application.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6E are flow diagrams illustrating a method of sharing content from a respective application in accordance with some embodiments.

DESCRIPTION OF EMBODIMENTS

Many electronic devices have graphical user interfaces with the ability to send content to a third party. The devices described below improve on these methods. While displaying an application, the device responds to a request to share content from the application by displaying a sharing interface with a plurality of options for sharing the content. The sharing interface includes a first region with user-first sharing options (e.g., a row or column of selectable affordance or icons associated with nearby available users) and a second region with protocol-first sharing options (e.g., a row or column of selectable affordance or icons associated with applications for sharing the content). While displaying the sharing interface, the device detects selection of an affordance in the sharing interface. In accordance with a determination that the affordance is a respective user-first sharing option for a respective user, the device initiates a process for sharing the content with the respective user. In accordance with a determination that the affordance is a protocol-first sharing option for a respective protocol, the device initiates a process for sharing the content using the respective protocol. These user interfaces provide a simple and intuitive way to share content between two devices by eliminating extraneous user interface navigation operations, sharing configuration operations and other operations that are confusing and/or time consuming for a user. The simpler and more intuitive sharing of content improves the user experience, reduces operation time and improves battery life for batter powered devices.

Figure 7A:
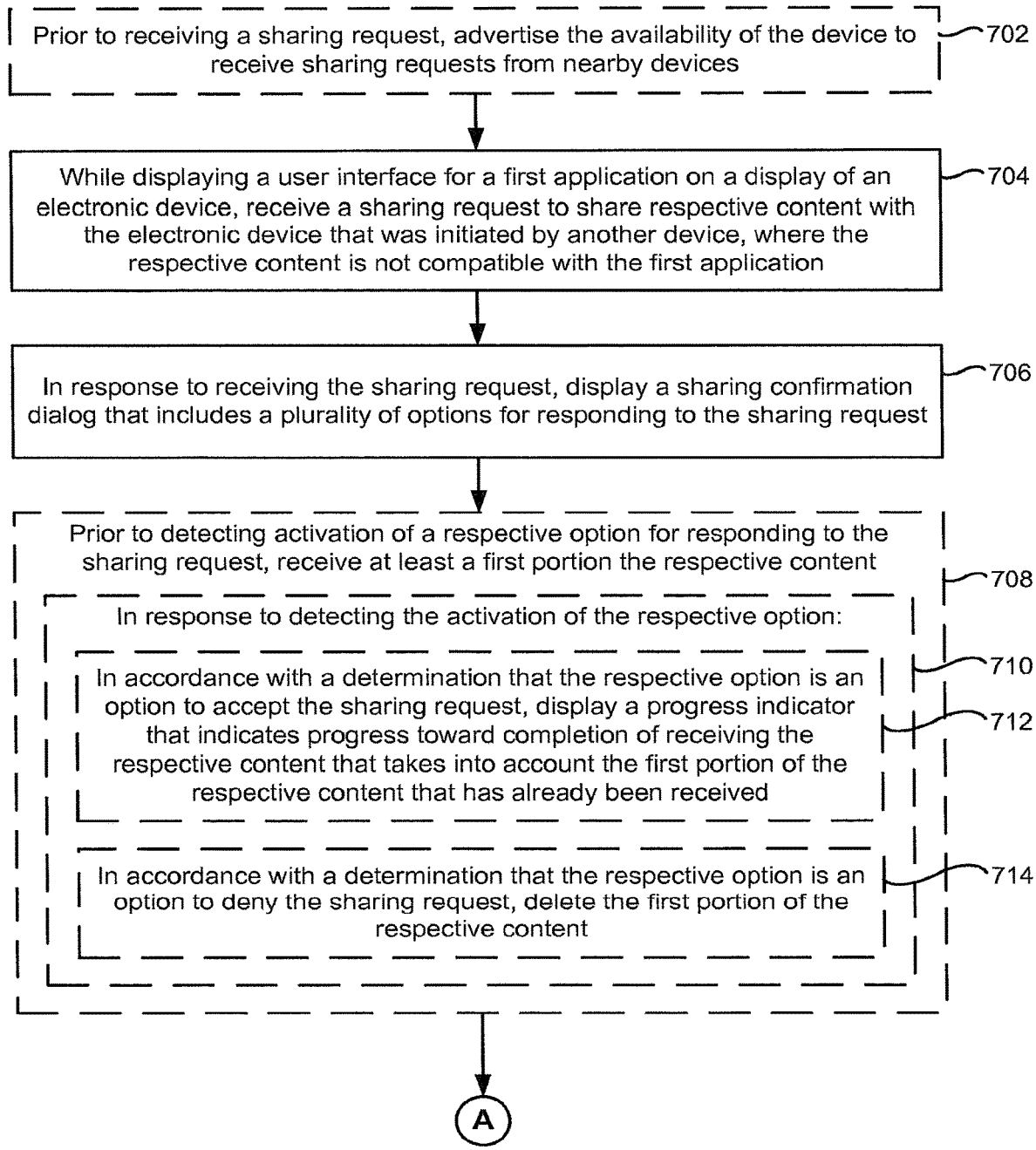
FIGS. 7A-7C are flow diagrams illustrating a method of receiving shared content from a respective application in accordance with some embodiments.
Figure 7B:
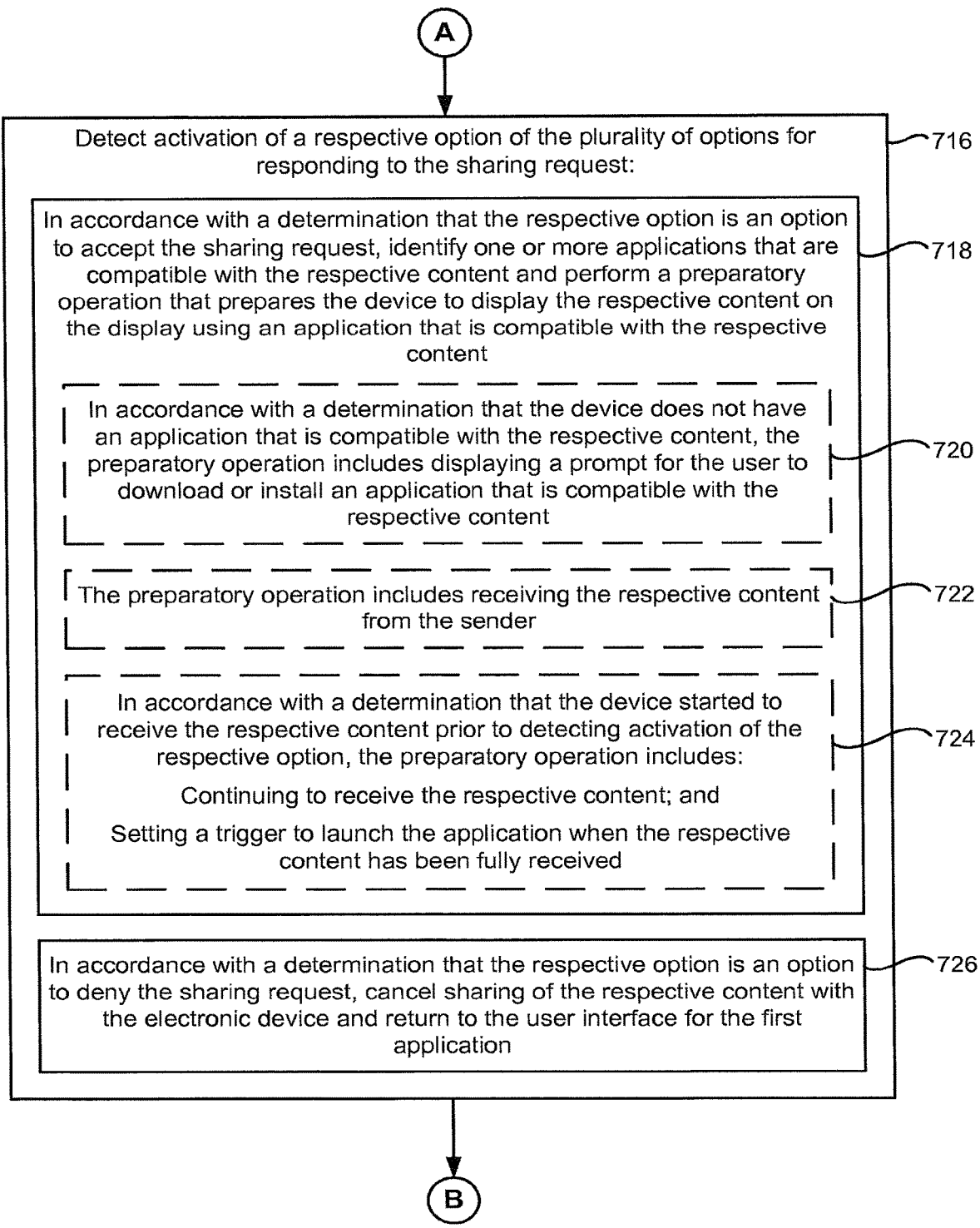
Figure 7C:
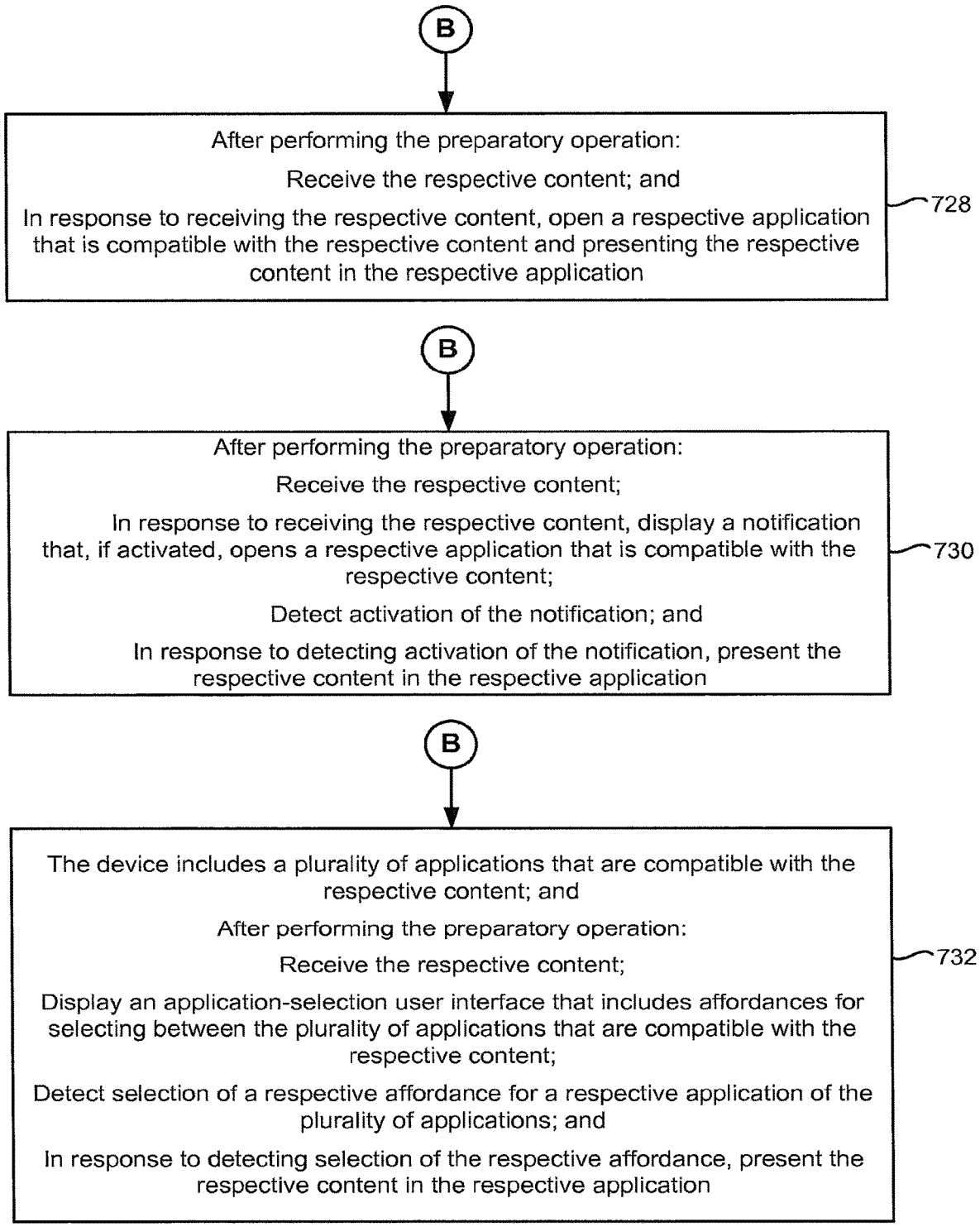

Below, FIGS. 1A-1B, 2, and 3 provide a description of exemplary devices. FIGS. 4A-4B and 5A-5EE illustrate exemplary user interfaces for sharing and receiving content from a respective application. FIGS. 6A-6E are flow diagrams illustrating a method of sharing content from a respective application. FIGS. 7A-7C are flow diagrams illustrating a method of receiving shared content from a respective application. The user interfaces in FIGS. 5A-5P are used to illustrate the processes in FIGS. 6A-6E, and the user interface illustrated in FIG. 5Q-5EE are used to illustrate the processes in FIGS. 7A-7C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or 'upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone@, iPod Touch@, and iPad@ devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
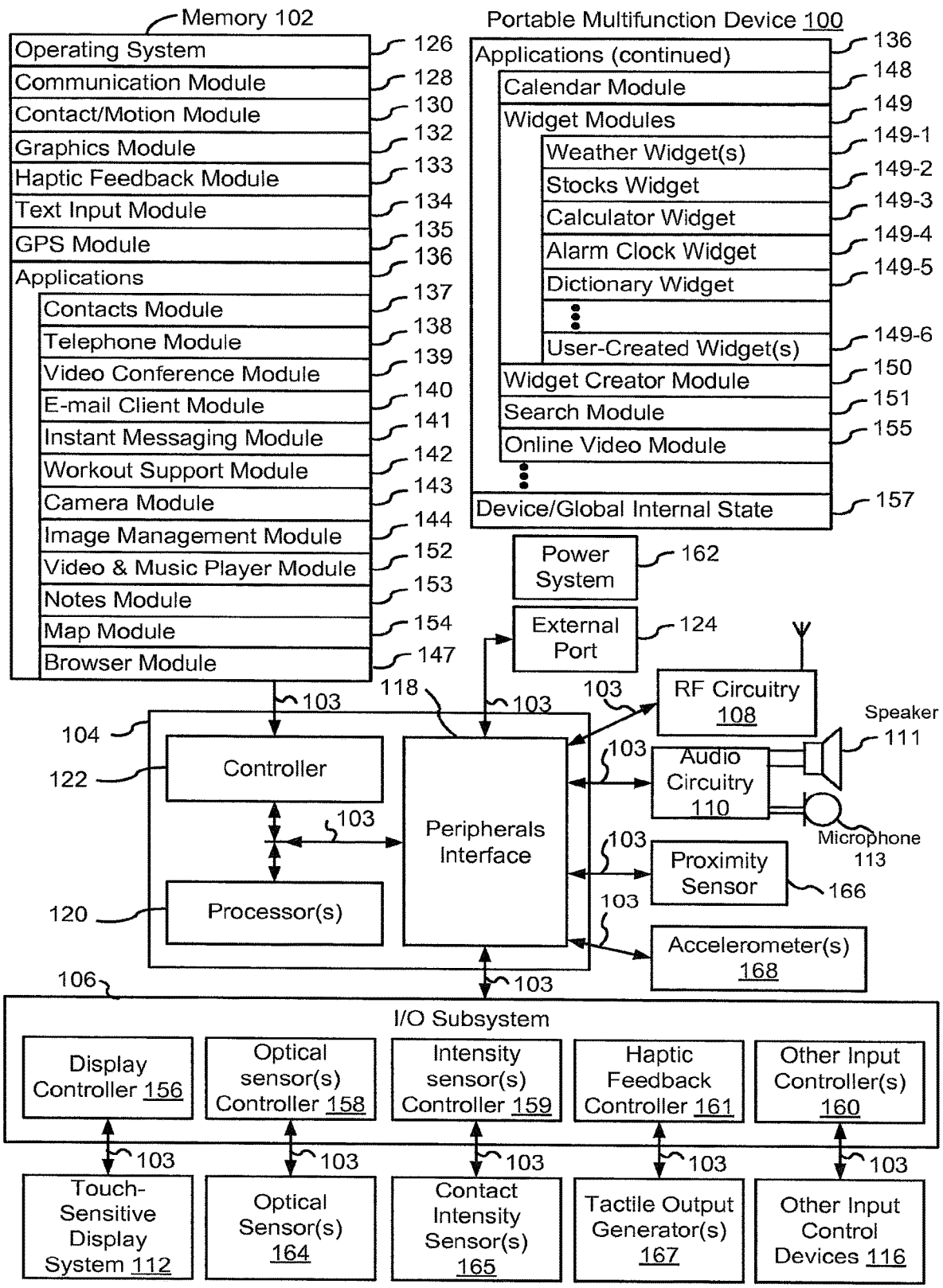
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
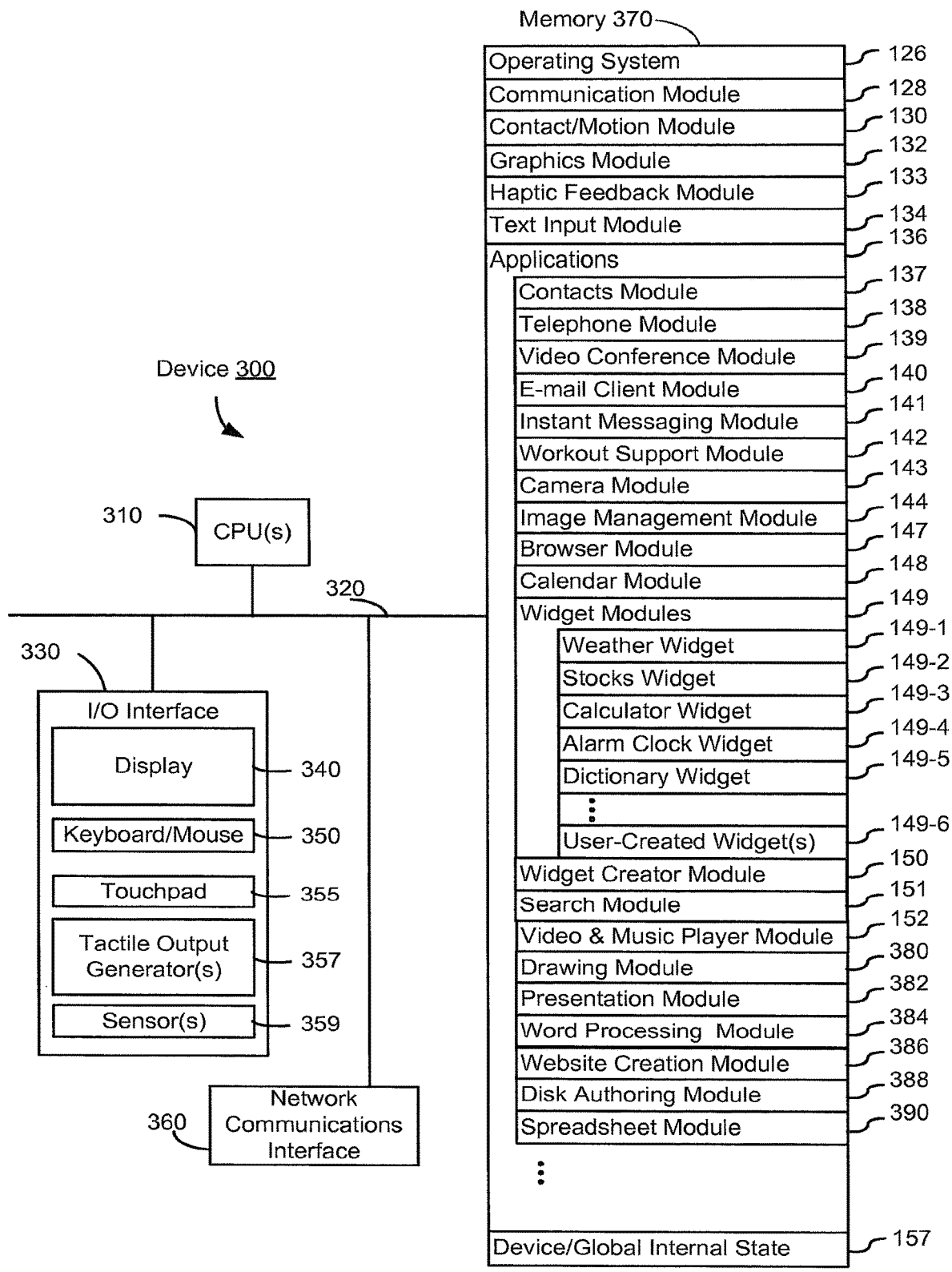
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices. In some embodiments, the external port is a multi-pin (e.g., 8-pin) connector that is the same as, or similar to and/or compatible with the 8-pin connector (e.g., Lightning connector) used on iPhone and iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker Ill, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (e.g., using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker Ill, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
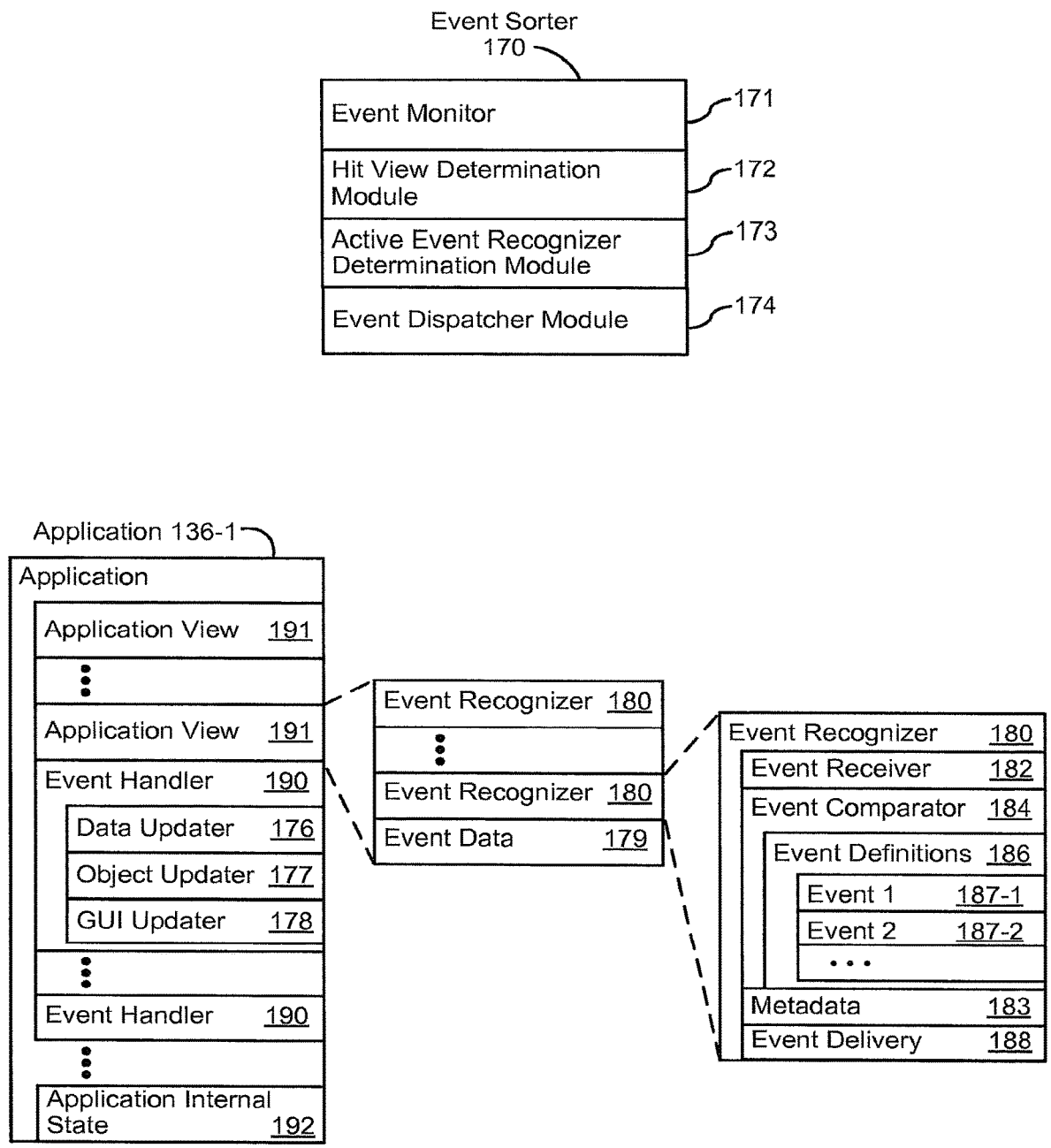
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
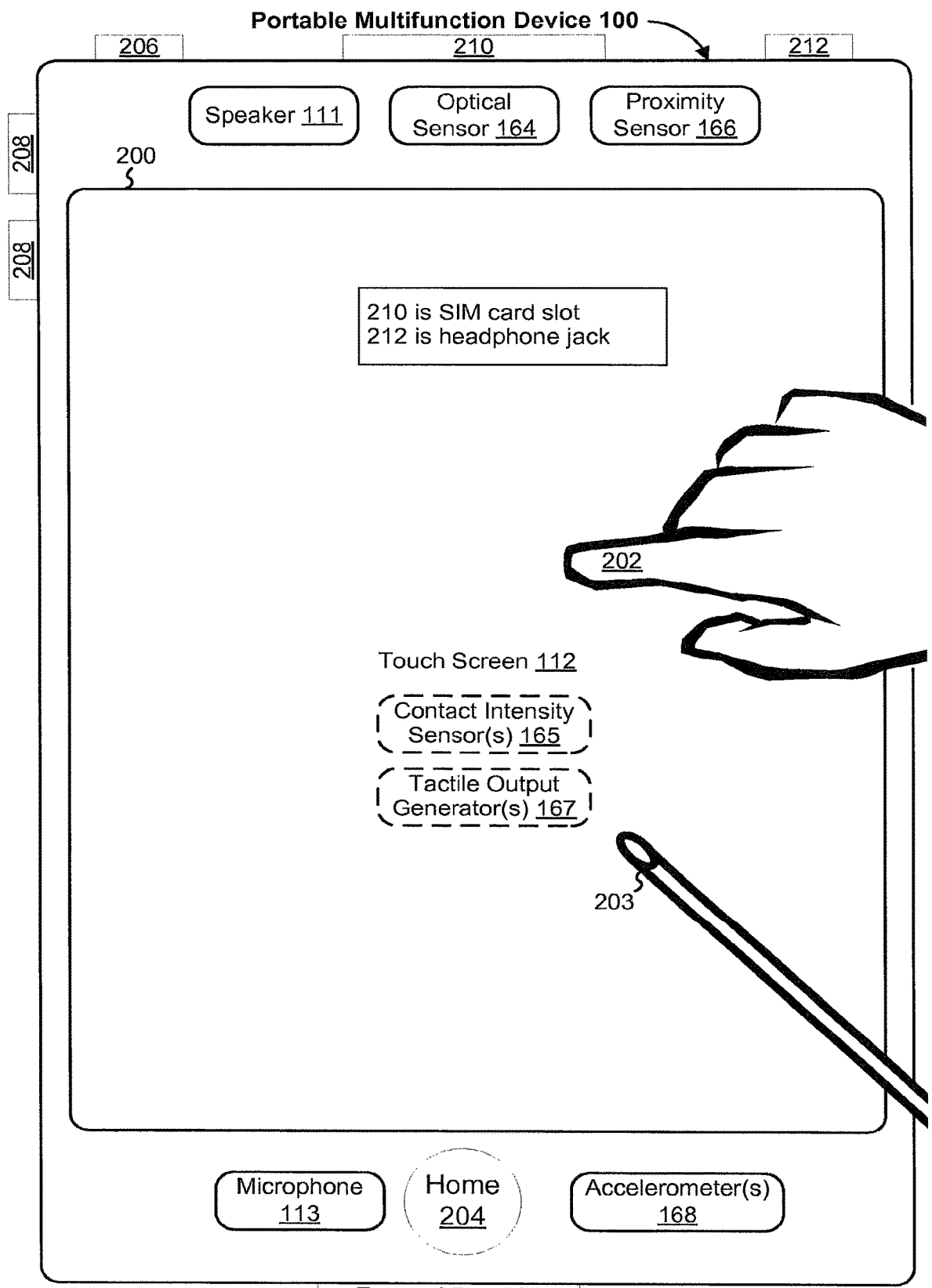
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
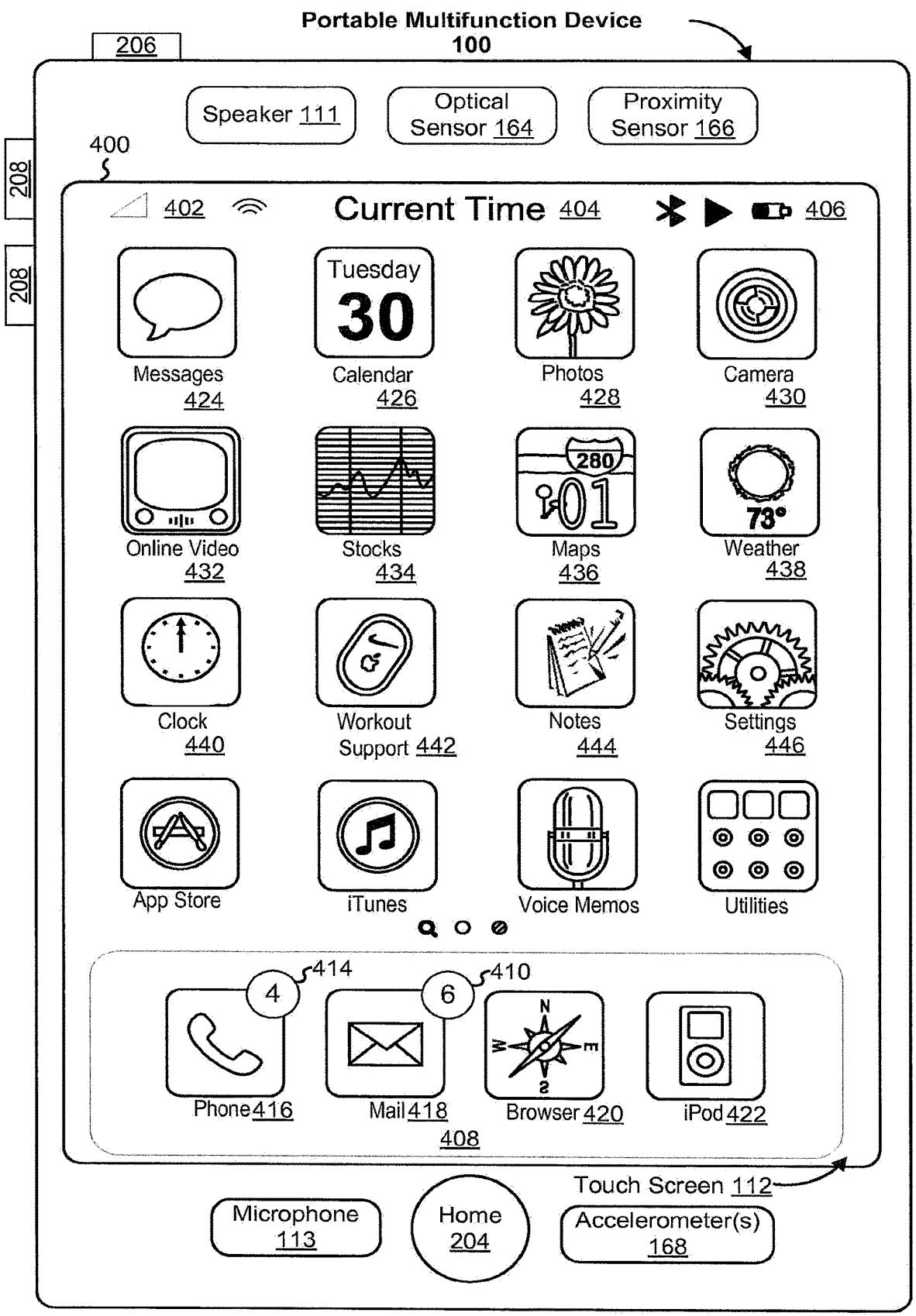
FIG. 4A illustrates an exemplary user interface for a menu of applications on a portable multifunction device in accordance with some embodiments.
Figure 5A:
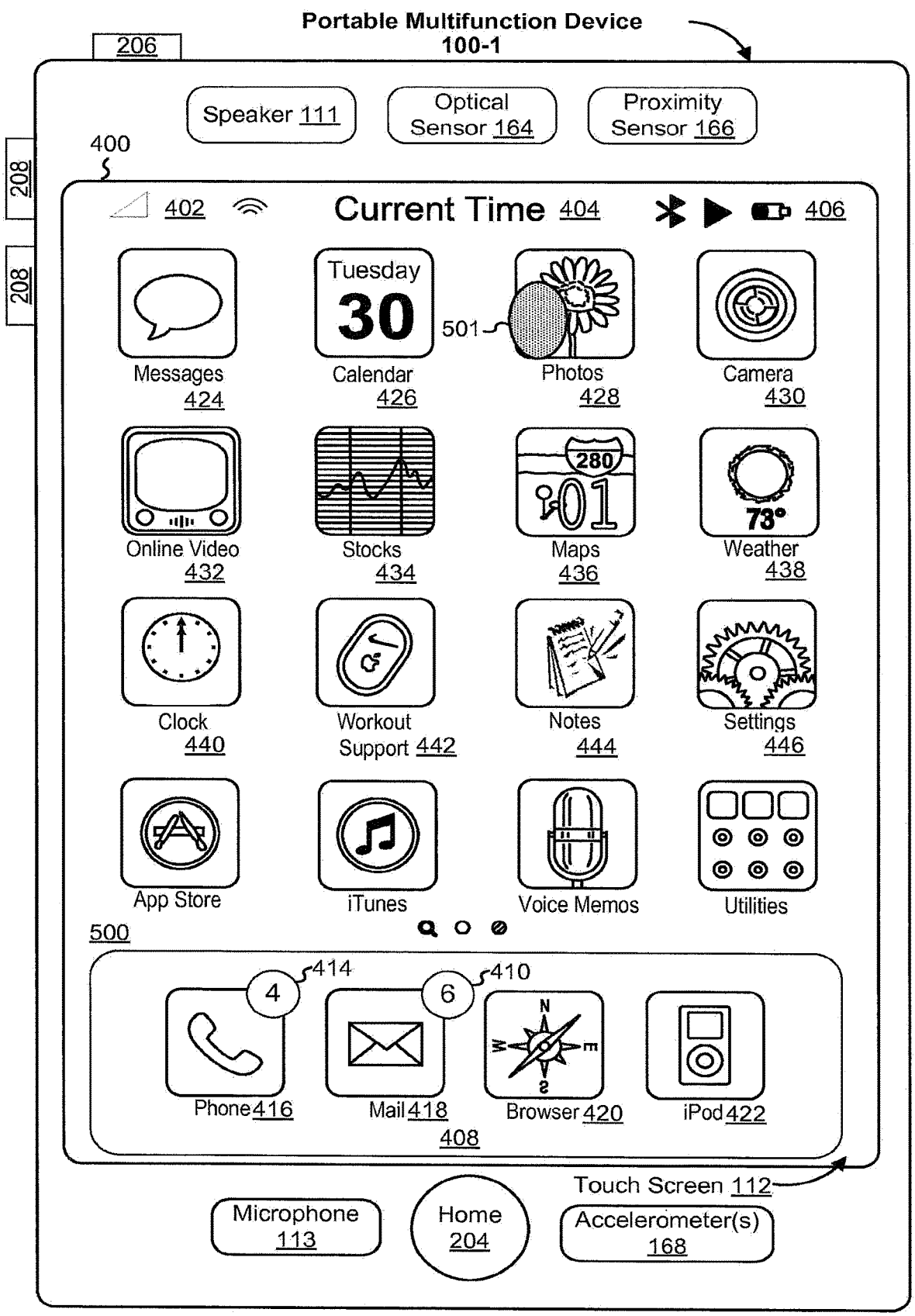
FIGS. 5A-5P illustrate exemplary user interfaces for sharing content from a respective application in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 (or 475) includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser"; and
    Icon 422 for video and music player module 152, also referred to as iPod (trademark of Apple Inc.) module 152, labeled "iPod."
Icons for other applications, such as:
    Icon 424 for IM module 141, labeled "Text";
    Icon 426 for calendar module 148, labeled "Calendar";
    Icon 428 for image management module 144, labeled "Photos";
    Icon 430 for camera module 143, labeled "Camera";
    Icon 432 for online video module 155, labeled "Online Video";
    Icon 434 for stocks widget 149-2, labeled "Stocks";
    Icon 436 for map module 154, labeled "Map";
    Icon 438 for weather widget 149-1, labeled "Weather";
    Icon 440 for alarm clock widget 149-4, labeled "Clock";
    Icon 442 for workout support module 142, labeled "Workout Support";
    Icon 444 for notes module 153, labeled "Notes"; and
    Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
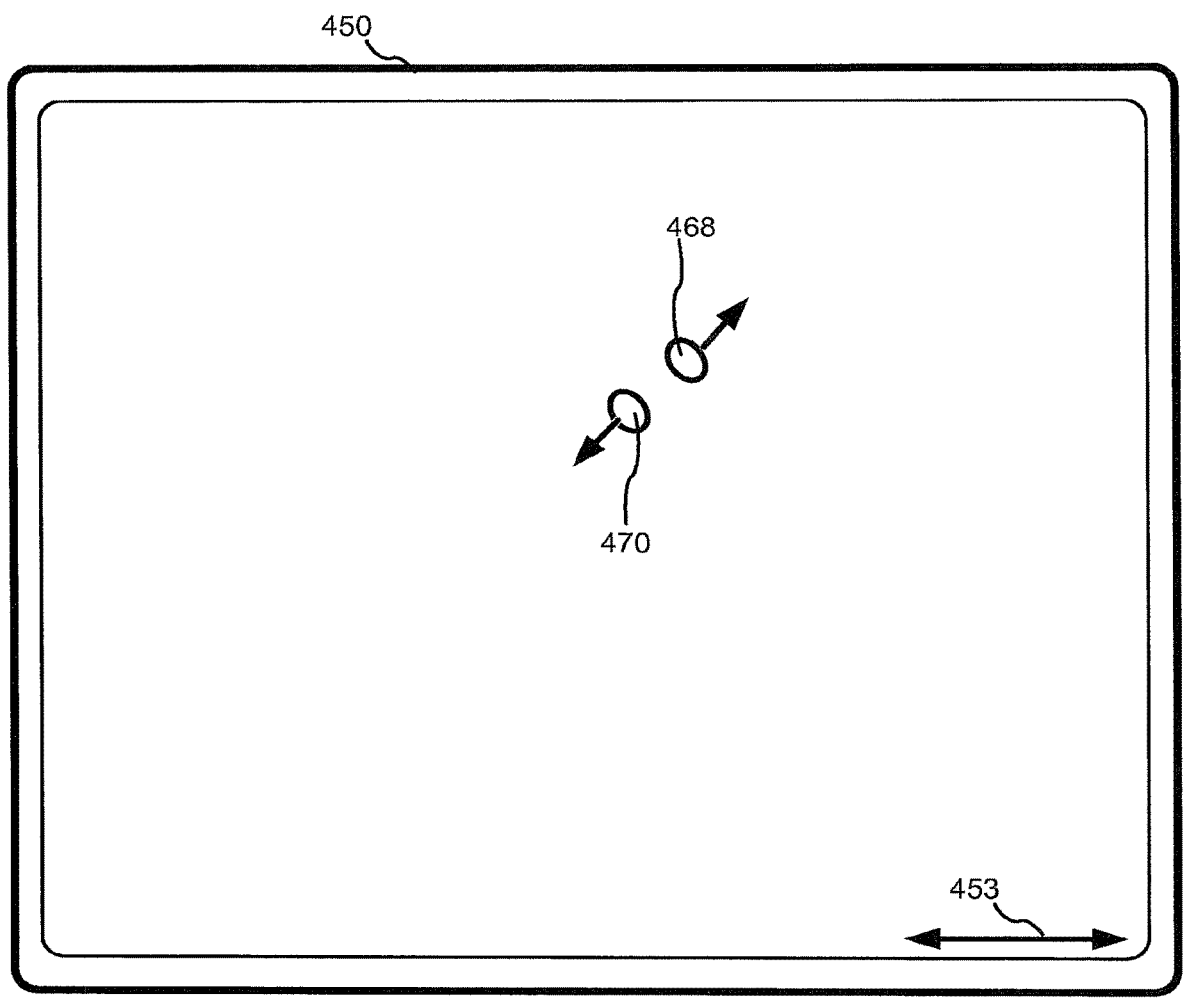
FIG. 4B illustrates an exemplary user interface for a multifunction device with a touch-sensitive surface that is separate from the display in accordance with some embodiments.
Figure 4B:
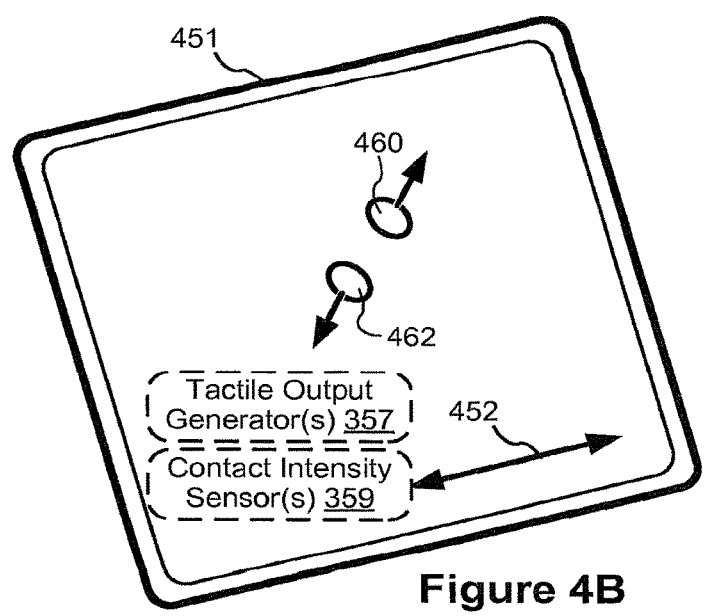

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that are, optionally, implemented on an electronic device with a display and a touch-sensitive surface, such as device 300 or portable multifunction device 100.

FIGS. 5A-5P illustrate exemplary user interfaces for sharing content from a respective application performed on a first electronic device 100-1 (e.g., the sharing device associated with a user named Jenny) in accordance with some embodiments. The user interfaces in these figures are used to illustrate the processes described below, including the processes in FIGS. 6A-6E (e.g., method 600).

FIG. 5A illustrates displaying user interface 400 on touch screen 112 of portable multifunction device 100-1 (sometimes herein called device 100-1). For example, device 100-1 is associated with a first user named Jenny. In FIG. 5A, user interface 400 displays home screen 500 including a plurality of application icons (e.g., 424, 426, 428, 430, 432, 434, 436, 438, 440, 442, 444, 446) and a plurality of tray icons (e.g., 416, 418, 420, 422 which are, in some embodiments, application icons that are displayed in a tray of a multi-page application launch interface). Application icons (or, more generally, icons) are also sometimes herein called user interface objects or affordances. FIG. 5A also illustrates detecting contact 501 (e.g., a tap gesture) over "photos" application icon 428 on touch screen 112.

Figure 5B:
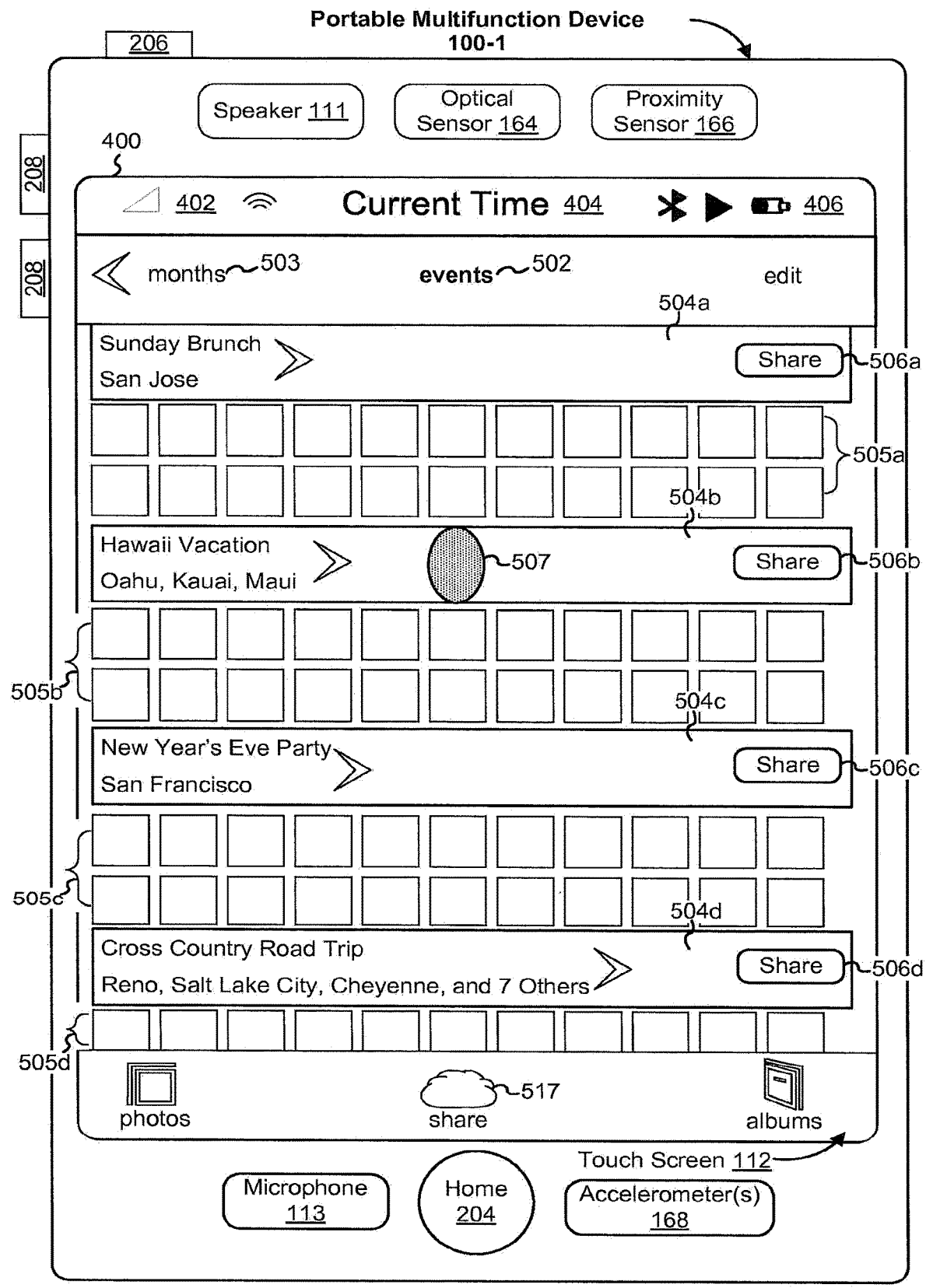
FIGS. 5Q-5EE illustrate exemplary user interfaces for receiving shared content from a respective application in accordance with some embodiments.

FIG. 5B illustrates displaying a plurality of selectable multi-media item (e.g., multi-photograph or multi-video) events 504a, 504b, 504c, 504d within an events view 502 on user interface 400 within a photos application in response to detecting selection of the photos application in FIG. 5A. In FIG. 5B, user interface 400 includes a "months" affordance 503, which, when activated, causes the device to display a months view, a plurality of sharing affordances (e.g., 506a, 506b, 506c, 506d), which, when activated, causes the device to share a respective event, and "share" affordance 517, which, when activated, causes the device to share one or more selected representations. In FIG. 5B, the plurality of events include an event header with an associated event title (e.g., Sunday Brunch, Hawaii Vacation, New Year's Eve Party, and Cross Country Road Trip), event location(s) (e.g., San Jose; Oahu, Kauai, and Maui; San Francisco; Reno, Salt Lake City, Cheyenne, and 7 others), and one or more representations of media items (e.g., photographs, videos, or audio clips) 505 (e.g., 505a, 505b, 505c, 505d) within the respective event. FIG. 5B also illustrates detecting contact 507 (e.g., a tap gesture) over "Hawaii Vacation" event header 504b on touch screen 112.

Figure 5C:
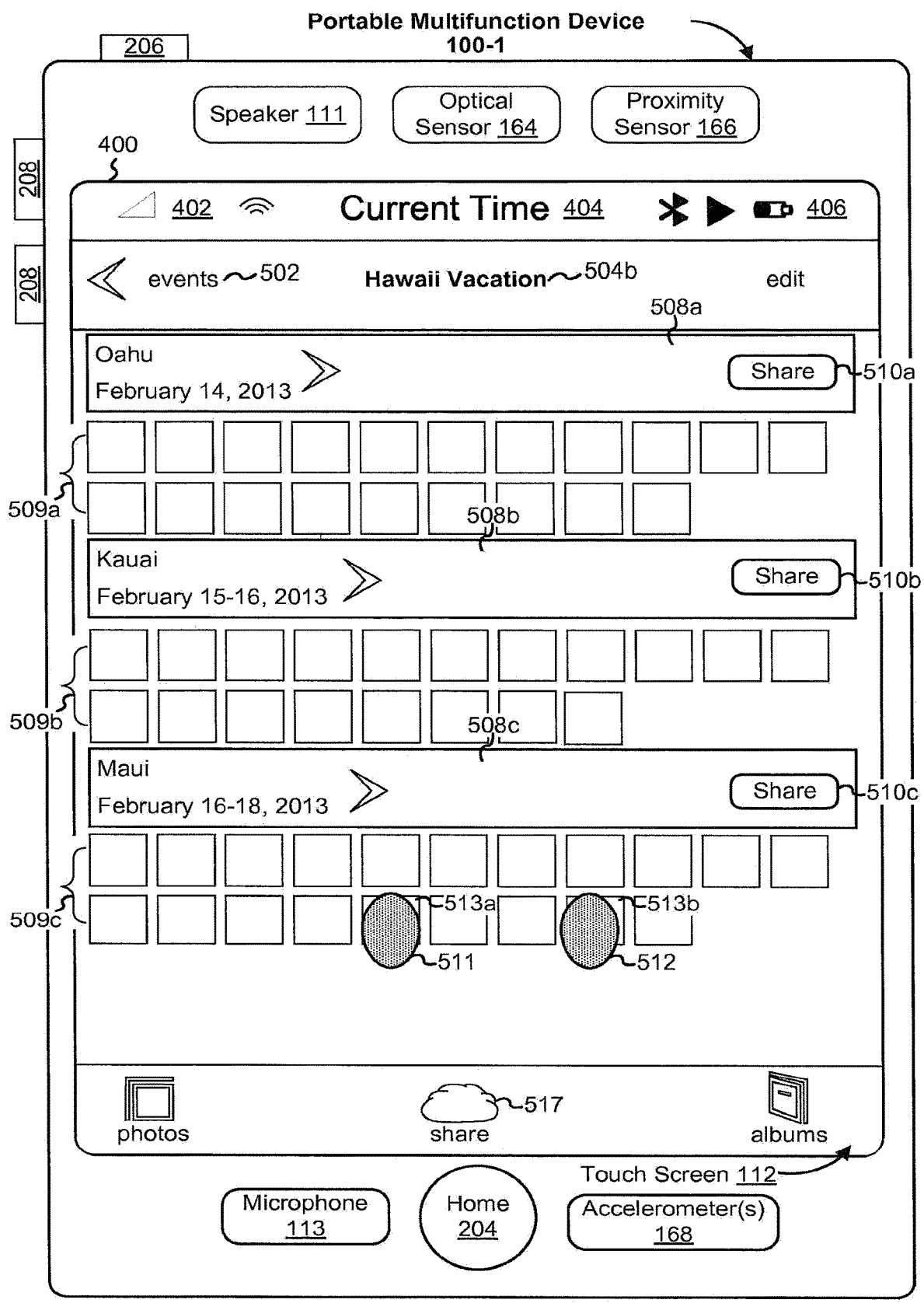

FIG. 5C illustrates displaying event 504b entitled "Hawaii Vacation" in response to detecting contact 507 in FIG. 5B. In some embodiments, a tap gesture on a representation of a media item (e.g., a photograph) causes the device to display an enlarged representation of the media item, while a tap gesture at a location corresponding to an event header causes a representation of the event (or one or more sub-events) to be displayed. FIG. 5C also illustrates a plurality of sub-events 508a, 508b, 508c within event 504b. In FIG. 5C, the sub-events correspond to media items captured at different locations (e.g., Oahu, Kauai, and Maui) and on different dates within the Hawaii Vacation meta-event. In FIG. 5C, one or more representations of media items (e.g., 509a, 509b, 509c) associated with a sub-event are displayed in user interface 400. In FIG. 5C, user interface 400 includes a "events" affordance 502, which, when activated, causes the device to display the events view, a plurality of sharing affordances (e.g., 510a, 510b, 510c), which, when activated, causes the device to share a respective sub-event, and "share" affordance 517, which, when activated, causes the device to share one or more selected representations of media items. FIG. 5C also illustrates detecting contact 511 (e.g., a tap gesture) selecting representation 513a and contact 512 (e.g., a tap gesture) selecting representation 513b on touch screen 112. In some embodiments, contacts 511 and 512 are simultaneously detected contacts. In some other embodiments, contact 511 is detected prior to detecting contact 512 or vice versa.

Figure 5D:
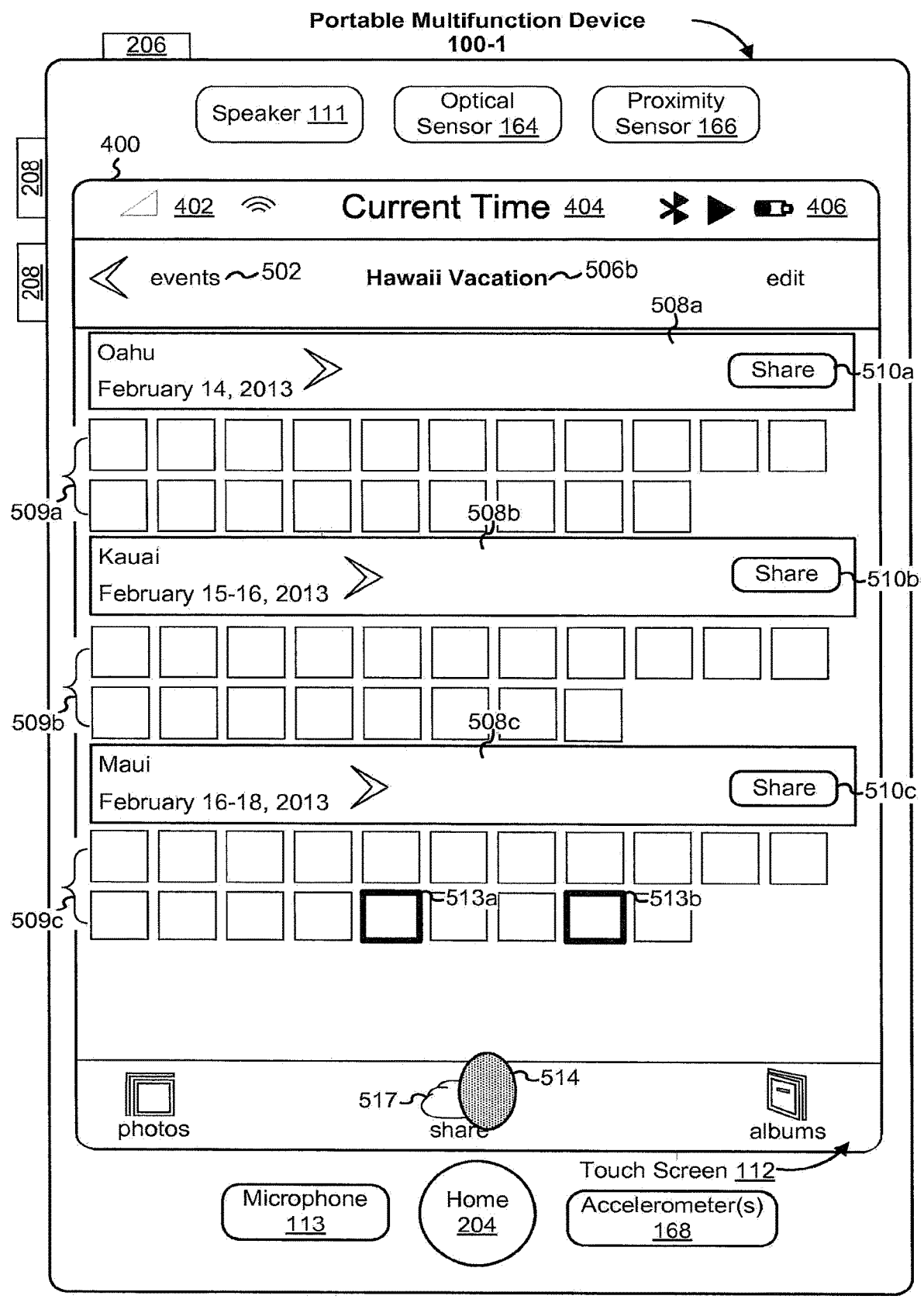

FIG. 5D illustrates displaying selected representations 513a and 513b in response to detecting contacts 511 and 512 in FIG. 5C. In FIG. 5D, a highlighted frame is displayed around the perimeter of selected representations 513a and 513b denoting that representations 513a and 513b have been selected. FIG. 5D also illustrates detecting selection of "share" affordance 517 with contact 514 (e.g., a tap gesture) on touch screen 112.

Figure 5E:
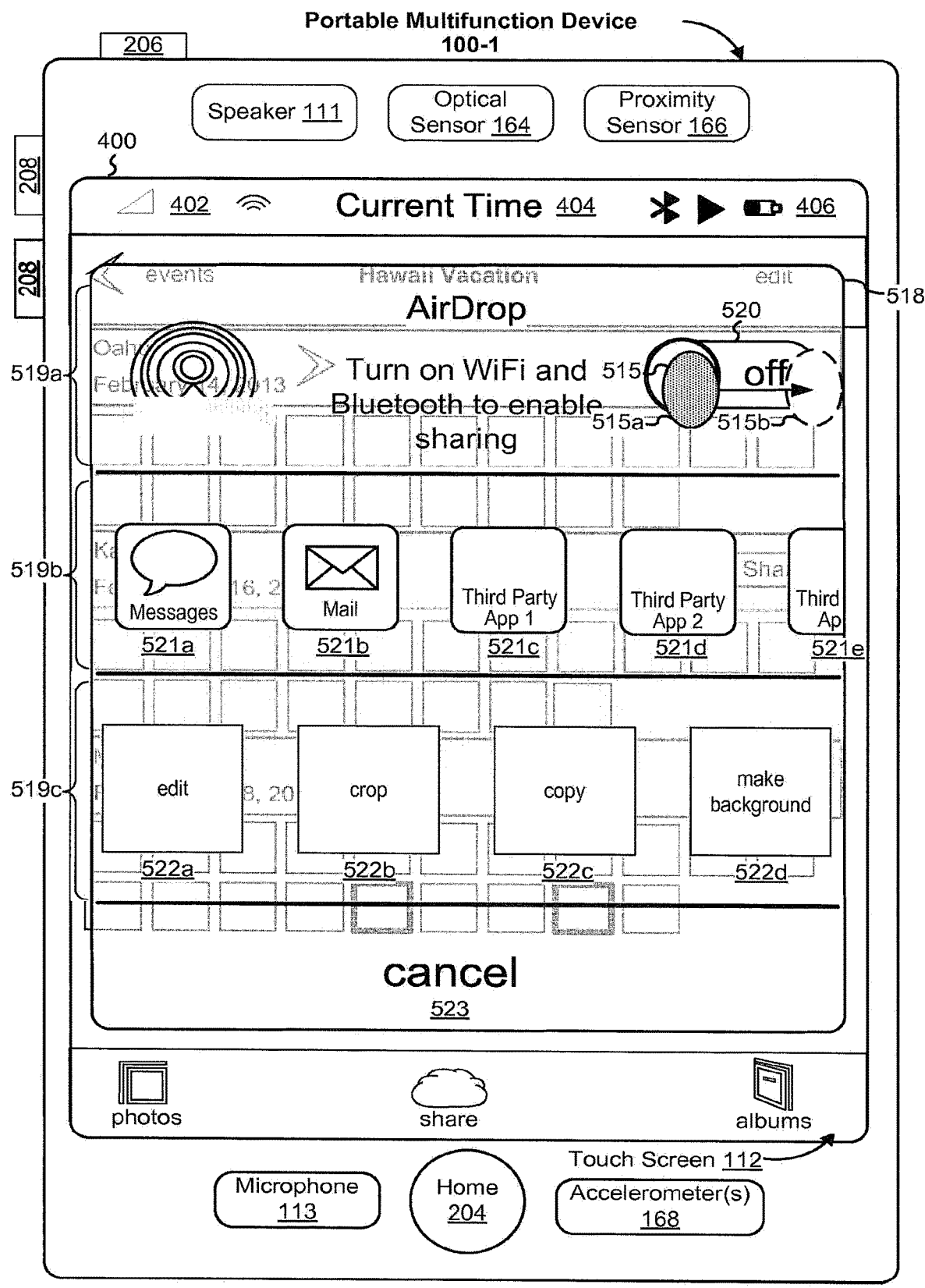

FIG. 5E illustrates displaying sharing interface 518 over the photos application on user interface 400 in response to detecting selection of "share" affordance 517 in FIG. 5D. In FIG. 5E, sharing interface 518 includes a first region 519a with sharing enable affordance 520 configured tum on device 100-1's Bluetooth and WiFi capabilities to enable sharing, a second region 519b with one or more protocol-first sharing options 521, a third region 519c with one or more application related options 522, and a "cancel" affordance 523, which, when activated, causes the device to dismiss sharing interface 518. FIG. 5E further illustrates detecting a slide gesture over affordance 520 with contact 515 moving from position 515a to position 515a on touch screen 112. In some embodiments, portions of the photos application that are visible when sharing interface 518 is displayed are blurred, shaded, or otherwise made visually less distinct. In some embodiments, where sharing interface 518 occupies less than all of touch screen 112, the areas that are not occupied by sharing interface 518 are blank (e.g., no graphics, icons, wallpaper, etc., of the home screen 500 are displayed in those areas). In FIG. 5E, sharing enable affordance 520 is displayed in first region 519a because device 100-1 is not currently enabled to share content directly with one or more other devices. In some embodiments, a device is enabled to share content directly with other devices when the device's Bluetooth and WiFi capabilities are both enabled.

In FIG. 5E, the protocol-first sharing options 521 displayed in second region 519b include "messages" icon (sometimes also herein called an "affordance" or "user interface object") 521a for sharing content via instant messaging, "mail" icon 521*b* for sharing via content email, "third party app 1" icon 521*c* for sharing content via a third party application (e.g., Twitter® or Facebook®), "third party app 2" icon 521*d*, and partially displayed "third party app 3" icon 521*e*. In some embodiments, a partially displayed protocol-first sharing option is accessible by way of a right to left swipe gesture (sometimes also herein called a "slide" or "drag" gesture) that scrolls second region 519*b* from right to left. In some embodiments, a respective protocol-first sharing option shares content via the respective protocol (e.g., SMS/MMS or email). In FIG. 5E, application related options 522 associated with the photos application include an "edit" icon 522*a*, a "crop" icon 522*b*, "copy" icon 522*c*, and a "make background" icon 522*d*. In some embodiments, application related options 522 displayed in third region 519*c* of sharing interface 518 are dependent on the application in which the "share" affordance 517 was selected.

Figure 5F:
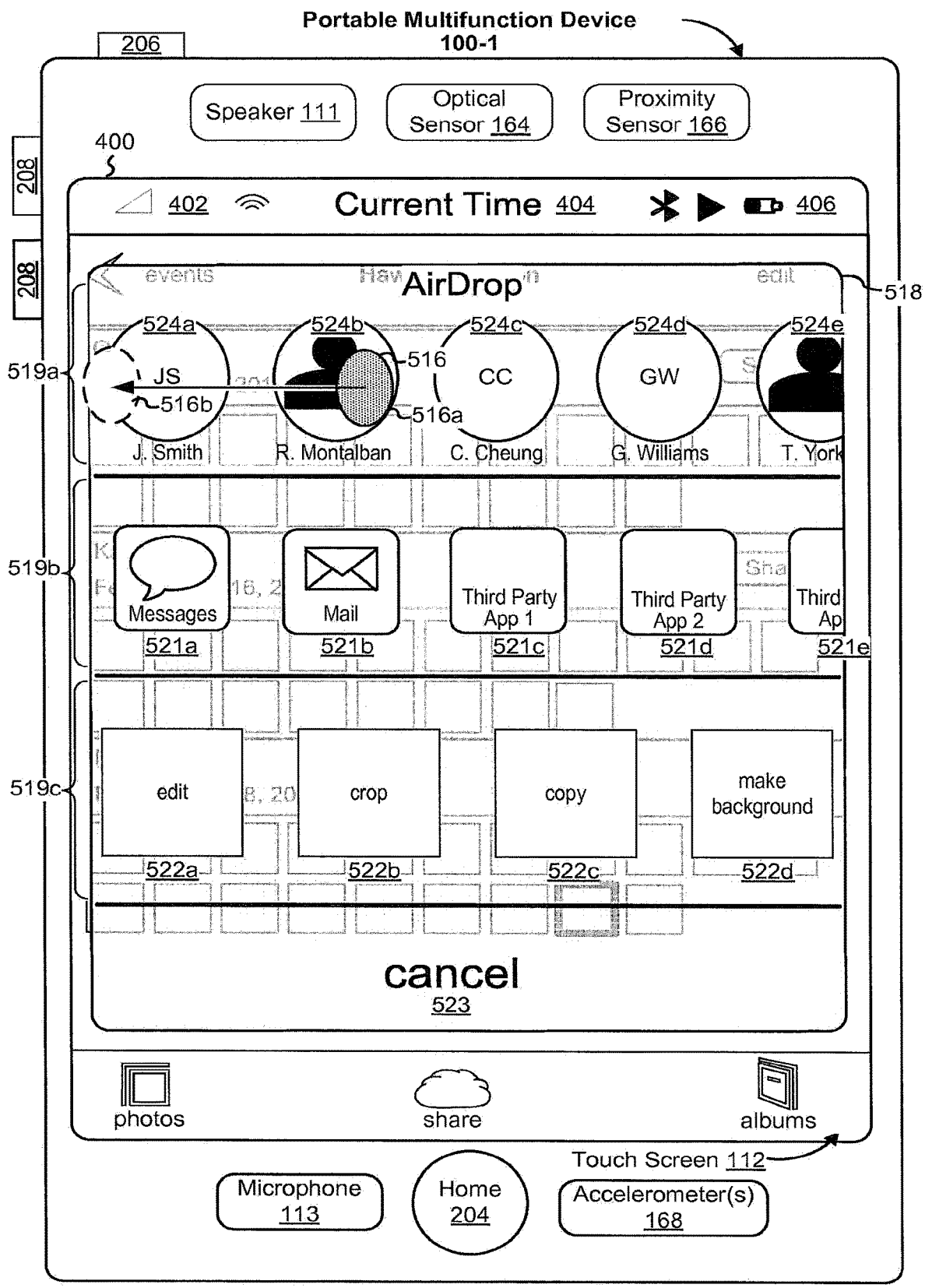

FIG. 5F illustrates displaying first region 519*a* of sharing interface 518 including one or more user-first sharing options 524 in response to detecting the sliding gesture that includes movement of contact 515 in FIG. 5E. In FIG. 5F, the user-first sharing options 524 displayed in first region 519*a* include a monogram (or initials) for a first user 524*a*, a portrait for a second user 524*b*, a monogram for a third user 524*c*, a monogram for a fourth user 524*d*, and a partially displayed portrait for a fifth user 524*d*. In some embodiments, a partially displayed user-first sharing option is accessible by way of a right to left swipe gesture (sometimes also herein called a "slide" or "drag" gesture) that scrolls first region 519*a* from right to left. In some embodiments, a respective user-first sharing option shares content directly with the respective user.

In some embodiments, user-first sharing options 524 are arranged based on user sharing preferences (e.g., a most frequently contacted user is displayed as the left-most user-first sharing option, the order of the user-first sharing options is selected by the user, or the order of the user-first sharing options is alphabetical). In FIG. 5F, user-first sharing options 524 are oval-shaped, while protocol-first sharing options 521 are rectangular-shaped with rounded corners, and application related options 522 are rectangular-shaped with sharp corners. In some embodiments, user-first sharing options 524 displayed in first region 519*a* have an appearance (e.g., shape, color, opacity, translucency, shade, shadow, etc.) that is different from protocol-first sharing options 521 displayed in second region 519*b*. In some embodiments, application related options 522 displayed in third region 519*c* have an appearance (e.g., shape, color, opacity, translucency, shade, shadow, etc.) that is different from user-first sharing options 524 displayed in first region 519*a* and protocol-first sharing options 521 displayed in second region 519*b*. FIG. 5F also illustrates detecting a swipe gesture within first region 519*a* with contact 516 moving from position 516*a* to position 516*b* on touch screen 112. In some embodiments, user-first sharing options 524 are arranged based on user sharing preferences (e.g., a most frequently contacted user is displayed as the left-most user-first sharing option, the order of the user-first sharing options is selected by the user, or the order of the user-first sharing options is alphabetical). In FIG. 5F, user-first sharing options 524 are oval-shaped, while protocol-first sharing options 521 are rectangular-shaped with rounded corners, and application related options 522 are rectangular-shaped with sharp corners. In some embodiments, user-first sharing options 524 displayed in first region 519*a* have an appearance (e.g., shape, color, opacity, shade, shadow, etc.) that is different from protocol-first sharing options 521 displayed in second region 519*b*. In some embodiments, application related options 522 displayed in third region 519*c* have an appearance (e.g., shape, color, opacity, translucency, shade, shadow, etc.) that is different from user-first sharing options 524 displayed in first region 519*a* and protocol-first sharing options 521 displayed in second region 519*b*. FIG. 5F also illustrates detecting a swipe gesture within first region 519*a* with contact 516 moving from position 516*a* to position 516*b* on touch screen 112.

Figure 5G:
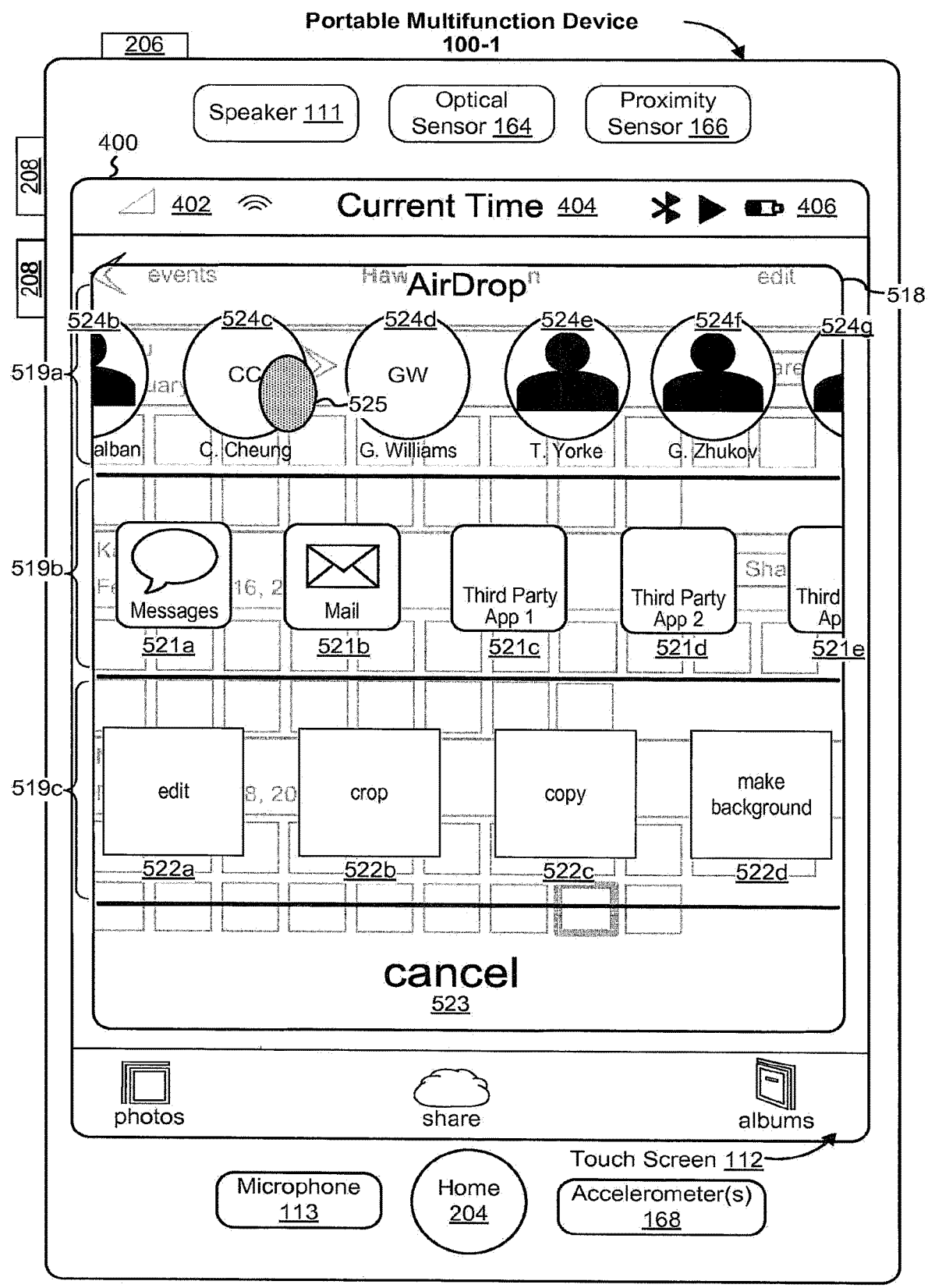

FIG. 5G illustrates scrolling first region 519*a* from right to left in response to detecting the swipe gesture that includes movement of contact 516 in FIG. 5F. In FIG. 5G, first region 519*a* partially displays the portrait for second user 524*b*, displays a portrait for sixth user 524*f*, and partially displays a portrait for seventh user 524*g*. FIG. 5F also illustrates activating user-first sharing option 524*c* (e.g., corresponding to a third user named C. Cheung) in response to detecting contact 525 (e.g., a tap gesture) at a location on touch screen 112 that corresponds to user-first sharing option 524*c*.

Figure 5H:
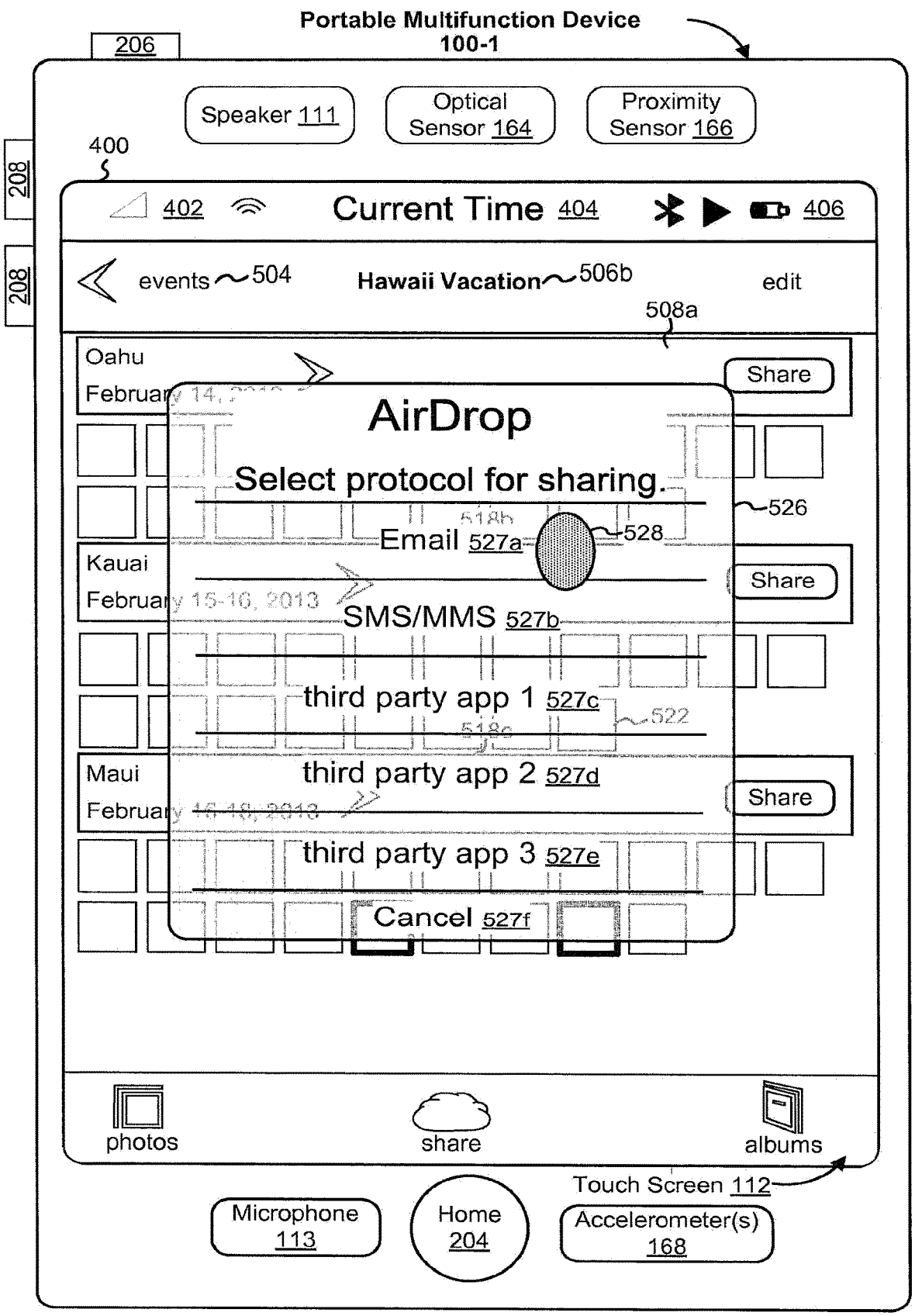

FIG. 5H illustrates displaying protocol selection interface 526 on user interface 400 in response to detecting selection of user-first sharing option 524*c* in FIG. 5G. In FIG. 5H, protocol selection interface 526 includes one or more protocols 527 for sharing photos 513*a* and 513*b* (selected as the content to be shared in FIG. 5C) with C. Cheung (selected as the recipient FIG. 5G). In FIG. 5G, protocol selection interface 526 includes "email" affordance 527*a* for emailing the selected photos with the selected recipient, "SMS/MMS" affordance 527*b* for sending the selected photos via an instant message with the selected recipient, "third party app 1" affordance 527*c* for sharing the selected photos with the selected recipient via third party application 1, "third party app 2" affordance 527*d* for sharing the selected photos with the selected recipient via third party application 2, "third party app 3" affordance 527*e* for sharing the selected photos with the selected recipient via third party application 3, and "cancel" affordance 527*f*, which, when activated, causes the device to cancel sharing the selected photos with the selected recipient or to return to sharing sheet 518 displayed in FIG. 5G. FIG. 5H also illustrates detecting contact 528 (e.g., a tap gesture) at a location that corresponds to "email" affordance 527*a* on touch screen 112. For example, in response to detecting contact 528, device 100-1 emails photographs 513*a* and 513*b* to an email address associated with C. Cheung. In some embodiments, protocol selection interface 526 is not displayed in user interface 400 in response to detecting selection of user-first sharing option 524*c* in FIG. 5G. Instead, a default or last used sharing protocol is used to share the shared content (e.g., a direct sharing protocol for sharing content over a device-to-device wireless network is used).

Figure 5I:
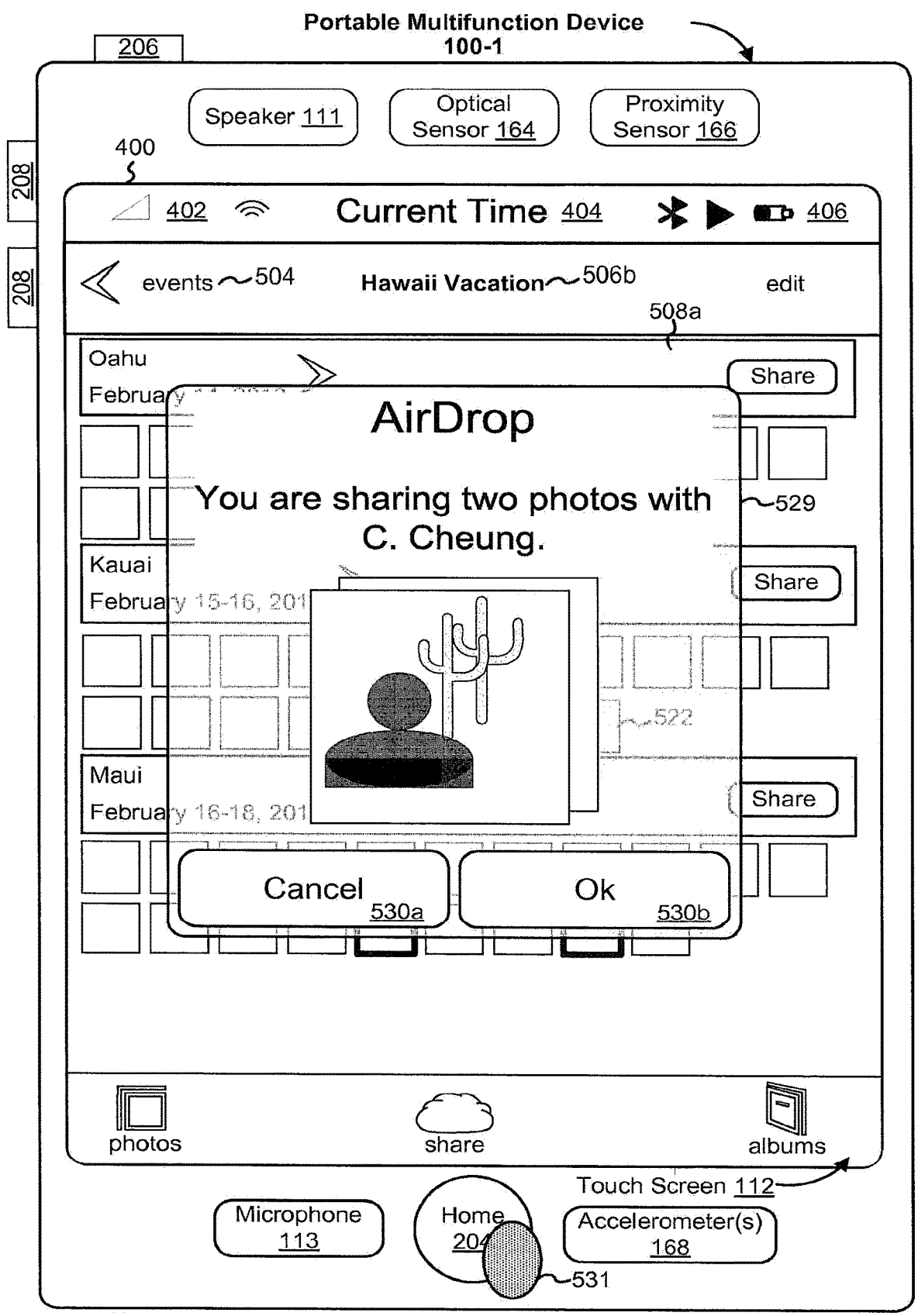

FIG. 5I illustrates displaying sharing confirmation dialog 529 on user interface 400 in response to detecting selection of "email" affordance 527*a* in FIG. 5H (or in response to detecting selection of "C. Cheung" in FIG. 5G if protocol selection interface 526 is not displayed). In FIG. 5I, sharing confirmation dialog 529 includes text indicating that the user of device 100-1 (e.g., Jenny) is currently sharing two photographs (e.g., photographs 513*a* and 513*b* selected for sharing in FIG. 5C) with C. Cheung (e.g., corresponding to user-first option 524*c* selected in FIG. 5G) and a preview of the photographs currently being shared. In FIG. 5I, sharing confirmation dialog 529 further includes "cancel" affordance 530*a*, which, when activated, causes the device to abort performance of the sharing operation and "ok" affordance 530*b*, which, when activated, causes the device to dismiss sharing confirmation dialog 529. FIG. 5I also illustrates detecting activation of home button 204 (e.g., in response to detecting a tap or press gesture 531).

Figure 5J:
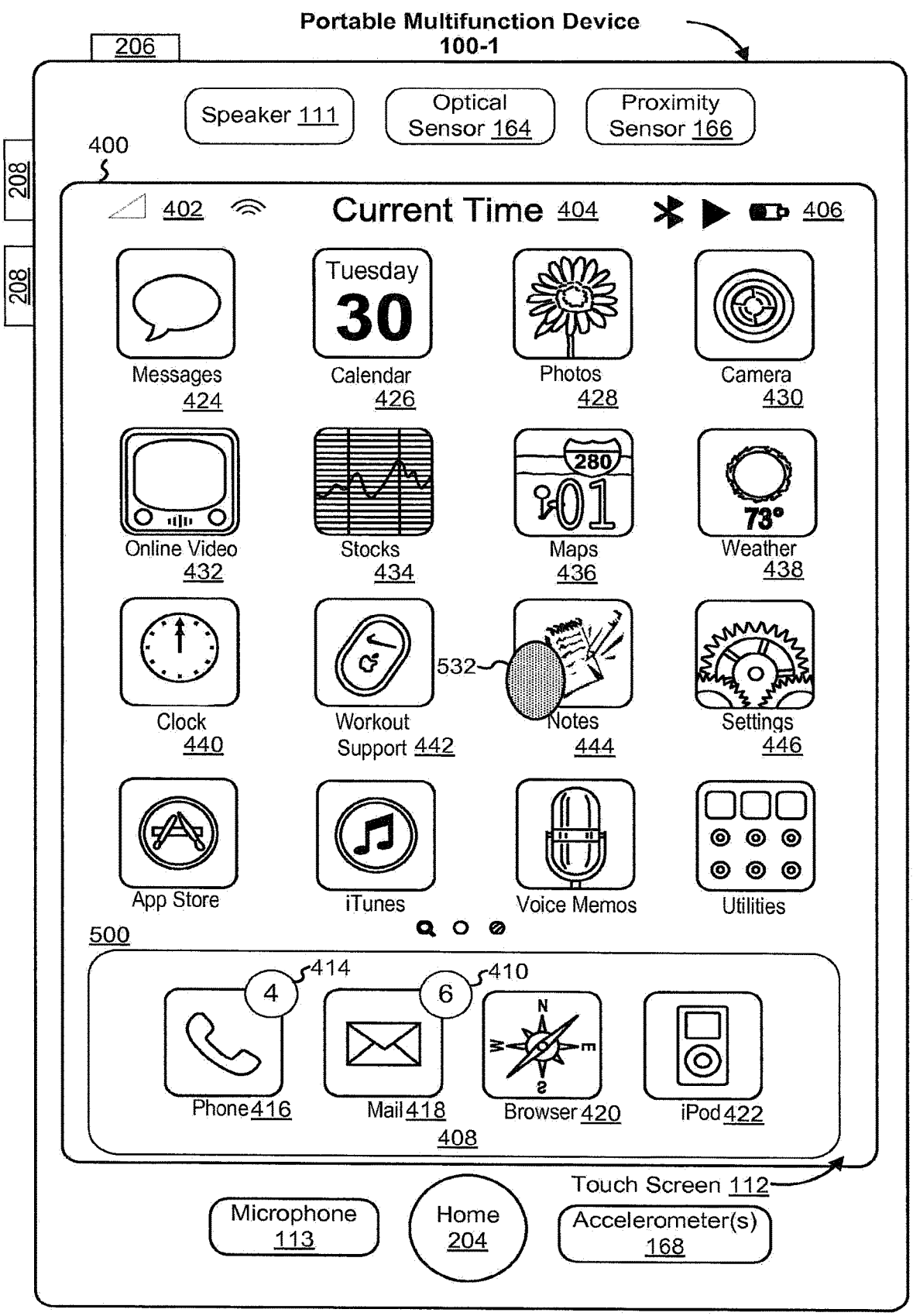

FIG. 5J illustrates displaying home screen 500 on user interface 400 in response to detecting activation of home button 204 in FIG. 5I. FIG. 5J also illustrates detecting contact 532 (e.g., a tap gesture) at a location that corresponds to "notes" application icon 444 on touch screen 112.

Figure 5K:
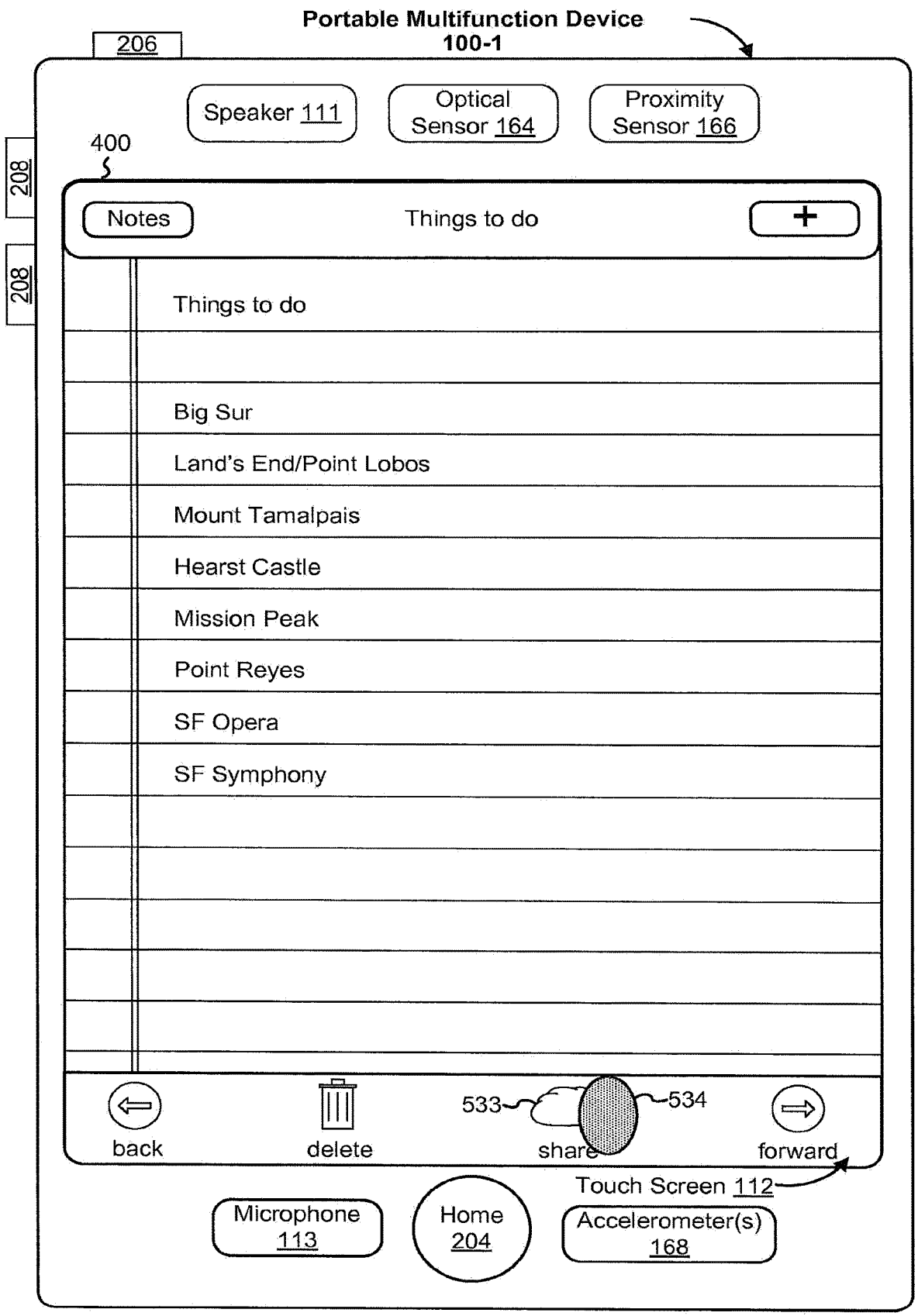

FIG. 5K illustrates displaying a note entitled "Things to do" on user interface 400 within a notes application in response detecting selection of "notes" application icon 444 in FIG. 5J. FIG. 5K also illustrates detecting contact 534 (e.g., a tap gesture) at a location that corresponds to "share" affordance 533 for sharing the note currently displayed in user interface 400.

Figure 5L:
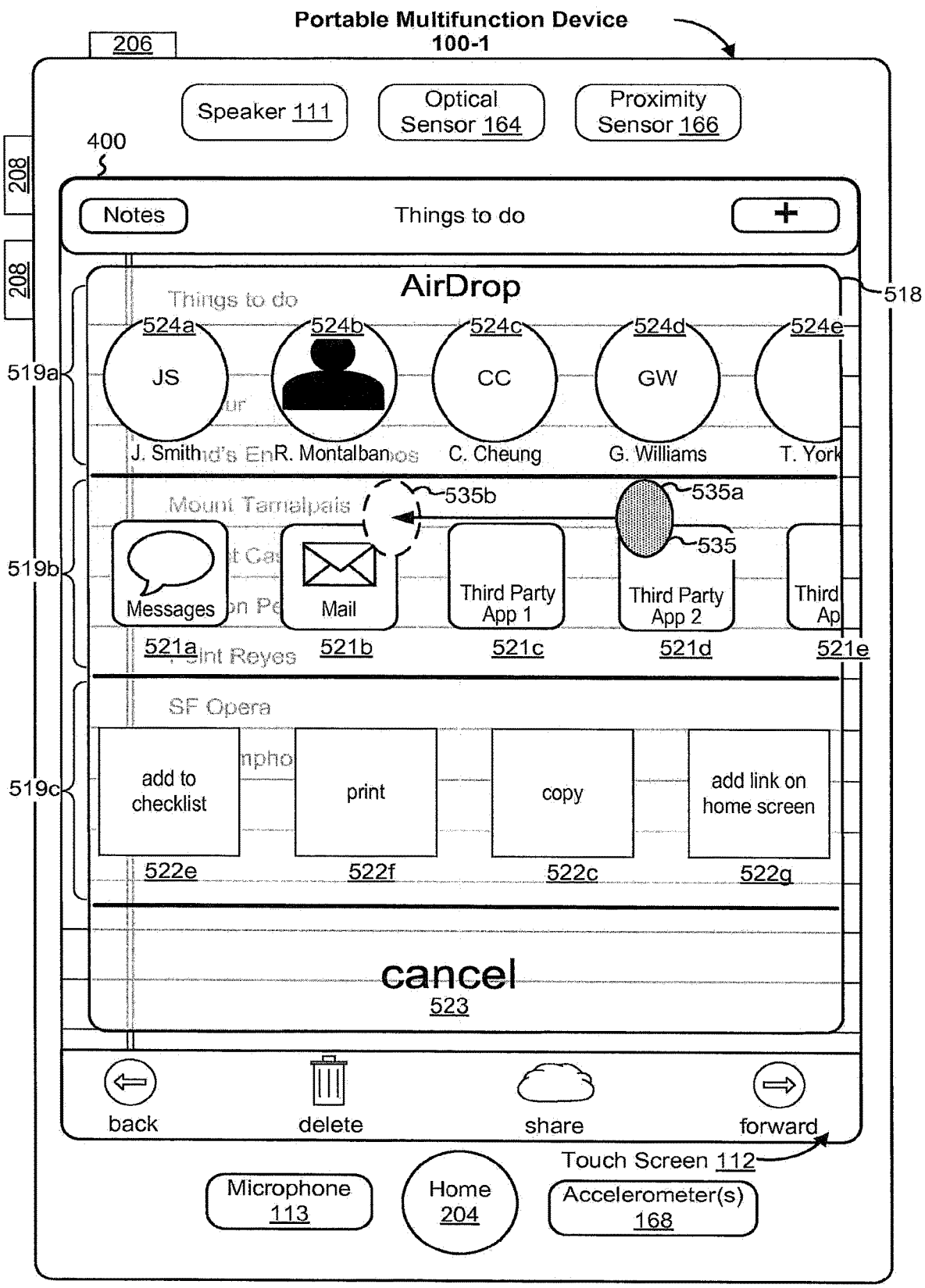

FIG. 5L illustrates displaying sharing interface 518 on user interface 400 in response to detecting selection of "share" affordance 533 in FIG. 5K. In FIG. 5L, sharing interface 518 includes a first region 519a with one or more user-first sharing options 524, a second region 519b with one or more protocol-first sharing options 521, a third region 519c with one or more application related options 522, and a "cancel" affordance 523, which, when activated, causes the device to dismiss sharing interface 518. In FIG. 5L, application related options 522 associated with the notes application include "add to checklist" icon 522e, "print" icon 522f, "copy" icon 522c, and "add link on home screen" icon 522g. FIG. 5L also illustrates detecting a swipe gesture within second region 519b with contact 535 moving from position 535a to position 535b on touch screen 112.

Figure 5M:
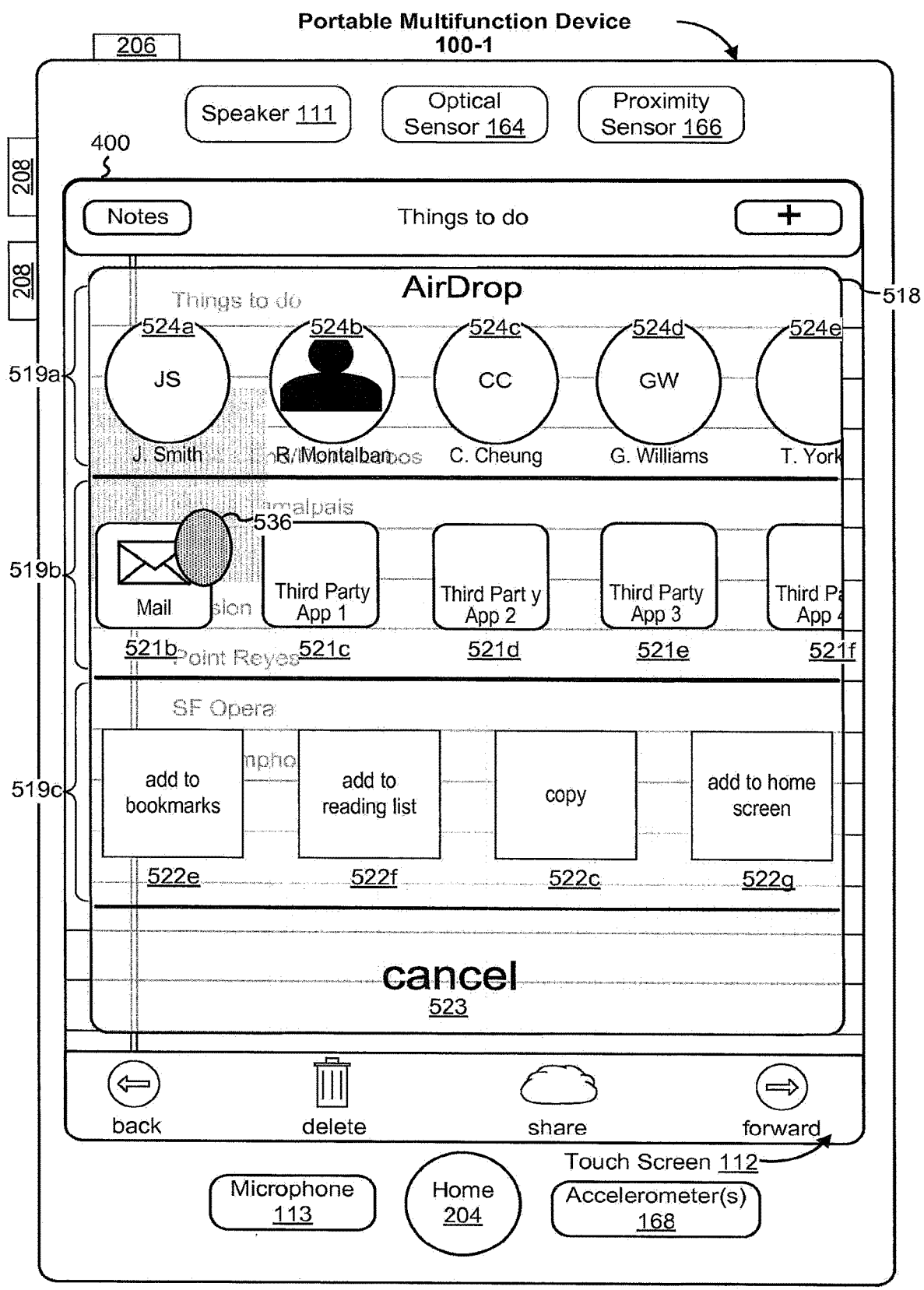

FIG. 5M illustrates scrolling second region 519b from right to left in response to detecting the swipe gesture in FIG. 5L. In FIG. 5M, second region 519b displays "third party app 3" icon 521e and partially displays "third party app 4" icon 521f. FIG. 5M also illustrates detecting selection of protocol-first sharing option 521b (e.g., corresponding to email) with contact 536 (e.g., a tap gesture) on touch screen 112. In some embodiments, in response to detecting selection of protocol-first sharing option 521b (e.g., corresponding to email), the device opens the corresponding application (e.g., email 140) so that the content can be shared via the corresponding application after the user selects addressees in the corresponding application (not shown). In some other embodiments, in response to detecting selection of protocol-first sharing option 521b (e.g., corresponding to email), the device displays a recipient selection interface, as described below.

Figure 5N:
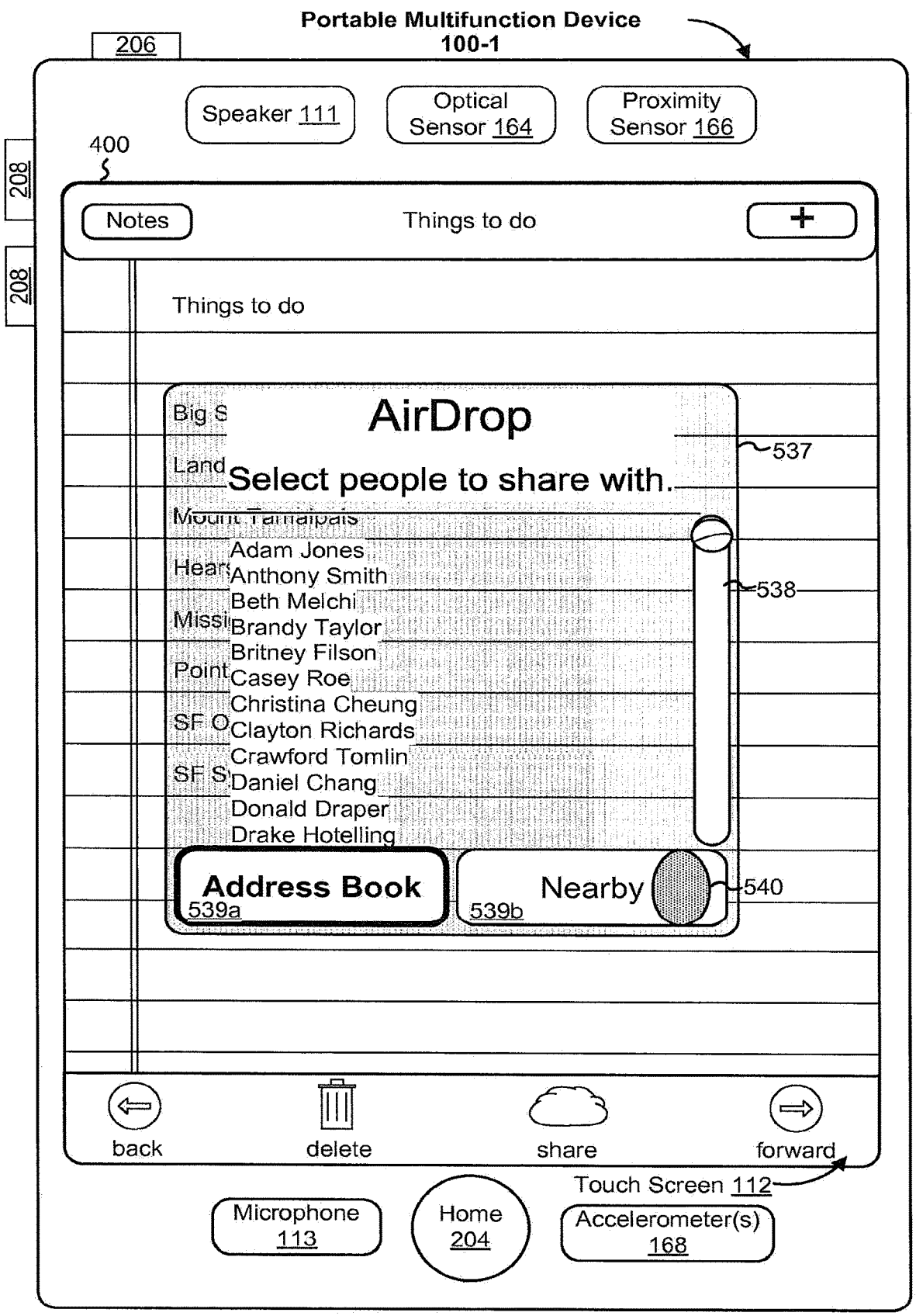

FIG. 5N illustrates displaying recipient selection interface 537 on user interface 400 in response to detecting selection of protocol-first sharing option 521b in FIG. 5M. In FIG. 5N, recipient selection interface 537 includes one or more users (or recipients) to share the "Things to do" note (selected as the content to be shared in FIG. 5K) with via email (selected as the sharing protocol in FIG. 5M). In FIG. 5N, recipient selection interface 537 includes a scrollable list of selectable contacts from the user of device 100-1's address book, scroll bar 538, "address book" affordance 539a, which, when activated, causes the device to display a list of contacts from the address book of the user of device 100-1, and "nearby" affordance 539b, which, when activated, causes the device to display a list of users within "sharing range" of device 100-1. In some embodiments, "sharing range" is limited to the current WiFi or Bluetooth range of device 100-1 or to near-field communication or a communication protocol specified by the sharing functionality. In FIG. 5N, "address book" affordance 539a is displayed as highlighted and bolded because the address book of the user of device 100-1 is currently displayed in recipient selection interface 537. FIG. 5N also illustrates detecting selection of "nearby" affordance 539b with contact 540 (e.g., a tap gesture) on touch screen 112.

Figure 5O:
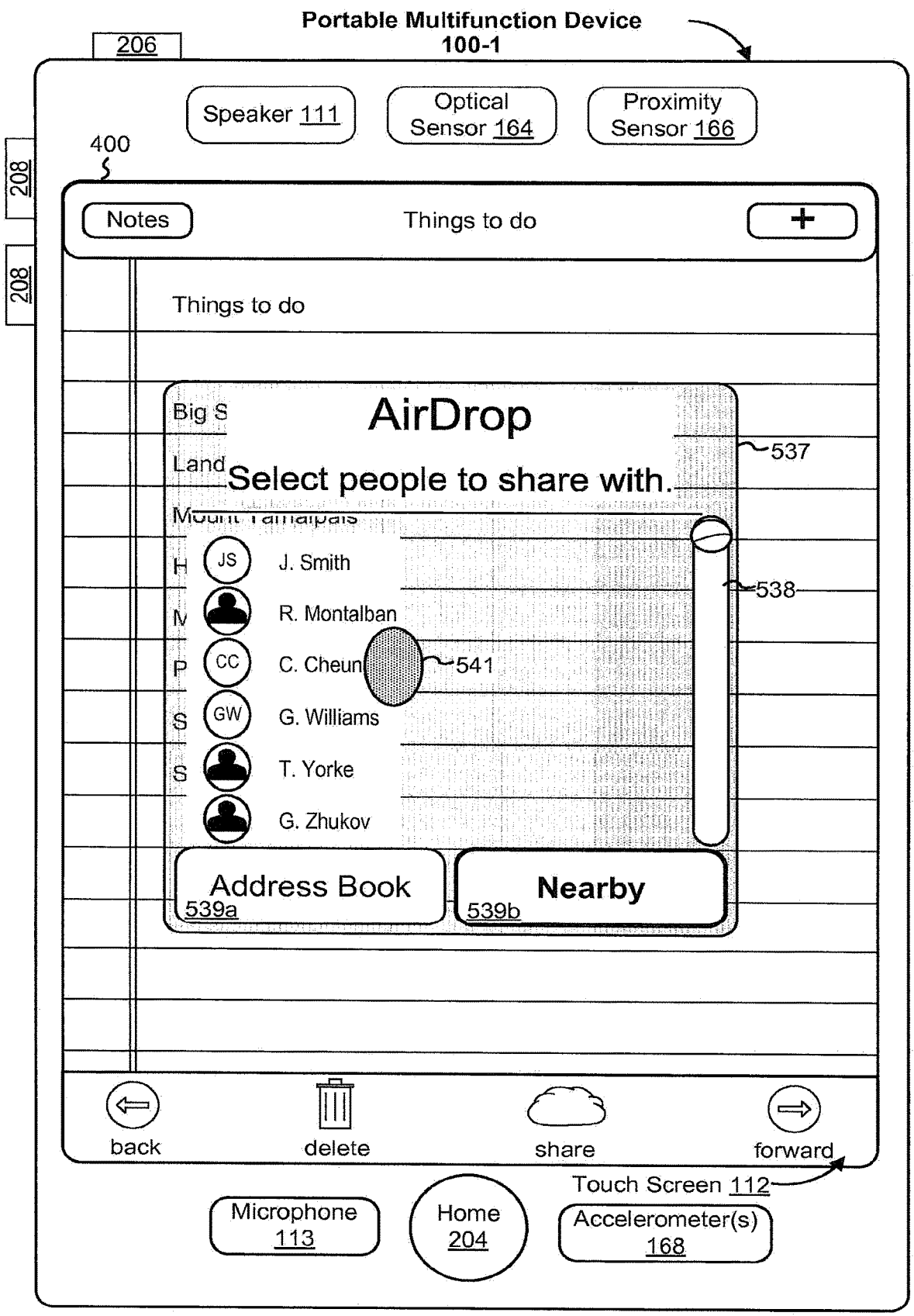
Figure 5P:
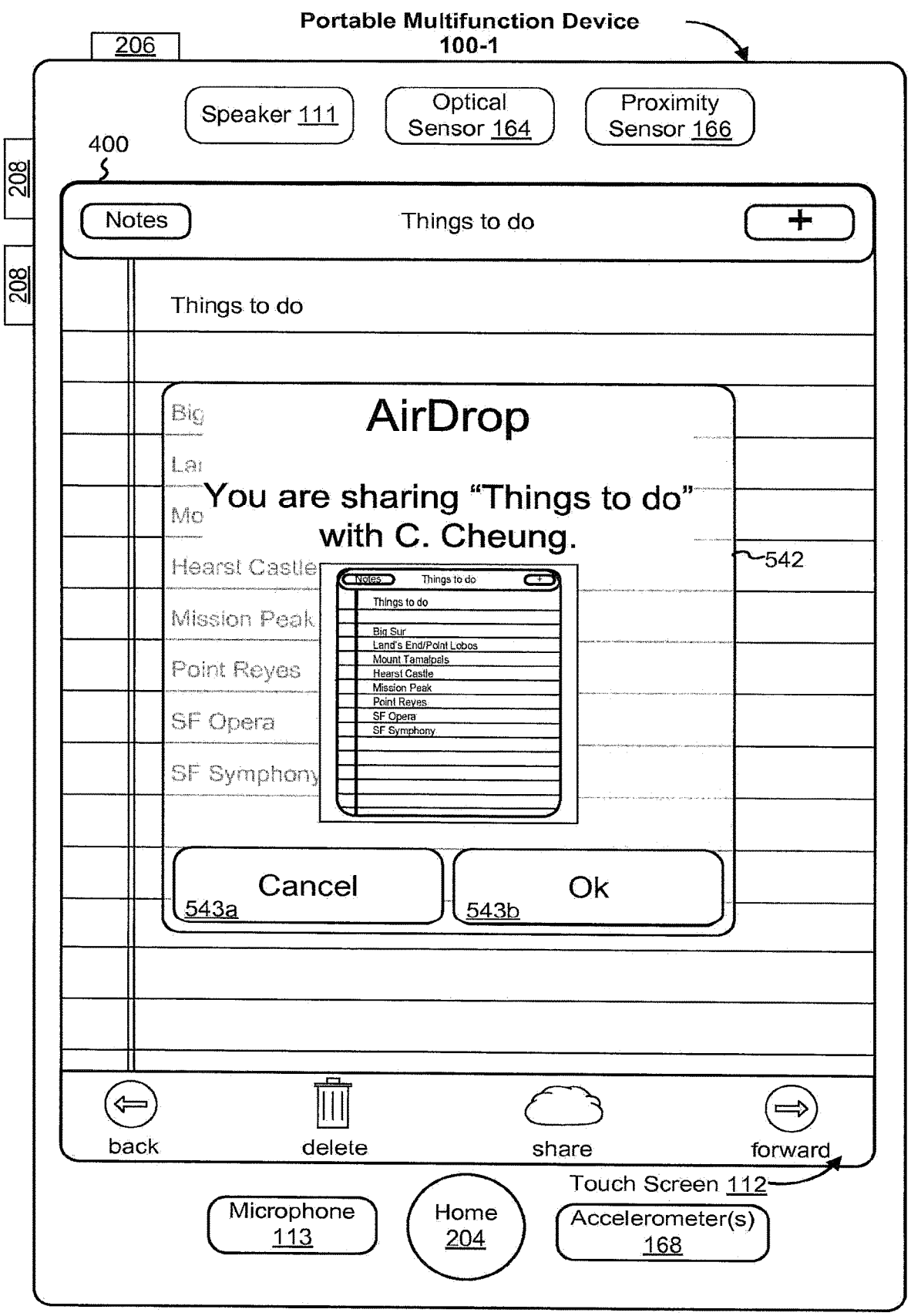

FIG. 5O illustrates displaying a scrollable list of selectable nearby users within recipient selection interface 537 on user interface 400 in response to detecting selection of "nearby" affordance 539b in FIG. 5N. FIG. 5O also illustrates detecting selection of user C. Cheung with contact 541 (e.g., a tap gesture) on touch screen 112. In some embodiments, the user of device 100-1 is provided with the option to select a plurality of recipients from the list displayed in dialog 537 in FIGS. 5N and/or 5O. In response to detecting contact 541, device 100-1 emails "Things to do" note to an email address associated with C. Cheung.

FIG. 5P illustrates displaying sharing confirmation dialog 542 on user interface 400 in response to detecting selection of user C. Cheung in FIG. 5O. In FIG. 5P, sharing confirmation dialog 542 includes text indicating that the user of device 100-1 (e.g., Jenny) is currently sharing "Things to do" (e.g., the note selected for sharing in FIG. 5K) with C. Cheung (e.g., the user (or recipient) selected in FIG. 5O) and a preview of the note currently being shared. In FIG. 5P, sharing confirmation dialog 542 further includes "cancel" affordance 543a, which, when activated, causes the device to abort performance of the sharing operation and "ok" affordance 543b, which, when activated, causes the device to dismiss sharing confirmation dialog 542.

Figure 5Q:
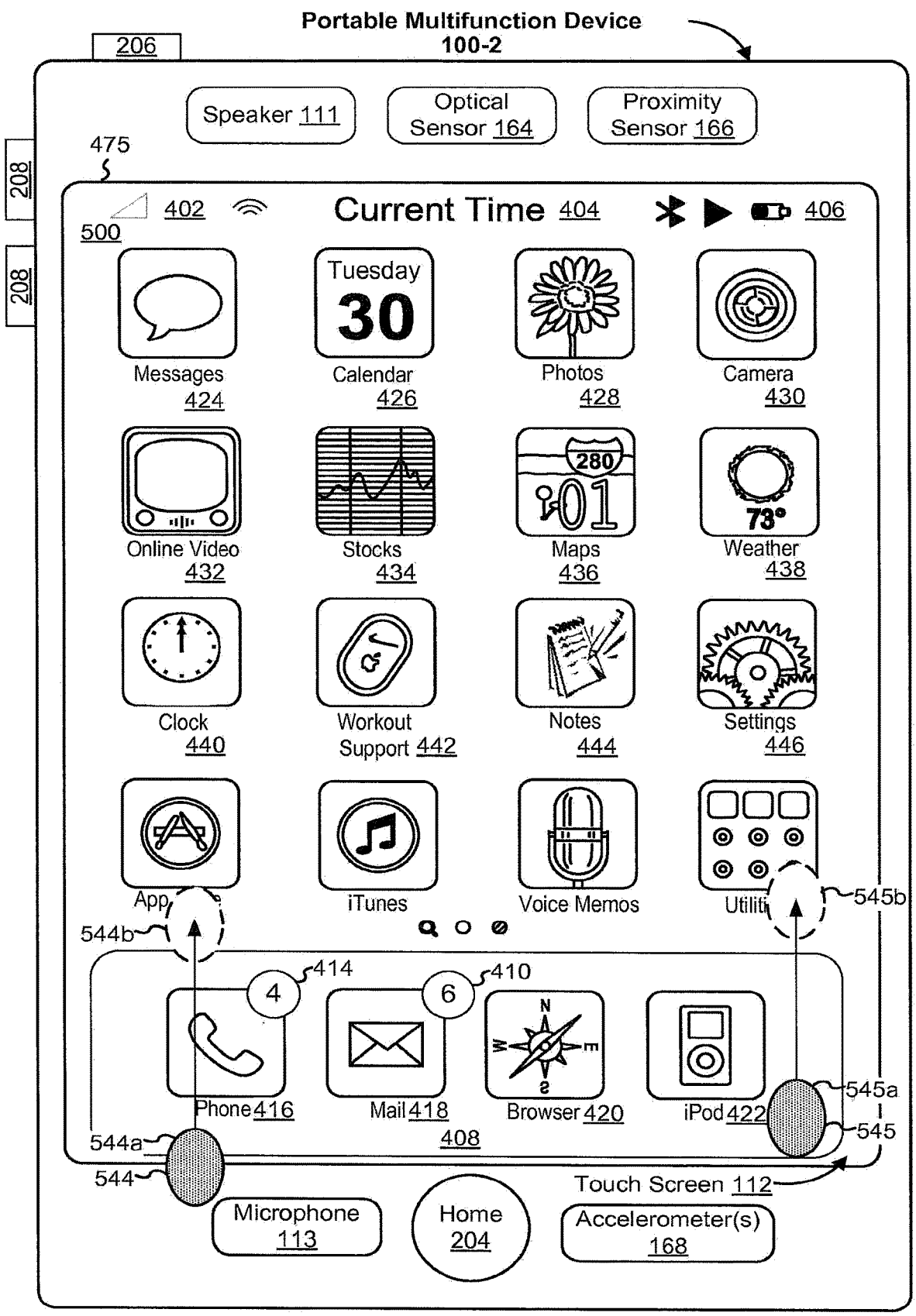

FIGS. 5Q-5EE illustrate exemplary user interfaces for receiving shared content from a respective application performed on second electronic device 100-2 (e.g., the receiving device associated with a user named C. Cheung) in accordance with some embodiments. The user interfaces in these figures are used to illustrate the processes described below, including the processes in FIGS. 7A-7C.

FIG. 5Q illustrates displaying user interface 475 on touch screen 112 of portable multifunction device 100-2 (sometimes herein called device 100-2). For example, device 100-2 is associated with a user named C. Cheung who is different from the user (e.g., named Jenny) of device 100-1. In FIG. 5Q, user interface 400 displays home screen 500 including a plurality of application icons (e.g., 424, 426, 428, 430, 432, 434, 436, 438, 440, 442, 444, 446) and a plurality of tray icons (e.g., 416, 418, 420, 422). Application icons (or, more generally, icons) are also sometimes herein called user interface objects or affordances. FIG. 5Q also illustrates detecting an upward swipe gesture with contact 544 from position 544a to position 544b on touch screen 112. In FIG. 5Q, the upward swipe gesture with contact 544 is an edge gesture (e.g., it originates from an edge of touch screen 112 and/or a contact with both a touch-sensitive portion of the device 100-2 and a non-touch-sensitive portion of the device 100-2). FIG. 5Q further illustrates detecting an upward swipe gesture with contact 545 from position 545a to position 545b on touch screen 112. In FIG. 5Q, the upward swipe gesture with contact 545 is a non-edge gesture (e.g., it originates from a contact "within" the touch screen 112). In some embodiments, either of the upward swipe gestures illustrated in FIG. 5Q (e.g., the edge gesture with contact 544 or the non-edge gesture with contact 545) cause one or more settings icons (and/or other information) to be displayed in user interface 475 of device 100-2. In some embodiments, one of the upward swipe gestures illustrated in FIG. 5Q (e.g., the edge gesture with contact 544 or the non-edge gesture with contact 545) causes the one or more settings icons to be displayed in user interface 475 of device 100-2 while the other upward swipe gesture illustrated in FIG. 5Q does not cause the one or more settings icons to be displayed.

Figure 5R:
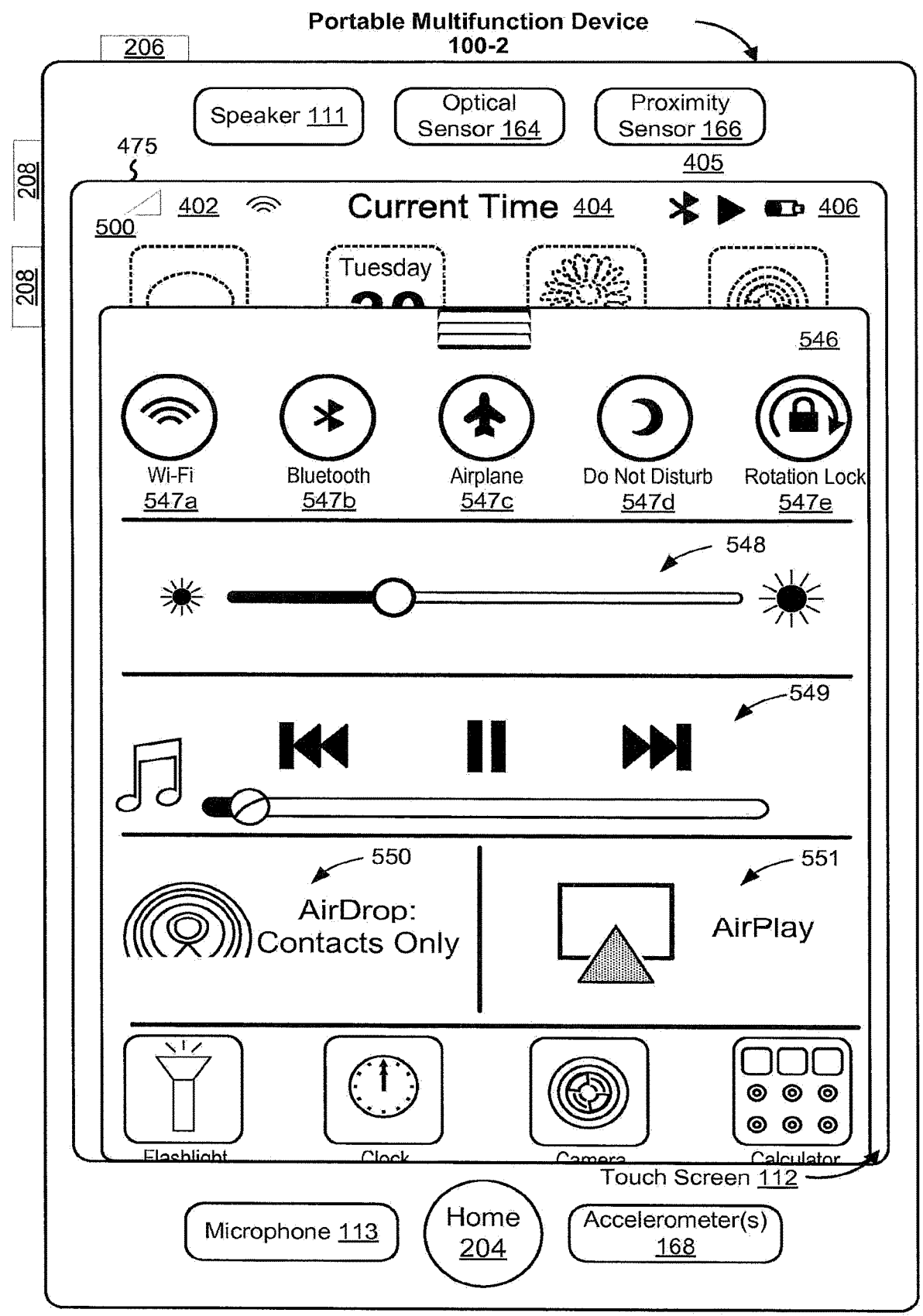

FIG. 5R illustrates partially displaying setting panel 546 over home screen 500 on user interface 475 in response to the upward swipe gesture detected in FIG. 5Q. In some embodiments, settings panel 546 is displayed over a portion of user interface 475 displayed on touch screen 112. In some embodiments, settings panel 546 occupies less than all (e.g., at least 80% or 90% but less than 100%) of user interface 475 displayed on touch screen 112. In some embodiments, at least one edge of the settings panel 546 touches and/or appears to be docked to an edge of touch screen 112. In some embodiments, settings panel 546 does not touch an edge of touch screen 112 (e.g., portions of home screen 500 are visible on all sides of the settings panel 546). In some embodiments, home screen 500 (e.g., a home screen background image and/or icons displayed in the home screen) is visible in portions of touch screen 112 that settings panel 546 does not occupy. In some embodiments, portions of home screen 500 that are visible when settings panel 546 is displayed are blurred, shaded, or otherwise made visually less distinct. In some embodiments, where settings panel 546 occupies less than all of touch screen 112, the areas that are not occupied by settings panel 546 are blank (e.g., no graphics, icons, wallpaper, etc., of the home screen 500 are displayed in those areas).

In FIG. 5R, settings Icons (e.g., settings Icons 547*a*, 546*b*, 547*c*, 547*d*, 547*e*) are displayed in settings panel 546. Settings icons include, for example, a Wi-Fi icon 547*a*, a Bluetooth icon 547*b*, an airplane mode icon 547*c*, a do-not-disturb icon 547*d*, and a rotation lock icon 547*d*. In some embodiments, do-not-disturb icon 547*d* corresponds to a setting in which notifications (e.g., ring tones, audible email notifications, etc.) are turned off while the "do-not-disturb" setting is selected or "on." In some embodiments, other settings icons are displayed. In some embodiments, the particular settings (and hence settings icons) displayed in settings panel 546 are determined by a user. Thus, a user can select more, fewer, or different settings to be represented in settings panel 546. For example, a settings icon corresponding to a "3G" setting (not shown) optionally replace the rotation lock icon 547*e*.

In some embodiments, settings Icons 547*a*, 546*b*, 547*c*, 547*d*, 547*e* are "on/off" switches (e.g., they represent a setting that can have one of two distinct states). In some embodiments, settings icons 547*a*, 546*b*, 547*c*, 547*d*, 547*e* change appearance based on the state of its underlying setting. For example, settings icons 547*a*, 546*b*, 547*c*, 547*d*, 547*e* optionally have a first color, shape, or other characteristic when the underlying setting is "off," and a second color, shape, or other characteristic distinct from the first when the underlying setting is "on."

In FIG. 5R, also displayed in settings panel 546 are brightness adjustment control 548 (e.g., a slider bar), audio control icons 549 (e.g., play/pause, fast forward, reverse, stop, volume controls, and/or track controls), sharing status indicator 550, which, when activated, causes the device to change the discoverability (or availability) of device 100-2 for a sharing functionality, remote media control indicator 551, which, when activated, causes the device to display a user interface for adjusting remote media play settings, and user-specified application icons 552*a*, 552*b*, 552*c*, 552*d*. As shown in FIG. 5R, settings icons 547*a*, 547*b*, 547*c*, 547*d*, 547*e* are displayed in a first portion (or region) of settings panel 546, brightness adjustment control 548 are displayed in a second portion (or region) of settings panel 546 beneath the first portion, audio control icons 549 are displayed in a third portion (or region) of settings panel 546 beneath the second portion, sharing status indicator 550 and remote media control indicator 551 are displayed in a fourth portion (or region) of settings panel 546 beneath the third portion, and user-specified application icons 552*a*, 552*b*, 552*c*, 552*d* are displayed in a fifth portion (or region) of settings panel 546 beneath the fourth portion. Some embodiments display these items or portions in another arrangement.

Figure 5S:
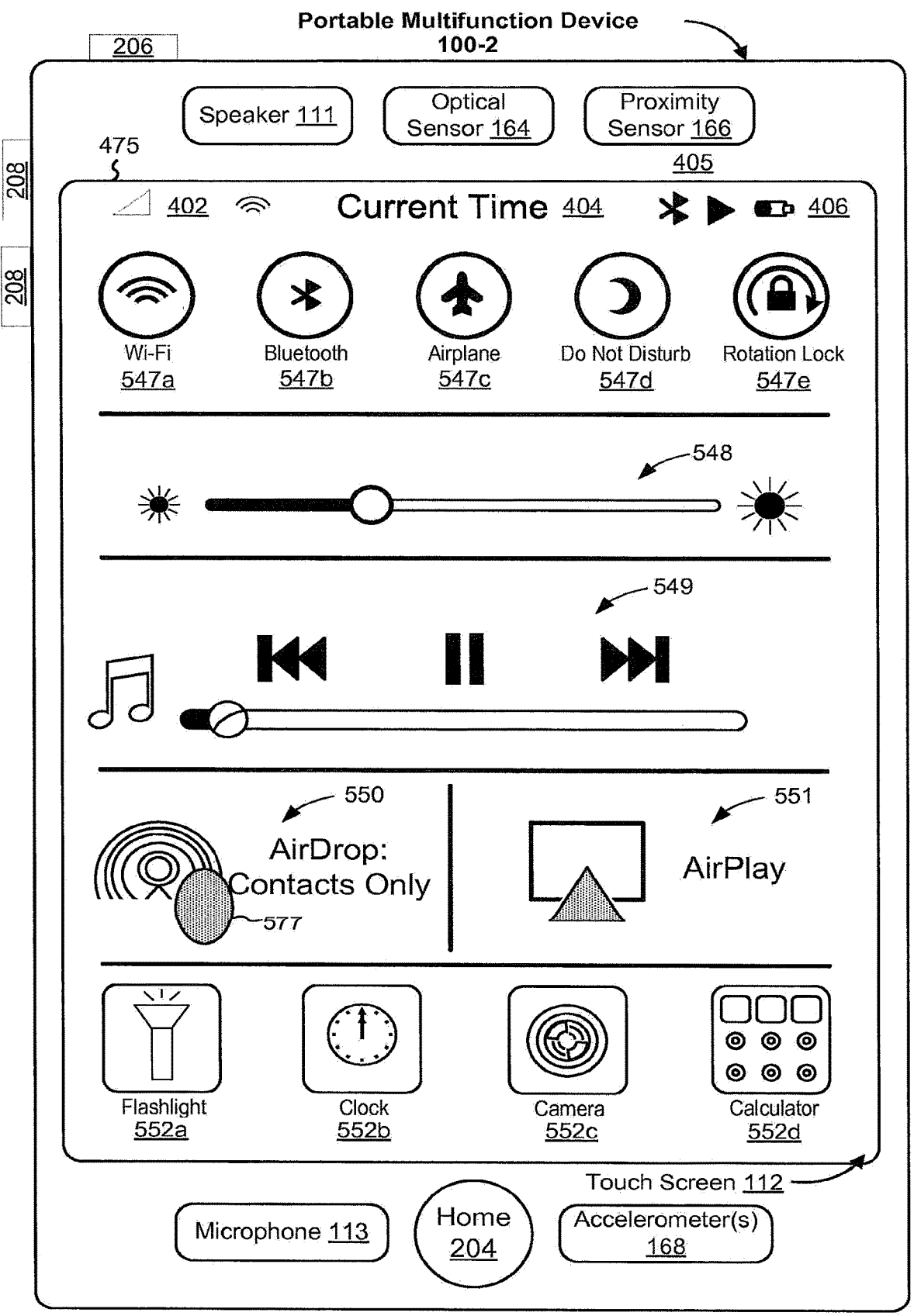

FIG. 5S illustrates displaying a settings interface on user interface 475 including one or more settings icons in response to the swipe gesture detected in FIG. 5Q. In FIG. 5S, settings icons 547*a*, 546*b*, 547*c*, 547*d*, 547*e*, brightness adjustment control 548, audio control icons 549, sharing status indicator 550 and remote media control indicator 551, and user-specified application icons 552*a*, 552*b*, 552*c*, 552*d* are displayed in user interface 400 of touch screen 112 without settings panel 546. FIG. 5S also illustrates detecting contact 577 (e.g., a tap gesture) over sharing status indicator 550 on touch screen 112. In FIG. 5S, sharing status indicator 550 displays text indicating that the sharing functionality is currently in a "contacts only" sharing mode.

Figure 5T:
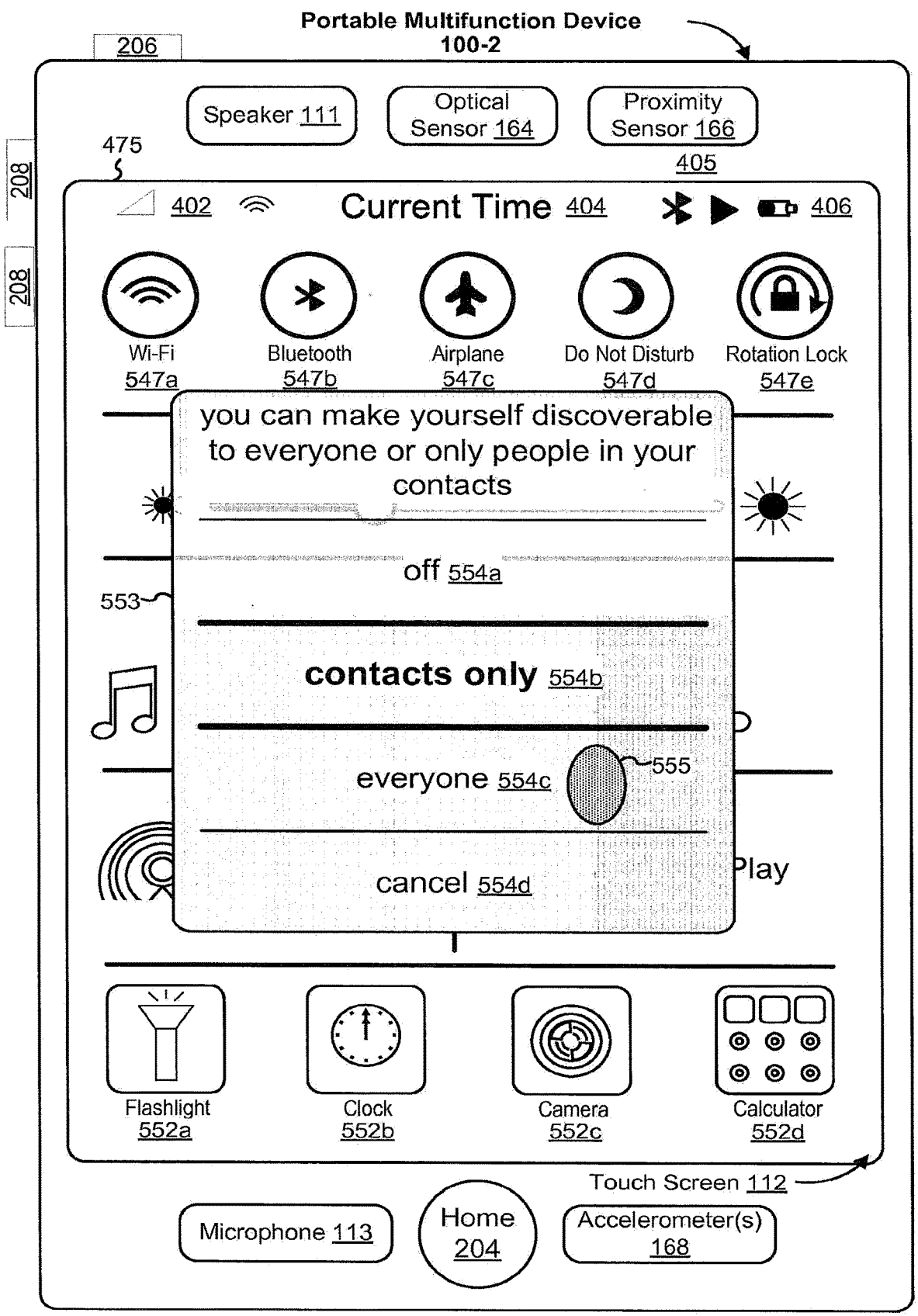

FIG. 5T illustrates displaying discoverability interface 553 in response to detecting contact 577 in FIG. 5S. In FIG. 5T, discoverability interface 553 includes one or more options for adjusting the discoverability (or availability) device 100-2 for the sharing functionality. In FIG. 5T, discoverability interface 553 includes "off" affordance 554*a*, which, when activated, causes the device to disable the sharing functionality of device 100-2, a "contacts only" affordance 553*b*, which, when activated, causes the device to enable device 100-2 to be available for sharing with only contacts (e.g., the user of device 100-2's address book or a specified list of contacts associated with the sharing functionality) within "sharing range" of device 100-2, "everyone" affordance 553*c*, which, when activated, causes the device to enable device 100-2 to be available for sharing with everyone (e.g., all users with a compatible sharing functionality enabled on their respective device) within "sharing range" of device 100-2, and "cancel" affordance 553*d*, which, when activated, causes the device to dismiss discoverability interface 553. FIG. 5T also illustrates detecting selection of "everyone" affordance 553*c* with contact 555 (e.g., a tap gesture) on touch screen 112.

Figure 5U:
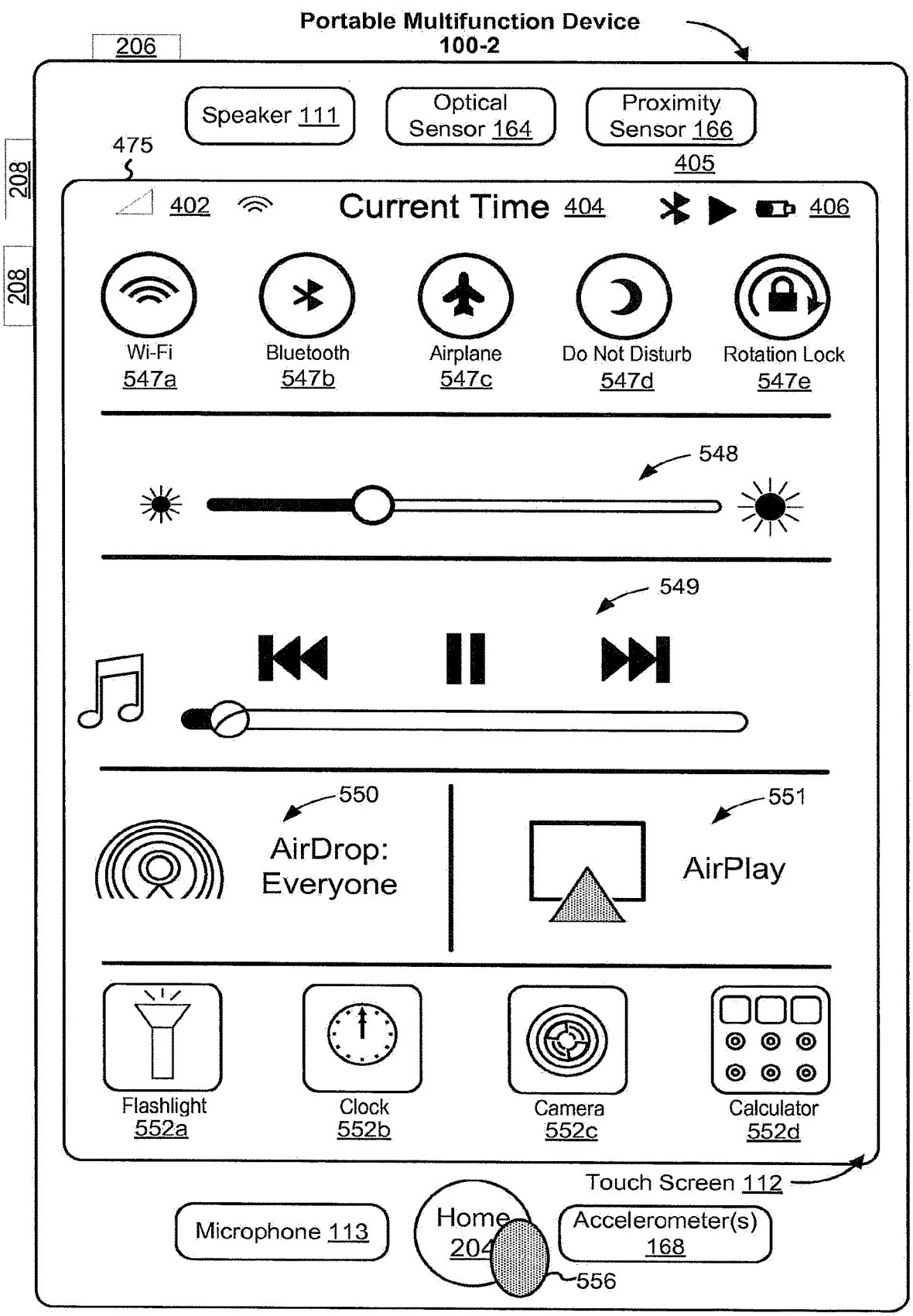

FIG. 5U displays user interface 475 on touch screen 112 including one or more settings icons. In FIG. 5U, sharing status indicator 550 displays text indicating that the sharing functionality is currently in an "everyone" sharing mode in response to selection of "everyone" affordance 553*c* in FIG. 5T. FIG. 5U also illustrates detecting contact 556 (e.g., a tap or press gesture) over home button 204 on touch screen 112.

Figure 5V:
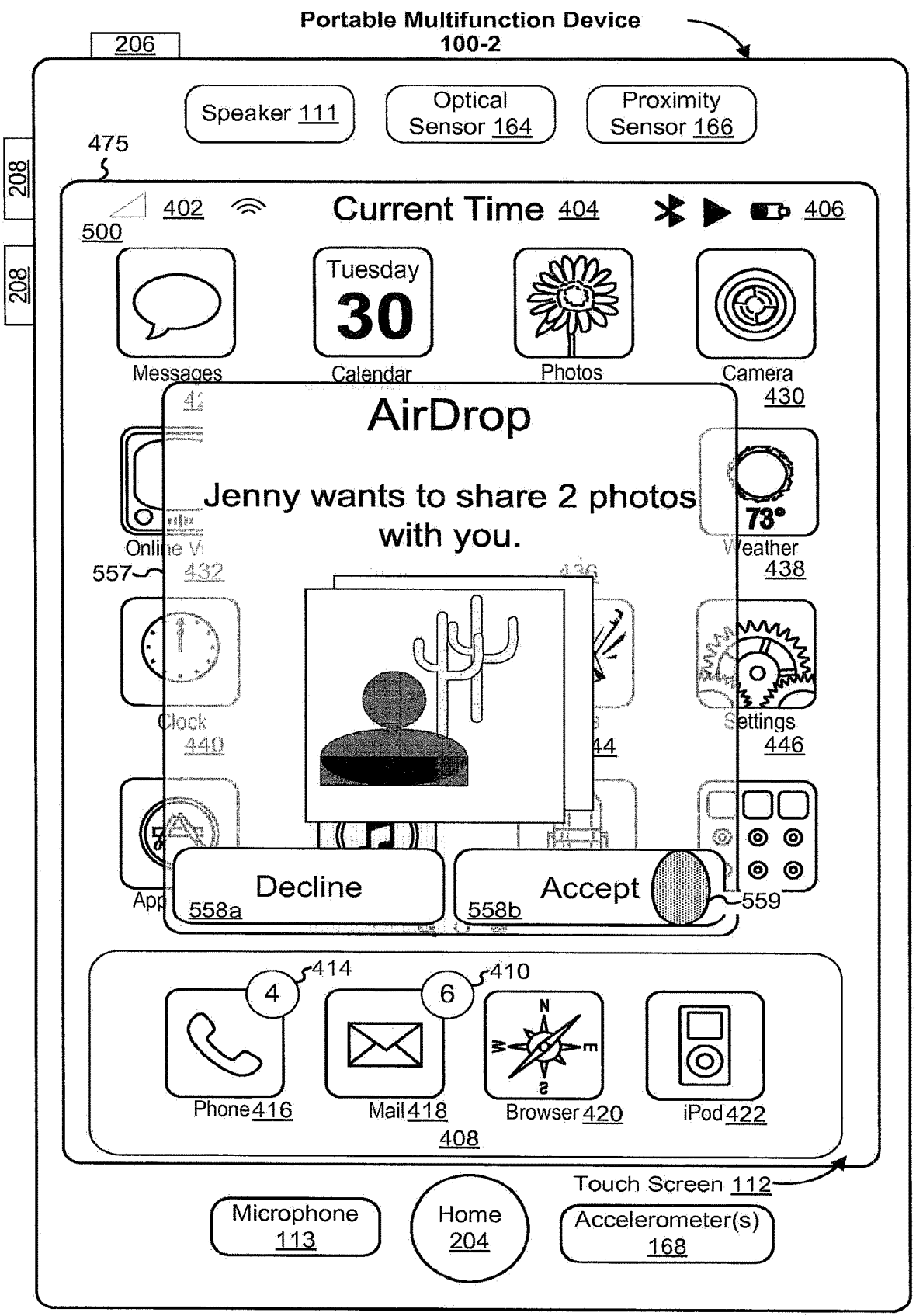

FIG. 5V illustrates displaying home screen 500 on user interface 475 in response to detecting contact 556 in FIG. 5U. FIG. 5V also illustrates displaying sharing confirmation dialog 557 over home screen 500 on user interface 475 in response to receiving a sharing request from a user (e.g., Jenny associated with device 100-1) different from the user (e.g., C. Cheung) of device 100-2. In FIG. 5V, sharing confirmation dialog 557 includes text indicating that a user different from the user of device 100-2 (e.g., a user named Jenny associated with device 100-1) is sharing two photographs with the user of device 100-2 (e.g., named C. Cheung), a preview of the shared content, and a plurality of options for responding to the sharing request. In some embodiments, the preview of the shared content is a thumbnail of the shared content generated on the sender's device and sent to the recipient in advance of transferring the file corresponding to the thumbnail. In some embodiments, the preview of the shared content is generated at the recipient's device based on content that started to be transferred to the recipient's device even before the recipient had a chance to respond to the sharing notification (e.g., by accepting or declining the sharing request). In FIG. 5V, the plurality of options for responding to the sharing request includes "decline" affordance 558a, which, when activated, causes the device to decline the sharing request and "accept" affordance 558b, which, when activated, causes the device to accept the sharing request. In some embodiments, portions of home screen 500 that are visible when sharing confirmation dialog 557 is displayed are blurred, shaded, or otherwise made visually less distinct. In some embodiments, where sharing confirmation dialog 557 occupies less than all of touch screen 112, the areas that are not occupied by sharing confirmation dialog 557 are blank (e.g., no graphics, icons, wallpaper, etc., of the home screen 500 are displayed in those areas).

In some embodiments, in response to selection of "decline" affordance 558a, device 100-2 aborts one or more downloads associated with the sharing request and deletes any portion of a download associated with the sharing request. In some embodiments, in response to selection of "accept" affordance 558b, device 100-2 joins an ad hoc WiFi network established by the device associated with the sharing request (e.g., device 100-1) and downloads the content associated with the sharing request from the device associated with initiating the sharing request (e.g., device 100-1) over the ad hoc WiFi network. In some other embodiments, in response to selection of "accept" affordance 558b, device 100-2 creates an ad hoc WiFi network and downloads the content associated with the sharing request from the device associated with initiating the sharing request (e.g., device 100-1) over the ad hoc WiFi network. In some embodiments, the ad hoc WiFi network is established before the user has an opportunity to respond to the sharing request (e.g., after the sharing user initiates the sharing request but before the receiving user responds to the sharing request).

In FIG. 5V, for example, sharing confirmation dialog 557 is displayed on touch screen 112 of device 100-2 associated with C. Cheung, in response to a request from the user (e.g., named Jenny) of device 100-1 to share two photographs (e.g., selected as the content to be shared by Jenny in FIG. 5D) with C. Cheung (e.g., selected as the recipient by Jenny in FIG. 5G). FIG. 5V further illustrates detecting selection of "accept" affordance 558b with contact 559 on touch screen 112.

Figure 5W:
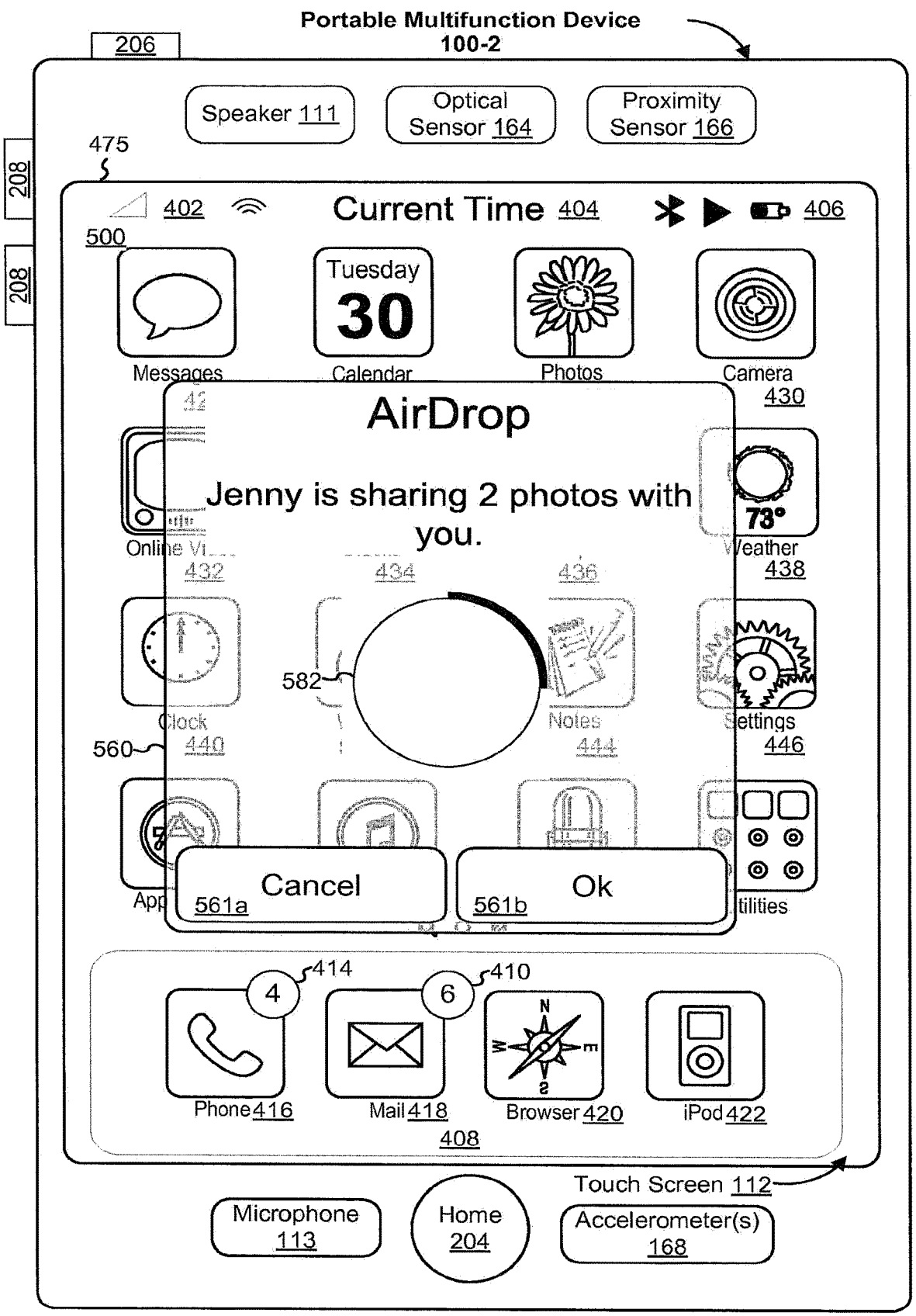

FIG. 5W illustrates displaying download progress dialog 560 on user interface 475 in response to detecting selection of "accept" affordance 558b in FIG. 5V. In FIG. 5W, download progress dialog 560 includes a progress indicator 582 (e.g., a circle) indicating the download progress (e.g., a percentage) of the shared content. In FIG. 5W, for example, approximately 25% of the perimeter of progress indicator 582 is darkened or shaded. In this example, the darkened portion of the perimeter progress indicator 582 indicates that the download of the shared content is approximately 25% complete. In FIG. 5W, download progress dialog 560 also includes "cancel" affordance 561a, which, when activated, causes the device to abort the download of the shared content and "ok" affordance 561b, which, when activated, causes the device to dismiss download progress dialog 560.

Figure 5X:
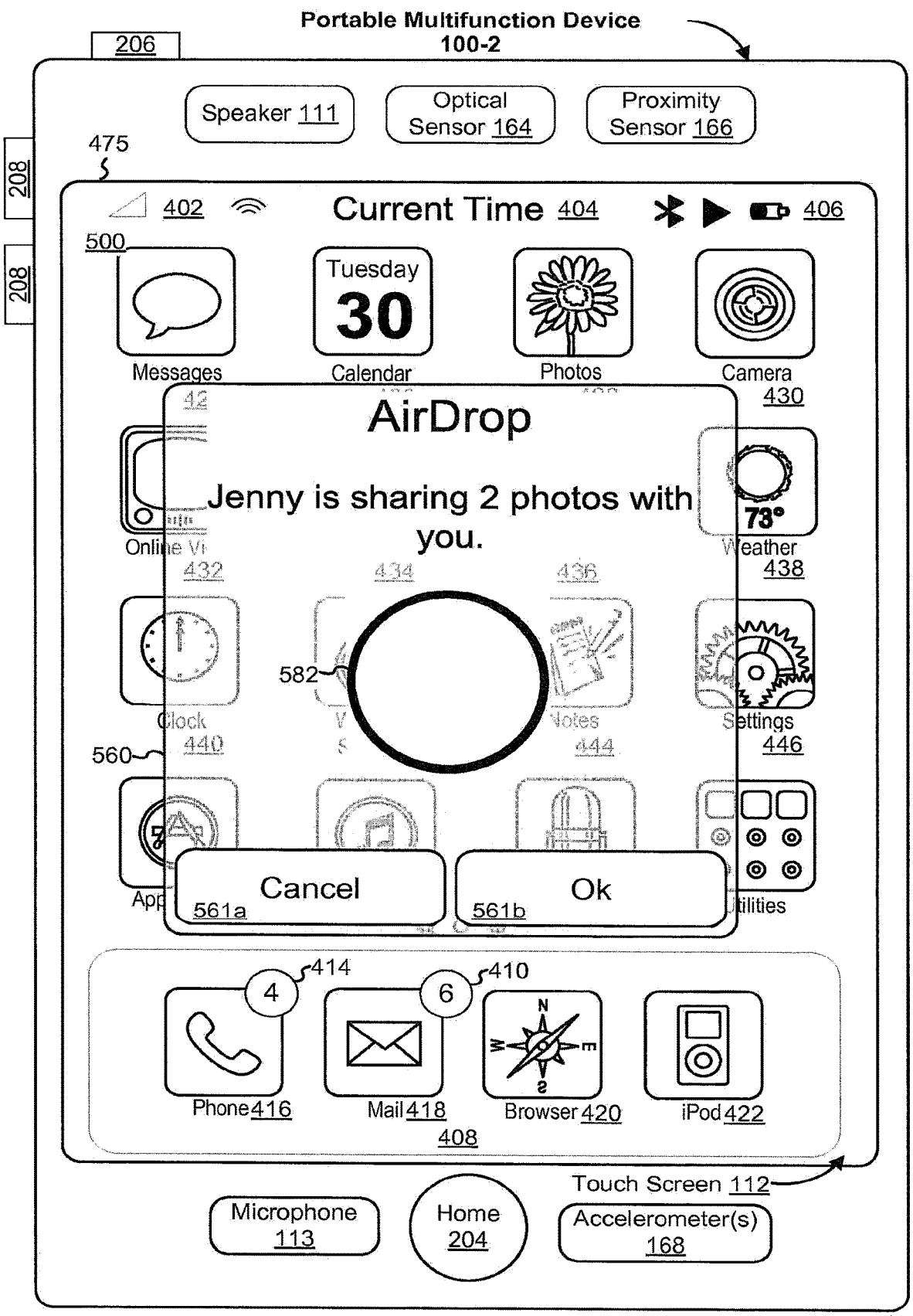

FIG. 5X illustrates displaying download progress dialog 560 on user interface 475. In FIG. 5X, progress indicator 582 displayed in download progress dialog 560 indicates that the download of the shared content is complete. In FIG. 5X, for example, download progress dialog 560 displays the circle with 100% of its perimeter darkened or shaded.

Figure 5Y:
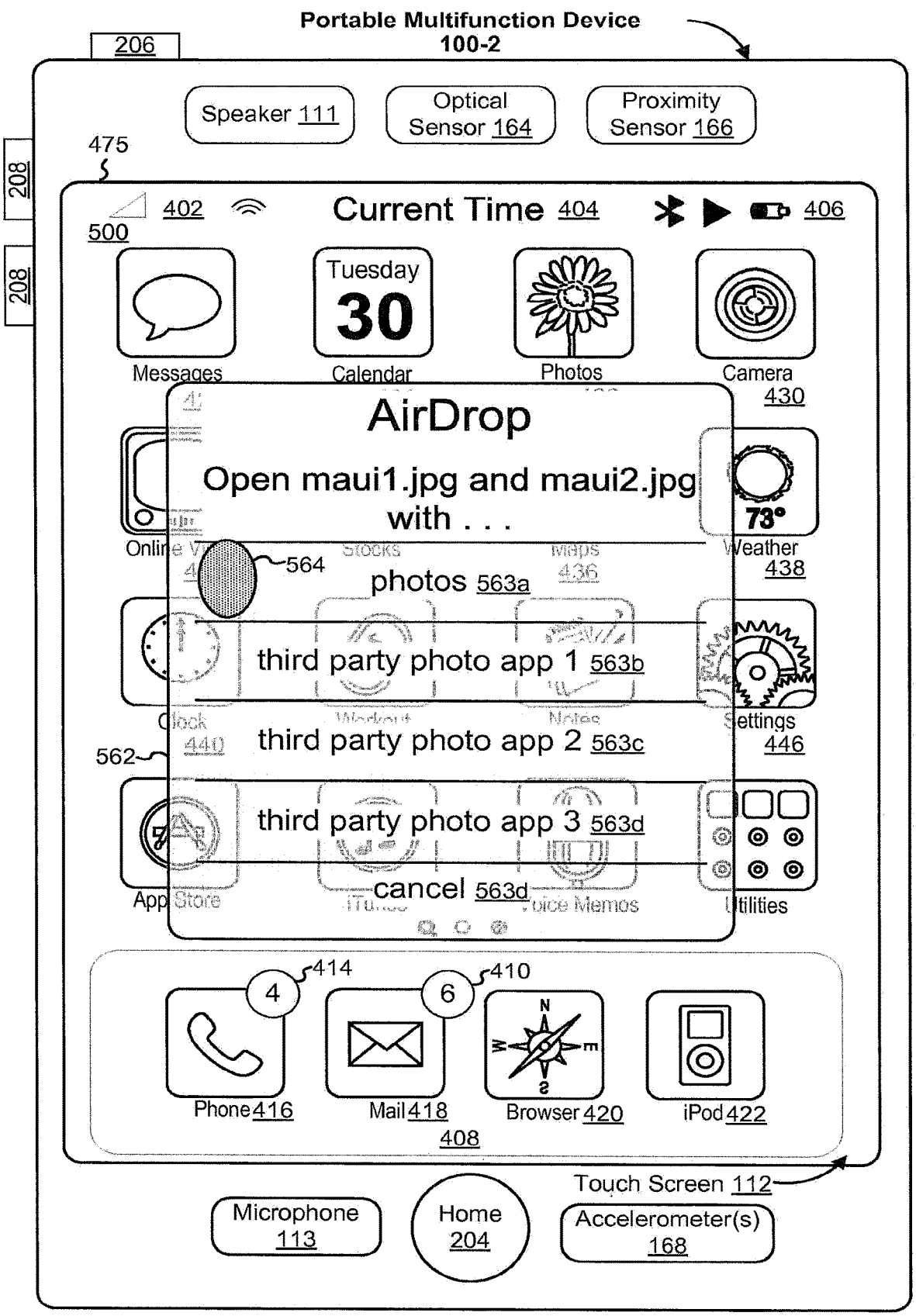

FIG. 5Y illustrates displaying application-selection interface 562 on user interface 475 in response to completion of downloading the shared content. In FIG. 5Y, application-selection interface 562 includes affordances 563 for selecting a respective application in which to present (or launch) the shared content from a plurality of applications compatible with the shared content. In FIG. 5Y, for example, application-selection interface 562 includes a "photos" affordance 563a, which, when activated, causes the device to present the shared content in the photos application, a "third party photo app 1" affordance 563b, which, when activated, causes the device to present the shared content in third party photo application 1, a "third party photo app 2" affordance 563c, which, when activated, causes the device to present the shared content in third party photo application 2, and a "third party photo app 3" affordance 563d, which, when activated, causes the device to present the shared content in third party photo application 3. FIG. 5Y also illustrates selection of "Photos" affordance 563a with contact 564 on touch screen 112. In some embodiments, application-selection interface 562 is displayed in user interface 475 the first time a file type is downloaded, and, thereafter, downloads of the same file type use the application selected the first time the file type was downloaded.

Figure 5Z:
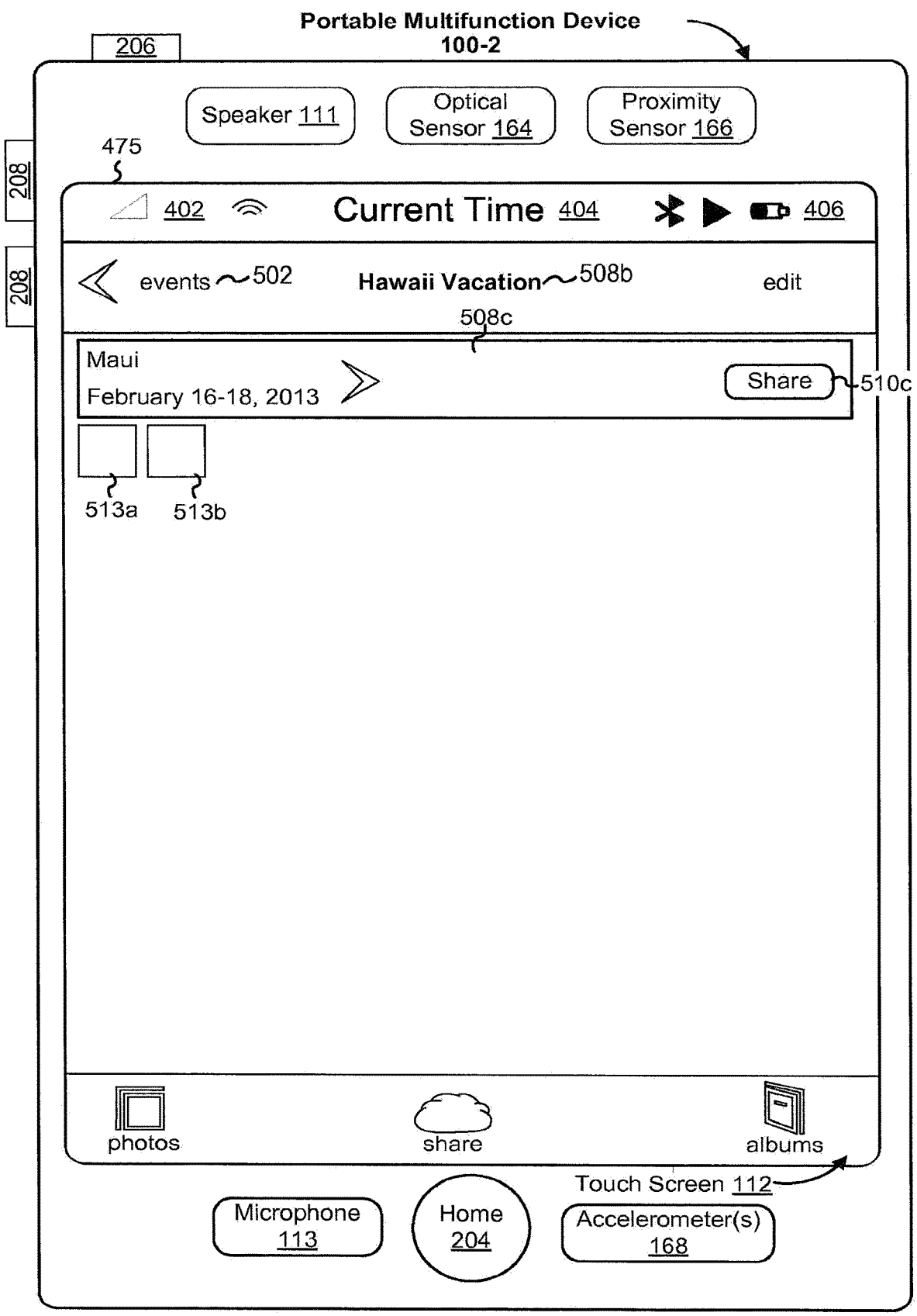
Figure 5A:
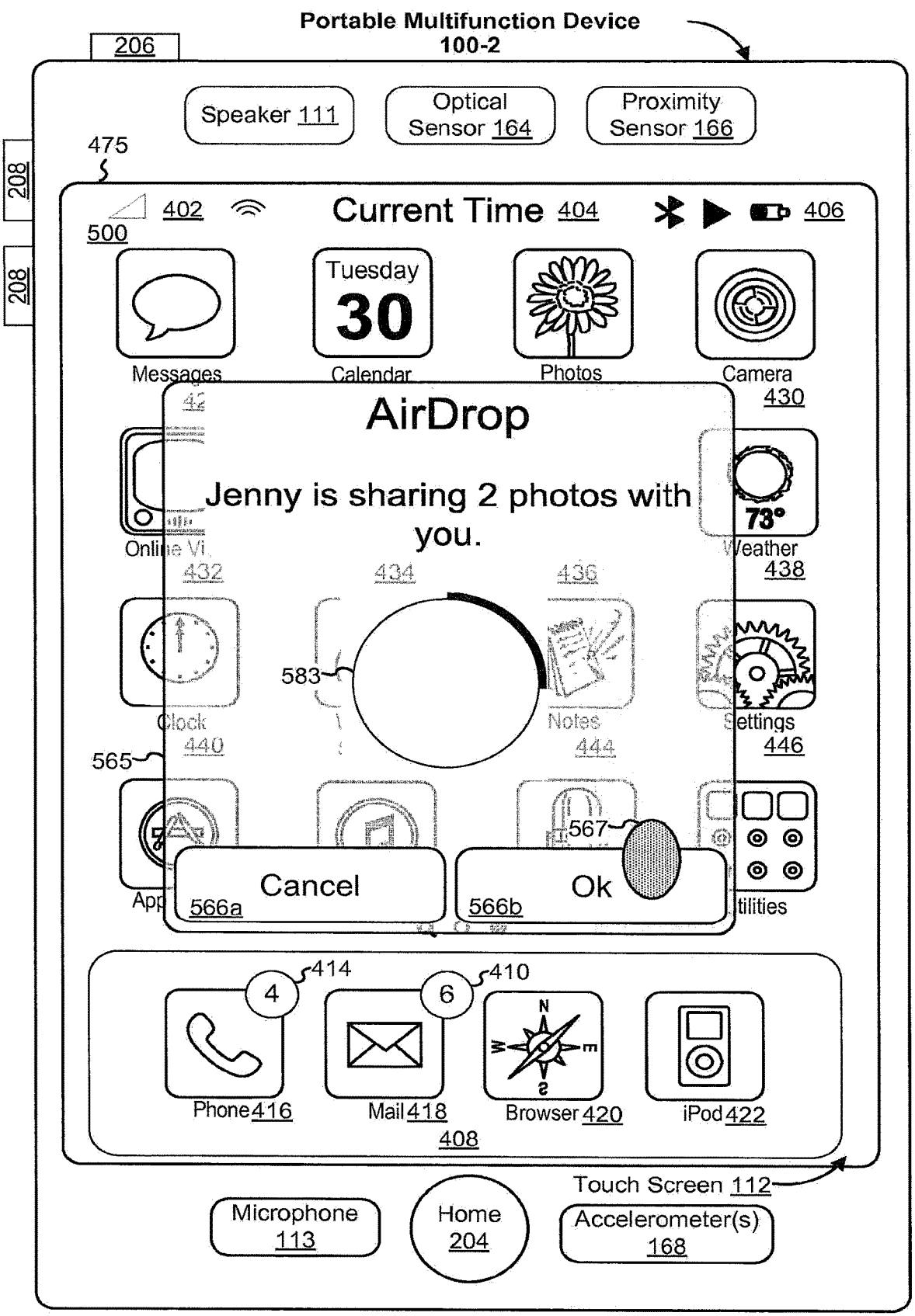
Figure 5B:
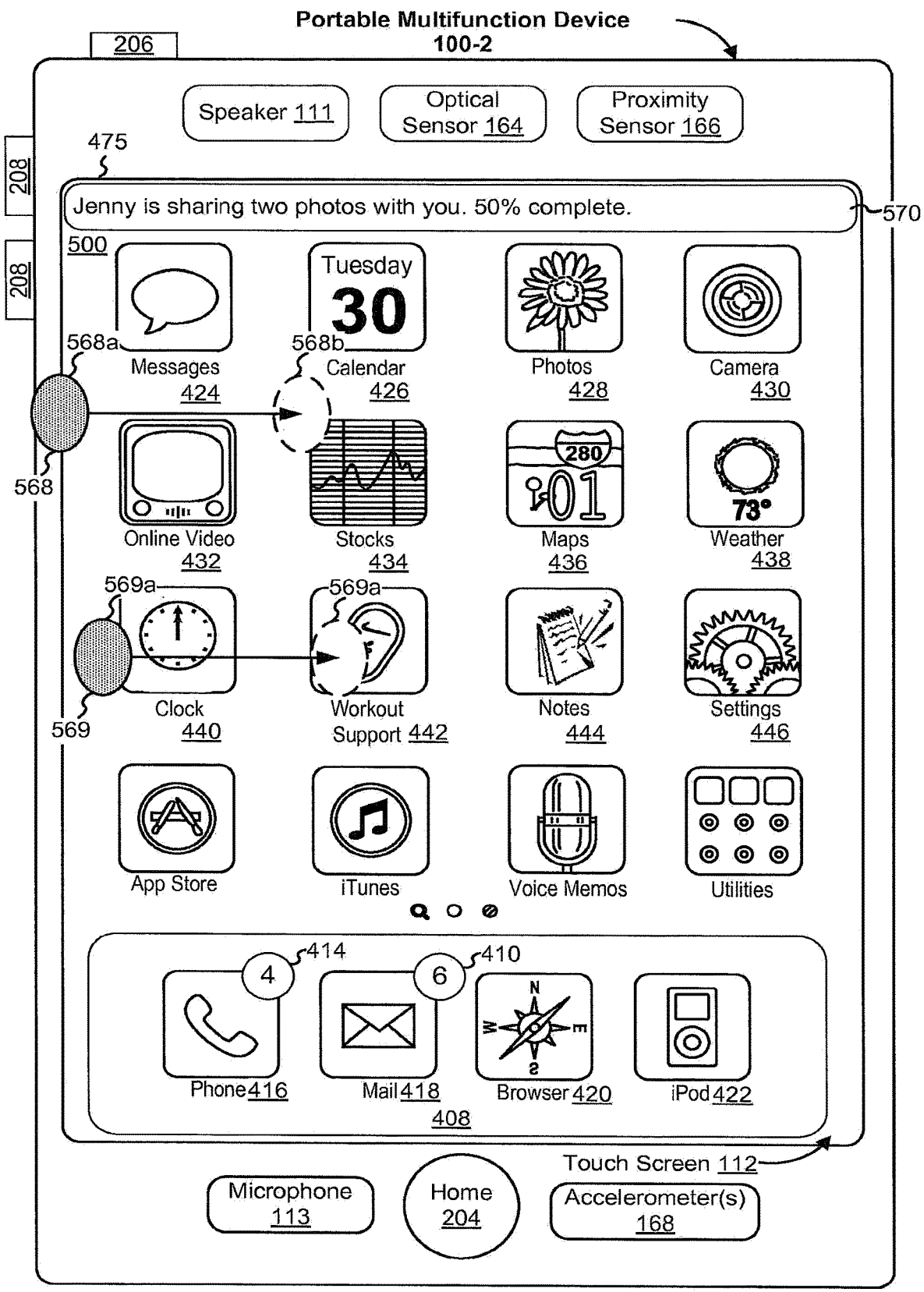
Figure 5C:
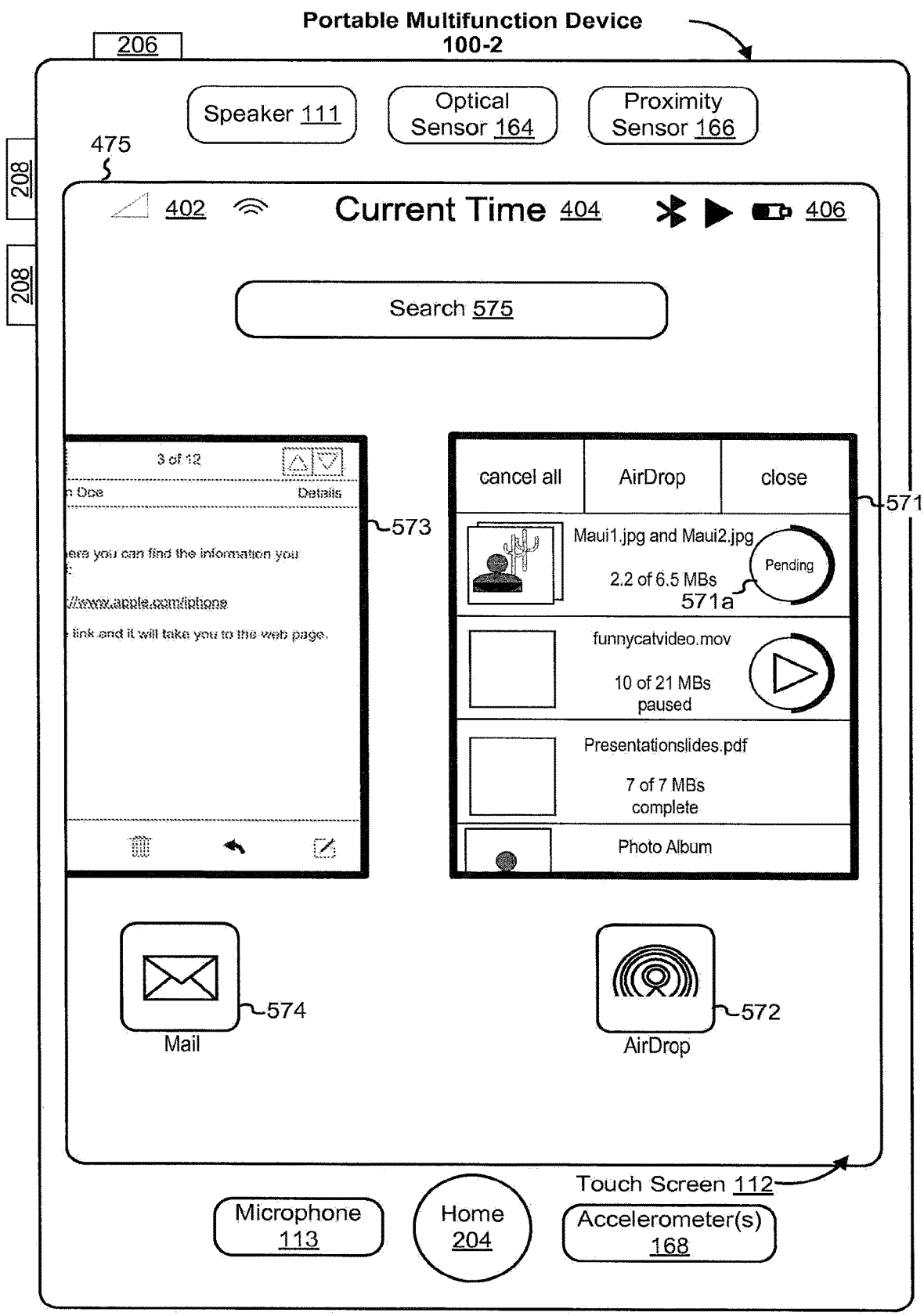
Figure 5D:
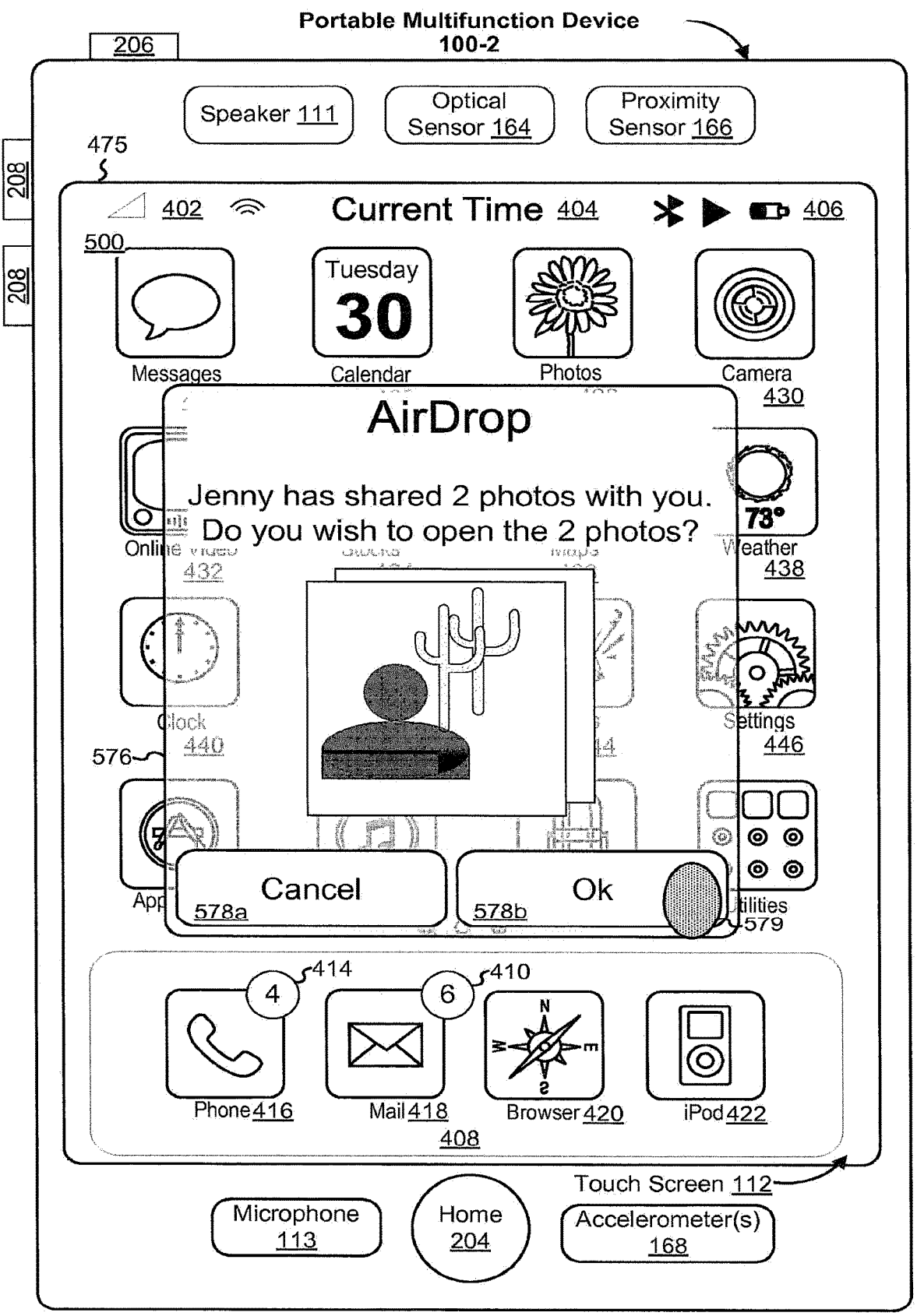
Figure 5E:
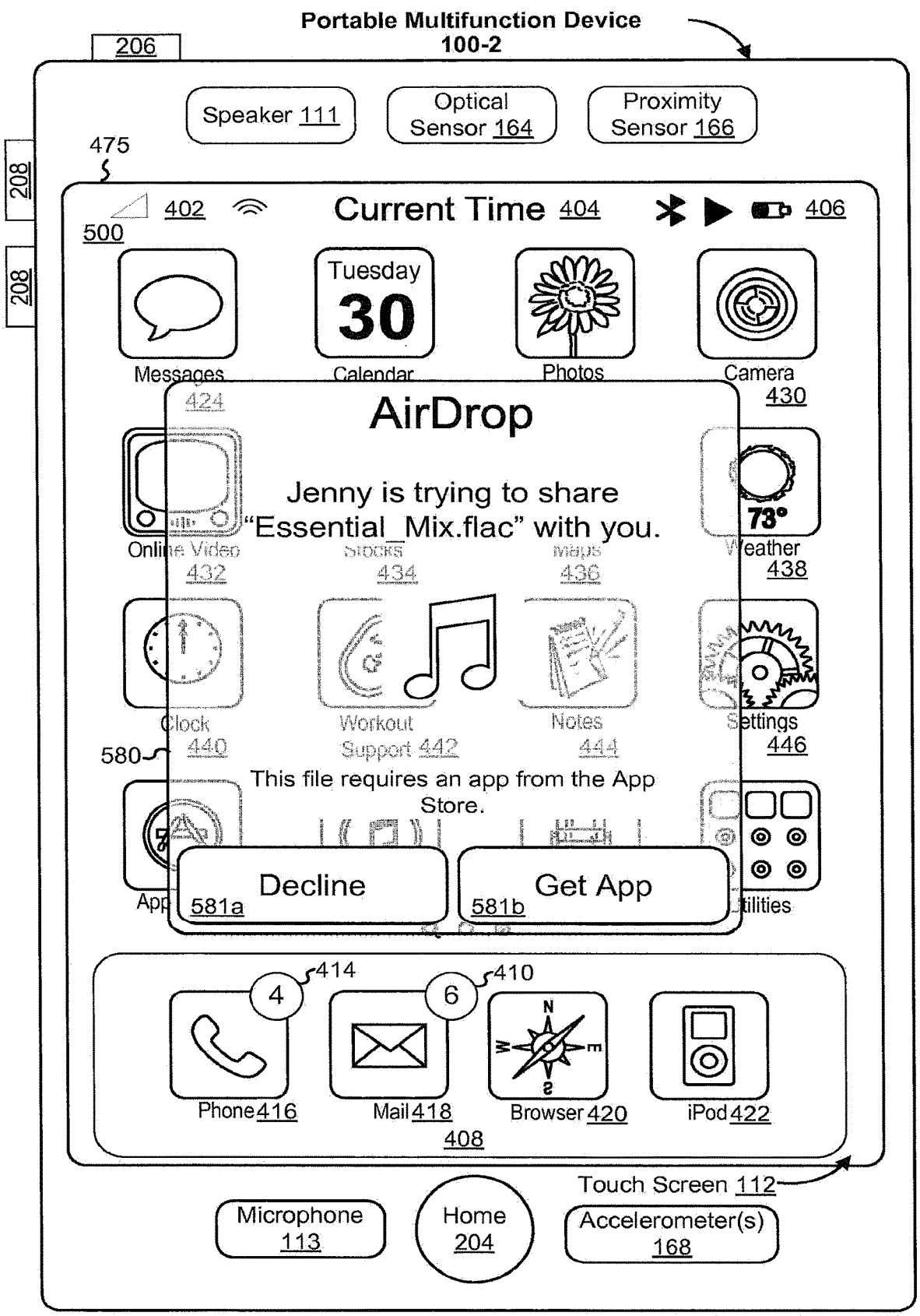
Figure 6A:
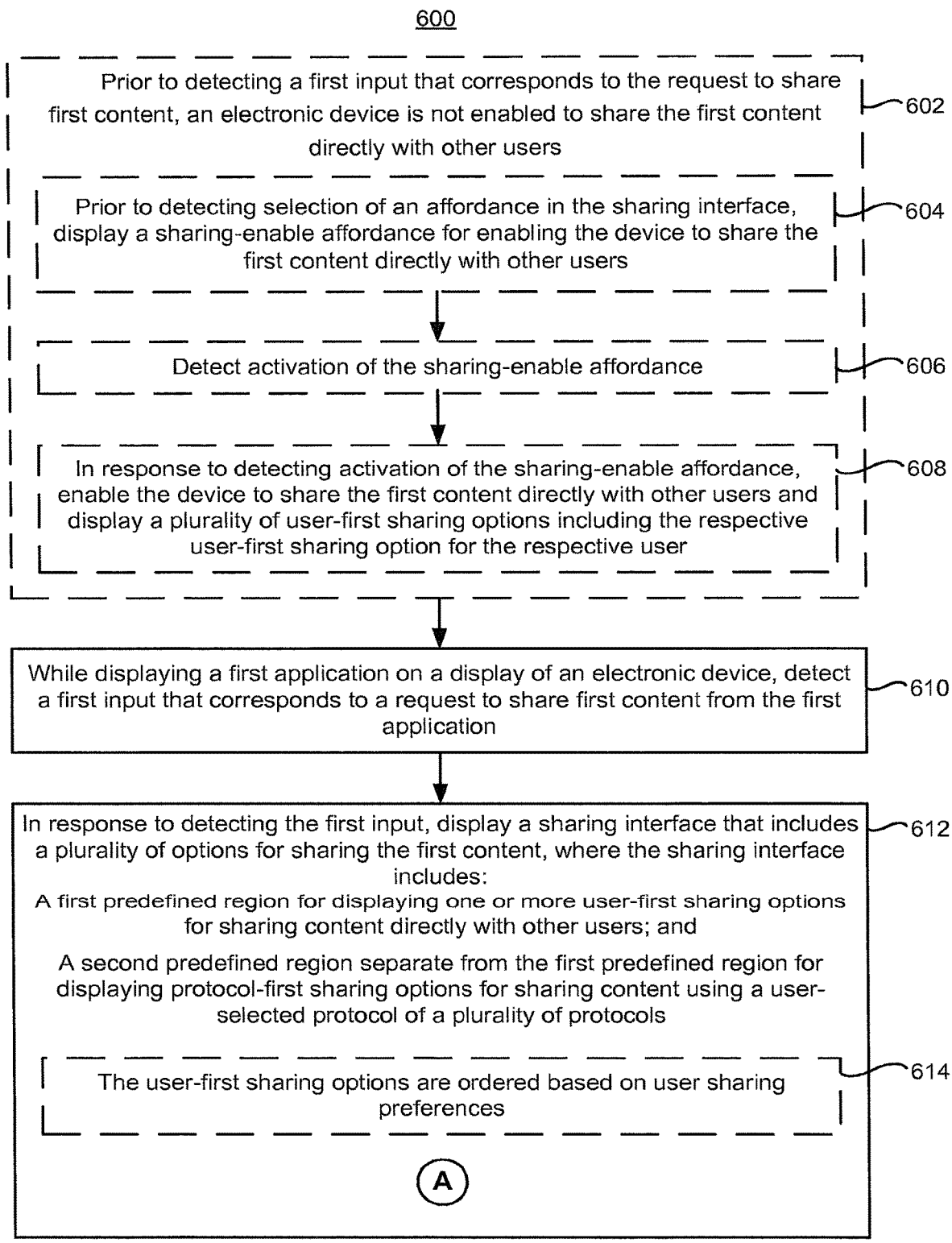
Figure 6C:
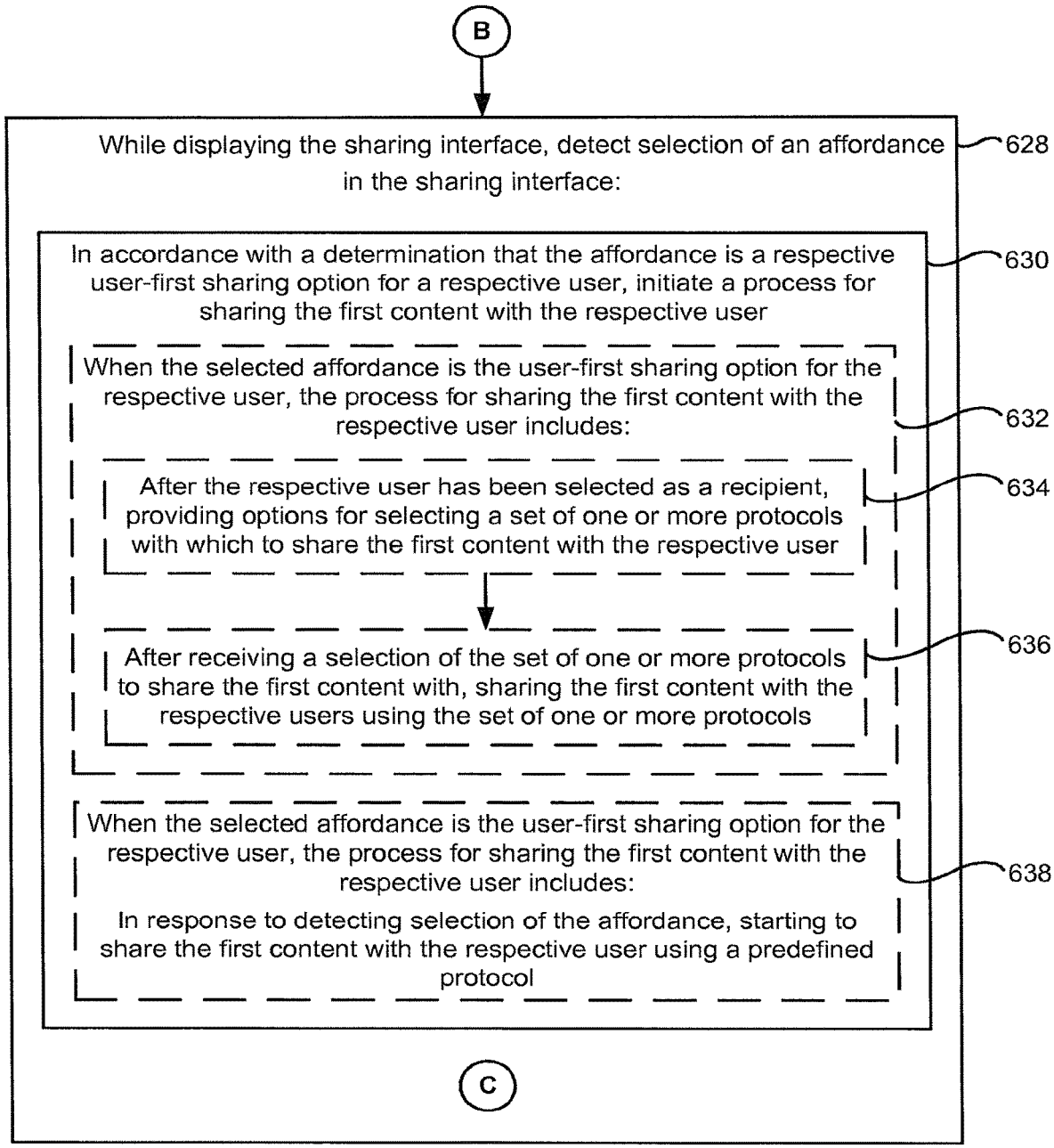
Figure 6D:
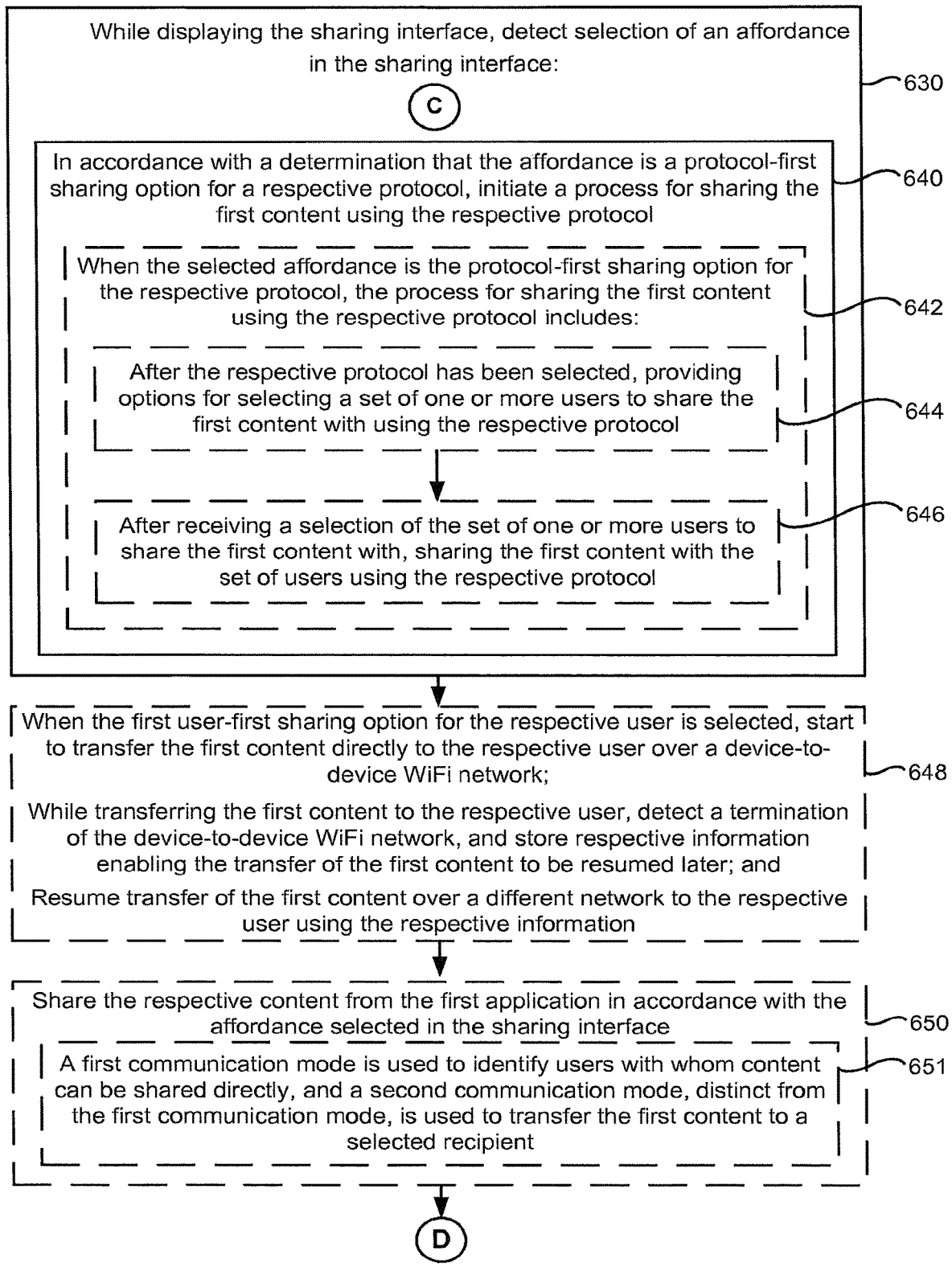
Figure 6E:
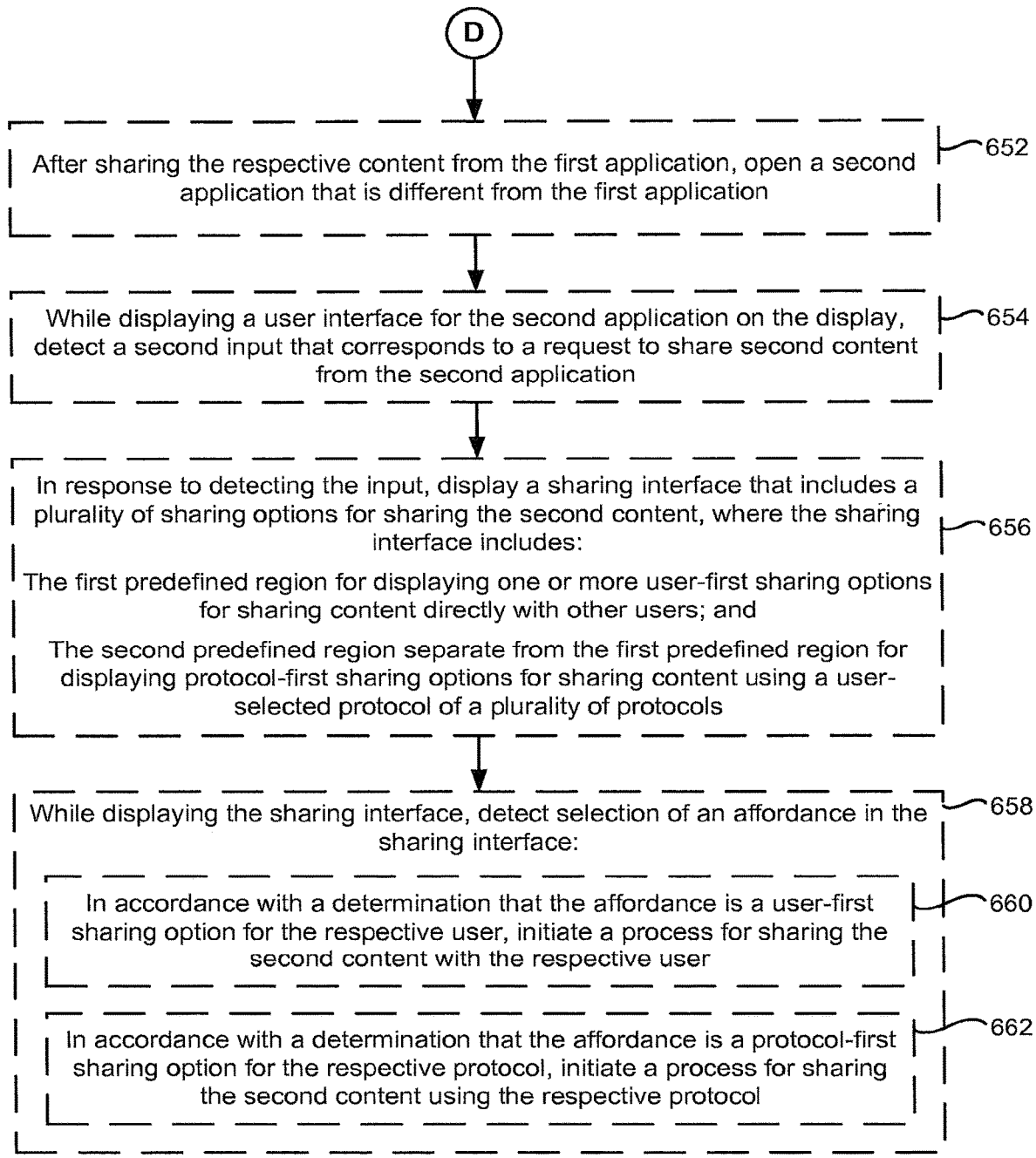

FIG. 5Z illustrates displaying event 504b entitled "Hawaii Vacation" on user interface 475 within the photos application in response to detecting selection of "photos" affordance 563a in FIG. 5Y. In FIG. 5Z, event 504b includes sub-event 508c associated with the location (e.g., Maui) and dates (e.g., Feb. 16-18, 2013) of the content (e.g., photographs 513a and 513b selected by Jenny in FIG. 5D) shared by the user (e.g., named Jenny) of device 100-1.

FIG. 5AA illustrates displaying download progress dialog 565 on user interface 475 in response to detecting selection of "accept" affordance 558b in FIG. 5V. In FIG. 5AA, download progress dialog 565 includes a progress indicator 583 (e.g., a circle) indicating the download progress (e.g., percentage) of the shared content. In FIG. 5AA, for example, approximately 25% of the perimeter of progress indicator 583 is darkened or shaded. In this example, the darkened portion of the perimeter progress indicator 583 indicates that the download of the shared content is approximately 25% complete. In FIG. 5AA, download progress dialog 565 also includes "cancel" affordance 566a, which, when activated, causes the device to abort the download of the shared content and "ok" affordance 566b, which, when activated, causes the device to dismiss download progress dialog 565. FIG. 5AA also illustrates detecting selection of "ok" affordance 566b with contact 567 on touch screen 112.

FIG. 5BB illustrates displaying home screen 500 on user interface 475 in response to selection of "ok" affordance 566b in FIG. 5AA. In FIG. 5BB, user interface 475 includes a notification 570 near the top of touch screen 112 indicating that Jenny (e.g., the user of device 100-1) is sharing two photographs with the user of device 100-2 (e.g., C. Cheung) and that the download is 50% complete. FIG. 5BB also illustrates detecting a left to right swipe gesture with contact 568 from position 568a to position 568b on touch screen 112. In FIG. 5BB, the left to right swipe gesture with contact 568 is an edge gesture (e.g., it originates from an edge of touch screen 112 and/or a contact with both a touch-sensitive portion of the device 100-2 and a non-touch-sensitive portion of the device 100-2). FIG. 5BB further illustrates detecting a left to right swipe gesture with contact 569 from position 569a to position 569b on touch screen 112. In FIG.

5BB, the left to right swipe gesture with contact 569 is a non-edge gesture (e.g., it originates from a contact "within" the touch screen 112 or "away from" an edge of touch screen 112). In some embodiments, either of the left to right swipe gestures illustrated in FIG. 5BB (e.g., the edge gesture with contact 568 or the non-edge gesture with contact 569) cause one or more open applications (and/or other information) to be displayed in user interface 475 of device 100-2. In some embodiments, only one of the left to right swipe gestures illustrated in FIG. 5BB (e.g., the edge gesture with contact 568 or the non-edge gesture with contact 569) causes the one or more open applications to be displayed in user interface 475 of device 100-2. Alternatively, in some embodiments, a right to left swipe gesture (e.g., either an edge swipe gesture or non-edge swipe gesture, or one of an edge swipe gesture or non-edge swipe gesture) cause one or more open applications (and/or other information) to be displayed in user interface 475 of device 100-2.

FIG. 5CC illustrates displaying a multitasking user interface that includes representations of one or more open applications and application icons corresponding to one or more open applications on user interface 475 in response to the left to right swipe gesture detected in FIG. 5BB. In some embodiments, in response to detecting a swipe gesture in a horizontal direction at a location that corresponds to the representations of applications in the multitasking user interface, the device displays additional representations of open application. In some embodiments, in response to detecting activation of a respective representation of a respective open application, a user interface for the respective open application is displayed on the display. In FIG. 5CC, a sharing status region 571 and an associated application icon 572 are displayed in user interface 475. In FIG. 5CC, sharing status region 571 includes a progress indicator 571a associated with the content (e.g., two photographs) being shared by the user (e.g., Jenny) of device 100-1 and a plurality of previously shared (or downloaded) content items. In some embodiments, the user can pause, resume and view downloads by interacting with sharing status region 571 (e.g., by tapping on progress indicator 571a). In some embodiments, in response to detecting activation of sharing status region 571 (e.g., detecting a tap input at a location that corresponds to sharing status region 571), the device displays a sharing status application (e.g., as a full screen application) in which the status of previously shared items is displayed. In FIG. 5CC, a portion of a representation 572 of an email application and an application icon 573 that corresponds to the email application are displayed in user interface 475. In FIG. 5CC, user interface 475 also includes search query box 574 for entering search terms for use in searching the one or more open applications. In FIG. 5CC, user interface 475 including the one or more open applications is scrollable by way of a horizontal swipe gesture.

FIG. 5DD illustrates displaying a notification interface 576 on user interface 475 in response to completion of downloading the shared content. In FIG. 5DD, notification interface 576 includes text indicating that the download of the shared content is complete, text prompting the user of device 100-2 to open the shared content, and a preview of the shared content. In FIG. 5DD, notification interface 576 also includes "cancel" affordance 578a, which, when activated, causes the device to dismiss notification interface 576 and "ok" affordance 578b, which, when activated, causes the device to present (or open) the shared content in a compatible application. FIG. 5DD also illustrates detecting selection of "ok" affordance 578b with contact 579. For example, in response detecting selection of "ok" affordance 578b in FIG. 5DD, event 504b entitled "Hawaii Vacation" (e.g., including photographs 513a and 513b selected by the user of device 100-1 in FIG. 5D) within a photos application is displayed in user interface 475 as shown in FIG. 5Z.

FIG. 5EE illustrates displaying installation prompt dialog 580 on user interface 475 in response to receiving a sharing request from a user (e.g., Jenny associated with device 100-1) different from the user of device 100-2. In FIG. 5EE, installation prompt dialog 580 includes text indicating that a user different from the user of device 100-2 (e.g., a user named Jenny associated with device 100-1) is attempting to share an audio file (e.g., a file entitled "Essential_Mix.flac") with the user of device 100-2 (e.g., named C. Cheung) and text prompting the user of device 100-2 to download or install an application that is compatible with the audio file. In FIG. 5EE, installation prompt dialog 580 also includes a preview of the shared audio file (e.g., album art or an album cover) and a plurality of options for responding to the sharing request. In FIG. 5EE, the plurality of options for responding to the sharing request includes "decline" affordance 581a, which, when activated, causes the device to decline the sharing request and "get app" affordance 581, which, when activated, causes the device to display an application marketplace (or application store) with a plurality of applications that are compatible with the audio file.

FIGS. 6A-6E are flow diagrams illustrating a method 600 of sharing content from a respective application in accordance with some embodiments. Method 600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. In some embodiments, method 600 is performed at portable multifunction device 100-1 (sometimes also herein called "device 100-1") associated with a user named Jenny. Some operations in method 600 are, optionally, combined and/or the order of some operations is, optionally, changed.

As described below, method 600 provides an intuitive way to share content from a respective application. The method reduces the cognitive burden on a user when sharing content from a respective application, thereby creating a more efficient human-machine interface. For battery-operated electronic devices, enabling a user to share content from a respective application faster and more efficiently conserves power and increases the time between battery charges.

In some embodiments, prior to detecting the first input that corresponds to the request to share the first content, the device is not enabled (602) to share the first content directly with other users. In some embodiments, a respective device is enabled to share content directly with other devices when both the respective device's Bluetooth and WiFi capabilities are enabled. In FIG. 5E, for example, sharing enable affordance 520 is displayed in first region 519a of sharing interface 518 in place of one or more user-first sharing options 524 (e.g., shown in first region 519a of sharing interface 518 in FIG. 5F) because device 100-1 is not currently enabled to share content directly with one or more other devices (e.g., the Bluetooth and WiFi capabilities of device 100-1 are not enabled).

In some embodiments, prior to detecting selection of the affordance in the sharing interface, the device displays (604) a sharing-enable affordance for enabling the device to share the first content directly with other users. FIG. 5E, for example, shows sharing enable affordance 520 displayed in first region 519a of sharing interface 518. In some embodiments, sharing enable affordance 520 configured to turn on device 100-1's Bluetooth and WiFi capabilities.

In some embodiments, the device detects (606) activation of the sharing-enable affordance. FIG. 5E, for example, shows device 100-1 detecting a slide gesture over affordance 520 with contact 515 moving from position 515a to position 515a on touch screen 112 enabling device 100-1 to share content with other users.

In some embodiments, in response to detecting activation of the sharing-enable affordance, the device is enabled to share (608) the first content directly with other users and displaying a plurality of user-first sharing options including the respective user-first sharing option for the respective user. In some embodiments, enabling the device to share the first content directly with other users includes enabling communication using multiple distinct communication modes (e.g., Bluetooth and WiFi are both turned on in response to detecting the activation of the direct-sharing affordance or if either Bluetooth or WiFi is already turned on, then the other communication mode is turned on in response to detecting activation of the sharing-enable affordance). FIG. 5F, for example, shows device 100-1 displaying first region 519a of sharing interface 518 including one or more user-first sharing options 524 in response to detecting the slide gesture in FIG. 5E.

While displaying a first application on a display, the device detects (610) a first input that corresponds to a request to share first content (e.g., pictures, documents, uniform resource locators (URLs), videos and other content) from the first application. FIG. 5C, for example, shows device 100-1 detecting contact 511 (e.g., a tap gesture) selecting representation 513a (e.g., a photograph) and contact 512 (e.g., a tap gesture) selecting representation 513b (e.g., a photograph) in a photos application. FIG. 5D, for example, shows device 100-1 detecting selection of "share" affordance 517 contact 514 (e.g., a tap gesture) to share selected photographs 513a and 513b.

In response to detecting the first input, the device displays (612) a sharing interface that includes a plurality of options for sharing the first content, where the sharing interface includes: a first predefined region for displaying one or more user-first sharing options (e.g., user-centric sharing options where the device first provides options for selecting another user to share the first content via a preselected or later-selected communication protocol) for sharing content directly with other users; and a second predefined region separate from the first predefined region for displaying protocol-first sharing options (e.g., protocol-centric sharing options where the device first provides options for selecting a protocol with which to share the first content with one or more preselected or later-selected users) for sharing content using a user-selected protocol of a plurality of protocols. In some embodiments, the user-first sharing options are for selecting a single user with which to share the first content. Thus, in some embodiments, multiple sharing operations are needed to share content with multiple users using the user-first sharing options. In some embodiments, sharing the first content using one of the protocol-first sharing options will share the first content with a set of users that have access to content shared using the selected protocol (e.g., a social networking post such as a Facebook® status update or a Tweet®) or initiates a process for generating a message to a user or group of users that will later be specified for the message (e.g., by adding recipients to an email). FIG. 5G, for example, shows device 100-1 displaying sharing interface 518 on user interface 475 in response to detecting selection of "share" affordance 517 in FIG. 5D. In FIG. 5G, sharing interface 518 includes a first region 519a with one or more user first sharing options 524 corresponding to discoverable (or available) users and a second region 519b with one or more protocol-first sharing options 521 corresponding to applications with which to share the selected content.

In some embodiments, the user-first sharing options are ordered (614) based on user sharing preferences. In some embodiments, the sharing preferences are explicit sharing preferences (e.g., individuals that the user of the device has listed as preferred contacts or preferred sharing contacts are listed first, while other users are listed later). In some embodiments, the sharing preferences are implicit sharing preferences (e.g., individuals with whom the user of the device communicates and/or shares more frequently are listed first, while individuals with whom the user of the device communicates and/or shares less frequently are listed later). In FIG. 5F, for example, one or more user-first sharing options 524 are displayed in first region 519a in accordance with a user sharing preference. In FIG. 5F, for example, user J. Smith associated with user-first sharing option 524a is the left-most user-first sharing option in first region 519a because the user of device 100-1 communicates with J. Smith more frequently than other contacts or because the user of device 100-1 has designated J. Smith as a preferred contact.

In some embodiments, the first predefined region includes (616) a first row of icons that represent different users with whom content can be shared directly, and the second predefined region includes a second row of icons that represent different protocols that can be used to share the content. In some embodiments, in response to detecting a scrolling input (e.g., right-to-left swipe gesture) at a location on the touch-sensitive surface that corresponds to the first predefined region, the first row of icons is scrolled in accordance with the scrolling input (e.g., the first row of icons is scrolled from right to left). FIGS. 5F-5G, for example, show scrolling the row of user-first sharing options 524 (e.g., icons corresponding to named users) in first region 519a in response to device 100-1 detecting a right to left swipe gesture within first region 519a with contact 516 moving from position 516a to position 516a on touch screen 112 in FIG. 5F. In some embodiments, in response to detecting a scrolling input (e.g., an down-to-up swipe gesture) at a location on the touch-sensitive surface that corresponds to the first predefined region, the first row of icons is scrolled in accordance with the scrolling input (e.g., the first row of icons is scrolled upward). In some embodiments, user-first sharing options 524 in first region 519a are called "user icons."

In some embodiments, in response to detecting a scrolling input (e.g., right-to-left swipe gesture) at a location on the touch-sensitive surface that corresponds to the second predefined region, the second row of icons is scrolled in accordance with the scrolling input (e.g., the second row of icons is scrolled from right to left). FIGS. 5L-5M, for example, show scrolling the row of protocol-first sharing options 521 (e.g., icons corresponding to applications) in second region 519b in response to device 100-1 detecting a right to left swipe gesture within second region 519b with contact 535 moving from position 535a to position 535a on touch screen 112 in FIG. 5L. In some embodiments, in response to detecting a scrolling input (e.g., an down-to-up swipe gesture) at a location on the touch-sensitive surface that corresponds to the second predefined region, the second row of icons is scrolled in accordance with the scrolling input (e.g., the second row of icons is scrolled upward). In some embodiments, protocol-first sharing options 521 in second region 519*b* are called "protocol icons."

In some embodiments, the device displays (618), in the first predefined region at an edge of the first predefined region, a portion of an icon that represents a respective user without displaying the entire icon (e.g., so as to indicate that the user can scroll the first row of icons to display other icons that correspond to other users). FIG. 5F, for example, shows device 100-1 partially displaying user-first sharing option 521 (e.g., corresponding to an icon for a user named T. Yorke) at the edge of first region 519*a* in sharing interface 518. Similarly, FIG. 5M, for example, shows device 100-1 partially displaying user-first sharing option 521 (e.g., corresponding to an icon for a user named T. Yorke) at the edge of first region 519*a* in sharing interface 518.

In some embodiments, the icons in the first row of icons have (620) an appearance that is different from the icons in the second row of icons. In some embodiments, the icons in the first row of icons have a shape (e.g., circular or oval) that is different from a shape of the icons in the second row of icons (e.g., square with sharp or rounded corners). Figure 5F, for example, shows device 100-1 displaying oval-shaped user-first sharing options 524 in first region 519*a* and rectangular shaped protocol-first sharing options 521 with rounded corners in second region 519*b*. In some embodiments icons in a third row of icons in a third region of the sharing interface have an appearance that is different from both icons in the first row of icons and the icons in the second row of icons (e.g., the icons in the first and second row of icons include a variety of colors while the icons in the third row of icons are black and white or grayscale icons or icons that include only one color other than black and white). FIG. 5F, for example, shows device 100-1 displaying rectangular shaped application related options 522 with sharp corners in third region 519*c*.

In some embodiments, a first subset of the icons in the first row of icons each include (622) a picture of a user that corresponds to the icon in the first subset of icons, and a second subset of the icons in the first row of icons each include initials of a name of a user that corresponds to the icon in the second subset of icons (e.g., for users for which a profile photo is not available, an automatically generated monogram of the user is generated for use in place of the profile photo). FIG. 5F, for example, shows device 100-1 displaying user-first sharing options 524*a*, 542*c*, 524*d* including initials (or a monogram) of the name of a user and user-first sharing options 524*b* and 524*e* including a picture (or portrait) of the user in first region 519*a* of sharing interface 518.

In some embodiments, the sharing interface includes (624) a third predefined region separate from the first predefined region and the second predefined region for displaying application-related options for performing non-sharing operations that are available in the application from which the sharing interface was opened (e.g., options for performing non-sharing operations such as printing, bookmarking, adding to a reading list, and adding to a contact). FIG. 5E, for example, shows device 100-1 displaying application related options 522 in third region 519*c* of sharing interface 518. In FIG. 5E, for example, third region 519*c* includes application related options 522 associated with the photos application selected in FIG. 5A. In FIG. 5E, the application related options 522 include "edit" icon 522*a*, "crop" icon 522*b*, "copy" icon 522*c*, and "make background" icon 522*d*. In FIG. 5L, for example, third region 519*c* includes application related options 522 associated with the notes application selected in FIG. 5J. In FIG. 5L, the application related options 522 include "add to checklist" icon 522*e*, "print" icon 522*f*, "copy" icon 522*c*, and "add link on home screen" icon 522*g*.

In some embodiments, the sharing interface for a different application (other than the first application) includes the same user-first sharing options displayed in the first predefined region, the same protocol-first sharing options displayed in the second predefined region, and different application-related options displayed in the third predefined region. For example, sharing interface 518 associated with a photos application in FIG. 5E and sharing interface 518 associated with a notes application in FIG. 5L include the same user-first sharing options 524 in first region 519*a* and the same protocol-first sharing options 521 in second region 519*b*. However, FIGS. 5E and 5L, for example, include different application related options 522 in third region 519*c*.

In some embodiments, the sharing user interface is (626) a standardized user interface that includes common portions (e.g., the first predefined region, the second predefined region and/or the third predefined region) that are displayed in a plurality of different applications (e.g., a document creation application, a photo application, a video application, a music application, a contact application) in response to a request from a user to share content from a respective application (e.g., the application from which the sharing operation was initiated) in the plurality of different applications. For example, sharing interface 518 associated with a photos application in FIG. 5E and sharing interface 518 associated with a notes application in FIG. 5L include the same user-first sharing options 524 in first region 519*a* and the same protocol-first sharing options 521 in second region 519*b*.

While displaying the sharing interface, the device detects (628) selection of an affordance in the sharing interface. FIG. 5G, for example, shows device 100-1 detecting selection of user-first sharing option 524*c* within first region 519*a* of sharing interface 518 with contact 525 on touch screen 112. FIG. 5M, for example, shows device 100-1 detecting selection of protocol-first sharing option 521*b* within second region 519*b* of sharing interface 518 with contact 536 on touch screen 112.

In accordance with a determination that the selected affordance is a respective user-first sharing option for a respective user, the device initiates (630) a process for sharing the first content with the respective user. FIG. 5H, for example, shows device 100-1 initiating a process for sharing content selected in FIG. 5C by prompting the user to select a sharing protocol in response to detecting selection of user-first sharing option 524*c* in FIG. 5G.

In some embodiments, when the selected affordance is the user-first sharing option for the respective user, the process for sharing the first content with the respective user includes (632): after the respective user has been selected as a recipient, providing (634) options for selecting a set of one or more protocols with which to share the first content with the respective user (e.g., provide the user with the option to select whether to share the first content via email, direct transfer, and/or cloud storage, etc.); and after receiving a selection of the set of one or more protocols to share the first content with, sharing (636) the first content with the respective users using the set of one or more protocols. In some embodiments, the device provides the option for selecting the set of one or more protocols with which to share the first content with the respective user in response to detecting selection of the respective user as a recipient of the first content. In some embodiments, the device shares the first content is with the respective users using the set of one or more protocols in response to receiving the selection of the set of one or more protocols to share the first content with. FIG. 5H, for example, shows device 100-1 displaying protocol selection interface 526 including one or more protocols 527 for sharing photos 513a and 513b (selected as the content to be shared in FIG. 5C) with C. Cheung (selected as the recipient in FIG. 5G). FIG. 5J, for example, shows device 100-1 displaying sharing confirmation dialog 529 indicating that photos 513a and 513b are being emailed to C. Cheung in response to selection of "email" affordance 527a in FIG. 5H.

In some embodiments, when the selected affordance is the user-first sharing option for the respective user, the process for sharing the first content with the respective user includes, in response to detecting selection of the affordance, starting (638) to share the first content with the respective user using a predefined protocol (e.g., a direct file sharing protocol). For example, in response to selection of user-first sharing option 524c in FIG. 5G, device 100-1 starts to share photographs 513a and 513b (selected as the content to be shared in FIG. 5C) with C. Cheung (selected as the recipient in FIG. 5G).

In accordance with a determination that the selected affordance is a protocol-first sharing option for a respective protocol, the device initiates (640) a process for sharing the first content using the respective protocol. FIG. 5N, for example, shows device 100-1 initiating a process for sharing content selected for sharing in FIG. 5K by prompting the user to select one or more recipients in response to detecting selection of protocol-first sharing option 521b in FIG. 5M. Alternatively, in accordance with a determination that the selected affordance is a protocol-first sharing option for a respective protocol), the device opens the corresponding application so that the content can be shared via the corresponding application (e.g., as an attachment to an email) after the user selects addressees in the corresponding application.

In some embodiments, when the selected affordance is the protocol-first sharing option for the respective protocol, the process for sharing the first content using the respective protocol includes (642): after the respective protocol has been selected, providing (644) options for selecting a set of one or more users to share the first content with using the respective protocol (e.g., provide the user with the option to select recipients of an email from an address book or to restrict access to a social network post to a predetermined group of friends); and after receiving a selection of the set of one or more users to share the first content with, sharing (646) the first content with the set of users using the respective protocol.

FIG. 5N, for example, shows device 100-1 displaying recipient selection interface 537 including one or more nearby users (or recipients) that are available to share the "Things to do" note (selected as the content to be shared in FIG. 5K) with via email (selected as the sharing protocol in FIG. 5M). FIG. 5P, for example, shows device 100-1 displaying sharing confirmation dialog 542 indicating that the "Things to do" note is being emailed to C. Cheung in response to selection of user C. Cheung in FIG. 5O.

In some embodiments, when the user-first sharing option for the respective user is selected, the device starts (648) to transfer the first content directly to the respective user over a device-to-device WiFi network; while transferring the first content to the respective user, the device detects a termination of the device-to-device WiFi network (e.g., because the users are too far apart and/or one of the device was turned off or otherwise ceased to be connected to the device-to-device WiFi network), and the device stores respective information enabling the transfer of the first content to be resumed later; and the device resumes transfer of the first content over a different network (e.g., a long-distance network such as the Internet) to the respective user using the respective information. In some embodiments, resuming transfer of the first content over the different network includes resending all of the first content over the different network. In some embodiments, resuming transfer of the first content over the different network includes receiving one or more portions of the first content that were not successfully received over the device-to-device WiFi network that can be combined with one or more portions of the first content that were successfully received over the device-to-device WiFi network to reconstitute the first content (e.g., resuming transfer of the first content includes starting the transfer over the different network at a point in the download that was reached while transferring the first content over the device-to-device WiFi network).

In some embodiments, the device shares (650) the respective content from the first application in accordance with the affordance selected in the sharing interface. FIG. 5I, for example, shows device 100-1 sharing the content (e.g., photographs 513a and 513b selected by the user of device 100-1 in FIG. 5C) with the recipient (e.g., user-first sharing option 524c associated with C. Cheung selected by the user of device 100-1 in FIG. 5G) via email (e.g., the sharing protocol selected by the user of device 100-1 in FIG. 5H). In some embodiments, a first communication mode is used to identify users with whom content can be shared directly (e.g., the users listed as user-first sharing options in the first predefined region), and a second communication mode, distinct from the first communication mode, is used to transfer the first content to a selected recipient. In some embodiments, communications that are exchanged via the first communication mode are used to set up communications using the second communication mode (e.g., a Bluetooth connection is established and WiFi configuration parameters are exchanged via the Bluetooth connection to enable the sender and recipient of shared content to establish a device to device WiFi network and transfer the shared content over the device-to-device WiFi network).

In some embodiments, after sharing the respective content from the first application, the device opens (652) a second application that is different from the first application. FIG. 5K, for example, shows device 100-1 displaying a notes application in response to contact 531 in FIG. 5J subsequent to initiating sharing the selected content in FIG. 5I.

In some embodiments, while displaying a user interface for the second application on the display, the device detects (654) a second input that corresponds to a request to share second content (e.g., pictures, documents, uniform resource locators (URLs), videos or other content) from the second application. FIG. 5K, shows, device 100-1 detecting selection of "share" affordance 533 to share the note currently displayed in user interface 400.

In some embodiments, in response to detecting the input, the device displays (656) a sharing interface that includes a plurality of sharing options for sharing the second content, where the sharing interface includes: the first predefined region for displaying one or more user-first sharing options for sharing content directly with other users; and the second predefined region separate from the first predefined region for displaying protocol-first sharing options for sharing content using a user-selected protocol of a plurality of protocols. In some embodiments, the sharing interface also includes the third predefined region separate from the first predefined region and the second predefined region for displaying application-related options for performing non-sharing operations that are available in the application from which the sharing interface was opened. FIG. 5L, for example, shows device 100-1 displaying sharing interface 518 in response to detecting selection of "share" affordance 533 in FIG. 5K. In FIG. 5L, sharing interface 518 includes a first region 519a with one or more user first sharing options 524 corresponding to discoverable (or available) users, a second region 519b with one or more protocol-first sharing options 521 corresponding to applications with which to share the selected content, and a third region 519c with one or more application related options 522 associated with the notes application selected in FIG. 5J.

In some embodiments, while displaying the sharing interface, the device detects (658) selection of an affordance in the sharing interface. FIG. 5G, for example, shows device 100-1 detecting selection of user-first sharing option 524c within first region 519a of sharing interface 518 associated with the photos application with contact 525 on touch screen 112. FIG. 5M, for example, shows device 100-1 detecting selection of protocol-first sharing option 521b within second region 519b of sharing interface 518 associated with the notes application with contact 536 on touch screen 112.

In some embodiments, in accordance with a determination that the affordance is a user-first sharing option for the respective user, the device initiates (660) a process for sharing the second content with the respective user. FIG. 5H, for example, shows device 100-1 initiating a process for sharing content selected in FIG. 5C by prompting the user to select a sharing protocol in response to detecting selection of user-first sharing option 524c in FIG. 5G.

In some embodiments, in accordance with a determination that the affordance is a protocol-first sharing option for the respective protocol, the device initiates (662) a process for sharing the second content using the respective protocol. Thus, in some embodiments, the same sharing user interface is displayed in multiple different applications (e.g., the first application and the second application).

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6E. For example, the contacts, gestures, user interface objects described above with reference to method 600 optionally have one or more of the characteristics of the contacts, gestures, user interface objects-herein with reference to other methods described herein (e.g., method 700). For brevity, these details are not repeated here.

FIGS. 7A-7C are flow diagrams illustrating a method 700 of receiving shared content from a respective application in accordance with some embodiments. Method 700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. In some embodiments, method 700 is performed at portable multifunction device 100-2 (sometimes also herein called "device 100-2") associated with a user named C. Cheung. Some operations in method 700 are, optionally, combined and/or the order of some operations is, optionally, changed.

As described below, method 700 provides an intuitive way to receive shared content from a respective application. The method reduces the cognitive burden on a user when receiving shared content from a respective application, thereby creating a more efficient human-machine interface. For battery-operated electronic devices, enabling a user to receive shared content from a respective application faster and more efficiently conserves power and increases the time between battery charges.

In some embodiments, prior to receiving a sharing request, the device advertises (702) the availability of the device to receive sharing requests from nearby devices. In some embodiments, nearby devices are other devices that are within Bluetooth communication range of device 100-2 and/or other devices that are connected to a same local area network or are in communication with a same network access point (e.g., a same wireless router or wireless access point) as device 100-2. In some embodiments, the availability of device 100-2 to receive sharing requests is advertised to a limited set of devices (e.g., only devices with which the user has explicitly authorized sharing or only with devices that are associated with users who are listed as contacts of the user).

FIG. 5S, for example, shows device 100-2 displaying a settings interface on user interface 475 including sharing status indicator 550 in response to detecting the upward swipe gesture in FIG. 5Q. In FIG. 5S, for example, sharing status indicator 550 indicates that the sharing functionality is currently in a "contacts only" sharing mode. FIG. 5U, for example, shows device 100-2 displaying a settings interface on user interface 475 including sharing status indicator 550 indicating that the sharing functionality is currently in an "everyone" sharing mode in response to detecting selection of "everyone" affordance 554c in FIG. 5T.

While displaying a user interface for a first application on a display of the device, the device receives (704) a sharing request to share respective content with the electronic device that was initiated by another device, where the respective content is not compatible with the first application. FIG. 5V, for example, shows device 100-2 displaying sharing confirmation dialog 557 over home screen 500 on user interface 475 in response to device 100-2 receiving a sharing request. In FIG. 5V, for example, the sharing request is received from Jenny (e.g., the user of device 100-1), and the shared content pertains to two photographs (e.g., the sharing request was initiated by Jenny in FIG. 5D).

In response to receiving the sharing request, the device displays (706) a sharing confirmation dialog that includes a plurality of options for responding to the sharing request. In some embodiments, the sharing confirmation dialog at least partially obscures the user interface for the first application. In some embodiments, while the sharing confirmation dialog is displayed, the user interface for the first application is suspended and is not responsive to user inputs until the sharing confirmation dialog is dismissed. FIG. 5V, for example, shows device 100-2 displaying sharing confirmation dialog 557 over home screen 500. In some embodiments, home screen 500 corresponds to a user interface for an application or an operating system. In FIG. 5V, for example, sharing confirmation dialog 557 includes a plurality of options for responding to the sharing request including "decline" affordance 558a, which, when activated, causes the device to decline the sharing request and "accept" affordance 558b, which, when activated, causes the device to accept the sharing request. In some embodiments, portions of home screen 500 that are visible when sharing confirmation dialog 557 is displayed are blurred, shaded, or otherwise made visually less distinct.

In some embodiments, prior to detecting activation of the respective option for responding to the sharing request, the device receives (708) (e.g., downloads) at least a first portion the respective content. For example, device 100-2 starts to download the content that corresponds to the sharing request before receiving authorization to proceed with the sharing request from the user so that when the user responds, there is less of a delay before the content is available for use on the electronic device that receives the respective content.

In some embodiments, in response to detecting (710) the activation of the respective option and in accordance with a determination that the respective option is an option to accept the sharing request, the device displays (712) a progress indicator that indicates progress toward completion of receiving the respective content that takes into account the first portion of the respective content that has already been received (e.g., downloaded). FIG. 5W, for example, shows device 100-2 displaying download progress dialog 560 on user interface 475 in response to detecting selection of "accept" affordance 558b in FIG. 5V. In FIG. 5W, for example, download progress dialog 560 includes a progress indicator 582 (e.g., a circle) indicating the download progress (e.g., a percentage) of the shared content.

In some embodiments, in response to detecting (710) the activation of the respective option and in accordance with a determination that the respective option is an option to deny the sharing request, the device deletes (714) the first portion of the respective content. For example, in response to detecting selection of "decline" affordance 558a in FIG. 5V, device 100-2 deletes any downloaded portion of the shared content and cancels the sharing request.

The device detects (716) activation of a respective option of the plurality of options for responding to the sharing request. FIG. 5V, for example, shows device 100-2 detecting selection of "accept" affordance 558b included in confirmation dialog 557. In accordance with a determination that the respective option is an option to accept the sharing request, the device identifies (718) one or more applications that are compatible with the respective content, and the device performs a preparatory operation that prepares the device to display the respective content on the display using an application that is compatible with the respective content. For example, in response to detecting selection of "accept" affordance 558b in FIG. 5V, device 100-2 identifies one or more applications compatible with the shared content (e.g., a photos application able to present photographs 513a and 513b shared by Jenny) and performs a preparatory operation that prepares the device to display the respective content on the display using an application that is compatible with the respective content (e.g., receives (or downloads) photographs 513a and 513b for presentation in the photos application).

In some embodiments, in accordance with a determination that the device does not have an application that is compatible with the respective content, the preparatory operation includes (720) displaying a prompt for the user to download or install an application that is compatible with the respective content (e.g., an application that can display, store, and/or edit the respective content). In some embodiments, the respective content is downloaded and stored in a temporary storage location on device 100-2 for storage until the user has installed an application that is compatible with the respective content. In some embodiments, device 100-2 declines the sharing request and the sharing request is renewed once the user has installed the application that is compatible with the respective content.

FIG. 5EE, for example, shows device 100-2 displaying installation prompt dialog 580 on user interface 475 in response to receiving a sharing request. In FIG. 5EE, for example, installation prompt dialog 580 includes text indicating that a user different from the user of device 100-2 (e.g., a user named Jenny associated with device 100-1) is attempting to share an audio file (e.g., a file entitled "Essential_Mix.flac") with the user of device 100-2. In FIG. 5EE, for example, installation prompt dialog 580 also includes text prompting the user of device 100-2 to download or install an application that is compatible with the audio file. In FIG. 5EE, for example, installation prompt dialog 580 further includes a plurality of options for responding to the sharing request including "decline" affordance 581a, which, when activated, causes the device to decline the sharing request and "get app" affordance 581, which, when activated, causes the device to display an application marketplace (or application store) with a plurality of applications that are compatible with the audio file.

In some embodiments, the preparatory operation includes (722) receiving (e.g., downloading) the respective content from the sender (e.g., in response to authorization from the user to start downloading the respective content). FIG. 5V, for example, shows device 100-2 displaying sharing confirmation dialog 557 on user interface 475 in response to receiving a sharing request. FIG. 5W, for example, shows device 100-2 starting to download the shared content and displaying download progress dialog 560 on user interface 475 indicating the download progress (e.g., a percentage) of the shared content in response detecting selection of "accept" affordance 558b in FIG. 5V.

In some embodiments, in accordance with a determination that the device started to receive (e.g., download) the respective content prior to detecting activation of the respective option, the preparatory operation includes (724): continuing to receive (e.g., download) the respective content; and setting a trigger to launch the application when the respective content has been fully received (e.g., when download of the respective content is complete). FIG. 5V, for example, shows device 100-2 displaying sharing confirmation dialog 557 on user interface 475 in response to receiving a sharing request. FIG. 5W, for example, shows device 100-2 continuing to download the shared content and displaying download progress dialog 560 on user interface 475 indicating the download progress (e.g., a percentage) of the shared content in response detecting selection of "accept" affordance 558b in FIG. 5V. For example, device 100-2 also sets a trigger to present the shared content in a compatible application (e.g., the photos application shown in FIG. 5Z) in response to completion of downloading the shared content.

In accordance with a determination that the respective option is an option to deny the sharing request, the device cancels (726) sharing of the respective content with the electronic device, and the device returns to the user interface for the first application. For example, in response to detecting selection of "decline" affordance 558a in FIG. 5V, device 100-2 cancels the sharing request and displays home screen 500 on user interface 475.

In some embodiments, after performing the preparatory operation, the device (730): receives the respective content (e.g., completing downloading of the respective content); and in response to receiving the respective content, the device opens a respective application that is compatible with the respective content and presents the respective content in the respective application (e.g., displaying a photo, loading a web page corresponding to a uniform resource locator, or playing an audio or video file upon completion of downloading the respective content if the user has not dismissed a download-status notification that indicates progress toward completion of receiving the respective content). FIG. 5Z, for example, shows device 100-2 displaying the shared content (e.g., photographs 513a and 513b) in a photo application in response to completion of downloading the shared content (e.g., progress indicator 582 displayed in download progress dialog 560 indicates that the download of the shared content is complete in FIG. 5X).

In some embodiments, after performing the preparatory operation, the device (732): receives the respective content (e.g., completing downloading of the respective content); in response to receiving the respective content, the device displays a notification that, if activated, opens a respective application that is compatible with the respective content; detects activation of the notification (e.g., detecting a tap gesture on the notification); and in response to detecting activation of the notification, the device presents the respective content in the respective application. In some embodiments, if the user dismisses a download-status notification that indicates that sharing of the respective content has started and indicates progress toward completion of receiving the respective content, device 100-2 displays a download-complete notification when downloading of the respective content is complete, and if the user activates the download-complete notification (e.g., by tapping on the download-complete notification), the device opens the respective application and presents the respective content in the respective application. In some embodiments, if the user dismisses the download-status, a download-status user interface that shows a status of downloading the respective content can be accessed by the user by entering a multitasking or notification interface and navigating to a "content shared with me" section of the multitasking or notification interface. FIG. 5DD, for example, shows device 100-2 displaying a notification interface 576 on user interface 475 in response to completion of the download of the shared content. In FIG. 5DD, for example, notification interface 576 includes "cancel" affordance 578a, which, when activated, causes the device to dismiss notification interface 576 and "ok" affordance 578b, which, when activated, causes the device to present (or open) the shared content in a compatible application. FIG. 5Z, for example, shows device 100-2 displaying the shared content (e.g., photographs 513a and 513b) in a photos application in response to detecting selection of "ok" affordance 578b in FIG. 5DD.

In some embodiments, the device includes a plurality of applications that are compatible with the respective content, and after performing the preparatory operation, the device (734): receives the respective content (e.g., completing downloading of the respective content); displays an application-selection user interface that includes affordances for selecting between the plurality of applications that are compatible with the respective content; detects selection of a respective affordance for a respective application of the plurality of applications; and in response to detecting selection of the respective affordance, presents the respective content in the respective application (e.g., displaying the respective content on the display using the respective application). FIG. 5Y, for example, shows device 100-2 displaying application-selection interface 562 on user interface 475 in response to completion of downloading the shared content. In FIG. 5Y, for example, application-selection interface 562 includes affordances 563 for selecting a respective application in which to present (or launch) the shared content from a plurality of applications compatible with the shared content. FIG. 5Z, for example, shows device 100-2 displaying the shared content (e.g., photographs 513a and 513b) in a photos application in response to detecting selection of "photos" affordance 563a in FIG. 5Y.

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7C. For example, the contacts, gestures, user interface objects described above with reference to method 700 optionally have one or more of the characteristics of the contacts, gestures, user interface objects, tactile outputs, intensity thresholds, focus selectors, animations described herein with reference to other methods described herein (e.g., method 600). For brevity, these details are not repeated here.

Figure 8:
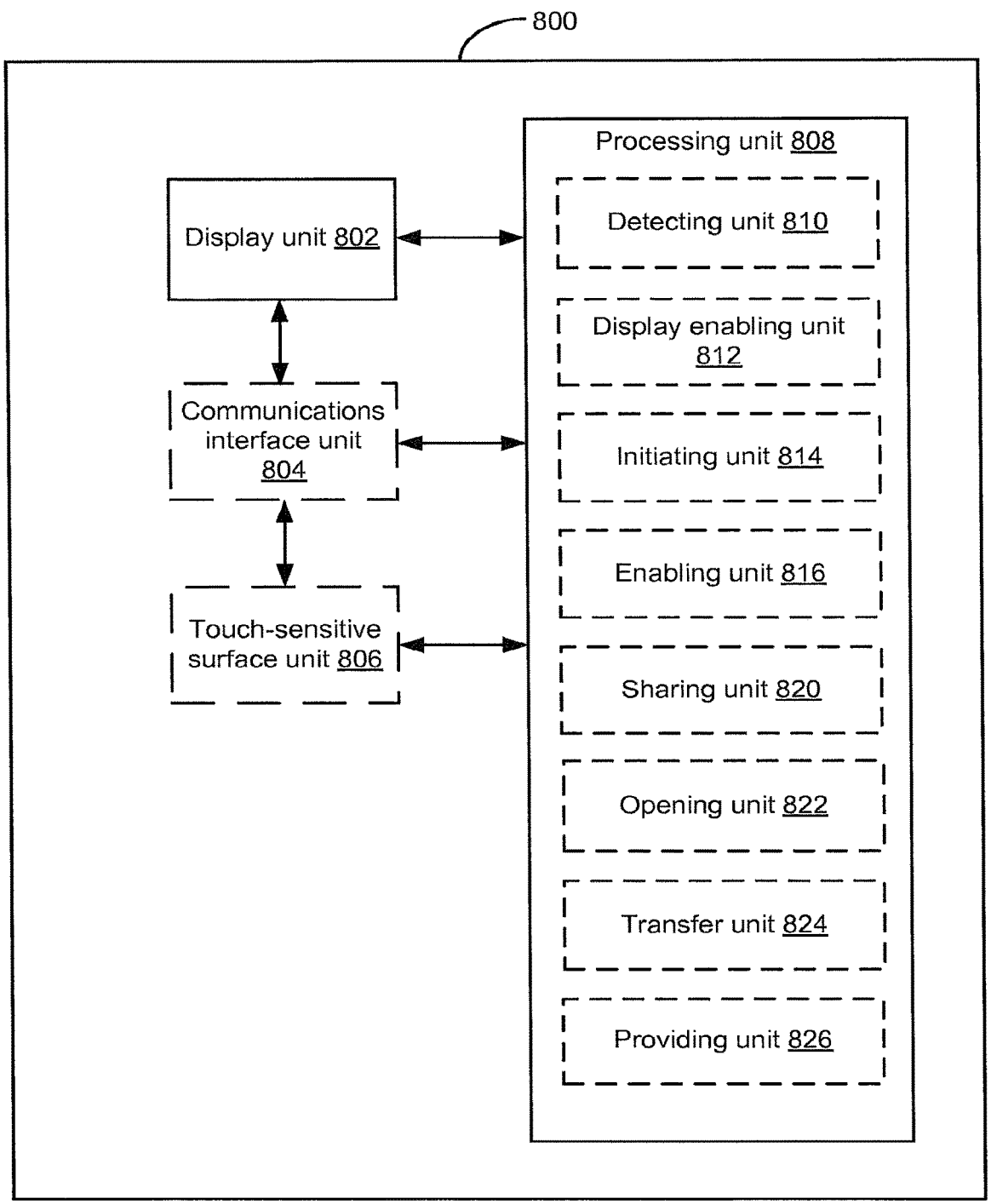
FIG. 8 is a functional block diagram of an electronic device in accordance with some embodiments.

In accordance with some embodiments, FIG. 8 shows a functional block diagram of an electronic device 800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, an electronic device 800 includes a display unit 802, which, when activated, causes the device to display a user interface for a first application. In some embodiments, electronic device 800, optionally, includes a communications interface unit 804 configured to communicate with one or more other electronic devices different from electronic device 800 and a touch-sensitive surface unit 806 configured to receive one or more touch inputs. Electronic device 800 also includes a processing unit 808 coupled to display unit 802 (and, optionally, coupled to communication interface unit 804 and touch-sensitive surface unit 806). In some embodiments, processing unit 808 includes a detecting unit 810, a display enabling unit 812, an initiating unit 814, an enabling unit 816, a sharing unit 820, an opening unit 822, a transfer unit 824, and a providing unit 826.

While displaying the first application on display unit 802, processing unit 808 is configured to detect (e.g., with detecting unit 810) a first input that corresponds to a request to share first content from the first application. In response to detecting the first input, processing unit 808 is configured to enable display of (e.g., with display enabling unit 812) a sharing interface that includes a plurality of options for sharing the first content, where the sharing interface includes: a first predefined region for displaying one or more user-first sharing options for sharing content directly with other users; and a second predefined region separate from the first predefined region for displaying protocol-first sharing options for sharing content using a user-selected protocol of a plurality of protocols. While displaying the sharing interface, processing unit 808 is configured to detect (e.g., with detecting unit 810) selection of an affordance in the sharing interface. In accordance with a determination that the affordance is a respective user-first sharing option for a respective user, processing unit 808 is configured to initiate (e.g., with initiating unit 814) a process for sharing the first content with the respective user. In accordance with a determination that the affordance is a protocol-first sharing option for a respective protocol, processing unit 808 is configured to initiate (e.g., with initiating unit 814) a process for sharing the first content using the respective protocol.

In some embodiments, prior to detecting the first input that corresponds to the request to share the first content, electronic device 800 is not enabled to share the first content directly with other users. Prior to detecting selection of the affordance in the sharing interface, processing unit 808 is configured to enable display of (e.g., with display enabling unit 812) a sharing-enable affordance for enabling electronic device 800 to share the first content directly with other users. Processing unit 808 is also configured to: detect (e.g., with detecting unit 810) activation of the sharing-enable affordance; and in response to detecting activation of the sharing-enable affordance, enable (e.g., with enabling unit 816) electronic device 800 to share the first content directly with other users and enable display of (e.g., with display enabling unit 812) a plurality of user-first sharing options including the respective user-first sharing option for the respective user.

In some embodiments, the sharing interface includes a third predefined region separate from the first predefined region and the second predefined region for displaying application-related options for performing non-sharing operations that are available in the application from which the sharing interface was opened.

In some embodiments, processing unit 808 is configured to: share (e.g., with sharing unit 820) the respective content from the first application in accordance with the affordance selected in the sharing interface; and after sharing the respective content from the first application, open (e.g., with opening unit 822) a second application that is different from the first application. While displaying a user interface for the second application on the display unit, processing unit 808 is configured to detect (e.g., with detecting unit 810) a second input that corresponds to a request to share second content from the second application. In response to detecting the input, processing unit 808 is configured to enable display of (e.g., with display enabling unit 812) a sharing interface that includes a plurality of sharing options for sharing the second content, where the sharing interface includes: the first predefined region for displaying one or more user-first sharing options for sharing content directly with other users; and the second predefined region separate from the first predefined region for displaying protocol-first sharing options for sharing content using a user-selected protocol of a plurality of protocols. While displaying the sharing interface, processing unit 808 is configured to detect (e.g., with detecting unit 810) selection of an affordance in the sharing interface. In accordance with a determination that the affordance is a user-first sharing option for the respective user, processing unit 808 is configured to initiate (e.g., with initiating unit 814) a process for sharing the second content with the respective user. In accordance with a determination that the affordance is a protocol-first sharing option for the respective protocol, processing unit 808 is configured to initiate (e.g., with initiating unit 814) a process for sharing the second content using the respective protocol.

In some embodiments, the sharing user interface is a standardized user interface that includes common portions that are displayed in a plurality of different applications in response to a request from a user to share content from a respective application in the plurality of different applications.

In some embodiments, the first predefined region includes a first row of icons that represent different users with whom content can be shared directly, and the second predefined region includes a second row of icons that represent different protocols that can be used to share the content.

In some embodiments, processing unit 808 is configured to enable display of (e.g., with display enabling unit 812), in the first predefined region at an edge of the first predefined region, a portion of an icon that represents a respective user without displaying the entire icon.

In some embodiments, the icons in the first row of icons have an appearance that is different from the icons in the second row of icons.

In some embodiments, a first subset of the icons in the first row of icons each include a picture of a user that corresponds to the icon in the first subset of icons, and a second subset of the icons in the first row of icons each include initials of a name of a user that corresponds to the icon in the second subset of icons.

In some embodiments, the user-first sharing options are ordered based on user sharing preferences.

In some embodiments, a first communication mode is used to identify users with whom content can be shared directly, and a second communication mode, distinct from the first communication mode, is used to transfer the first content to a selected recipient.

In some embodiments, processing unit 808 is configured to: when the first user-first sharing option for the respective user is selected, start to transfer (e.g., with transfer unit 824) the first content directly to the respective user over a device-to-device WiFi network; while transferring the first content to the respective user, detect (e.g., with transfer unit 824) a termination of the device-to-device WiFi network, and store respective information enabling the transfer of the first content to be resumed later; and resume transfer of (e.g., with transfer unit 824) the first content over a different network to the respective user using the respective information.

In some embodiments, when the selected affordance is the protocol-first sharing option for the respective protocol, the process for sharing the first content using the respective protocol includes: after the respective protocol has been selected, providing (e.g., with providing unit 826) options for selecting a set of one or more users to share the first content with using the respective protocol; and after receiving a selection of the set of one or more users to share the first content with, sharing (e.g., with sharing unit 820) the first content with the set of users using the respective protocol.

In some embodiments, when the selected affordance is the user-first sharing option for the respective user, the process for sharing the first content with the respective user includes: after the respective user has been selected as a recipient, providing (e.g., with providing unit 826) options for selecting a set of one or more protocols with which to share the first content with the respective user; and after receiving a selection of the set of one or more protocols to share the first content with, sharing (e.g., with sharing unit 820) the first content with the respective users using the set of one or more protocols.

In some embodiments, when the selected affordance is the user-first sharing option for the respective user, the process for sharing the first content with the respective user includes, in response to detecting selection of the affordance, starting to share (e.g., with sharing unit 820) the first content with the respective user using a predefined protocol.

Figure 9:
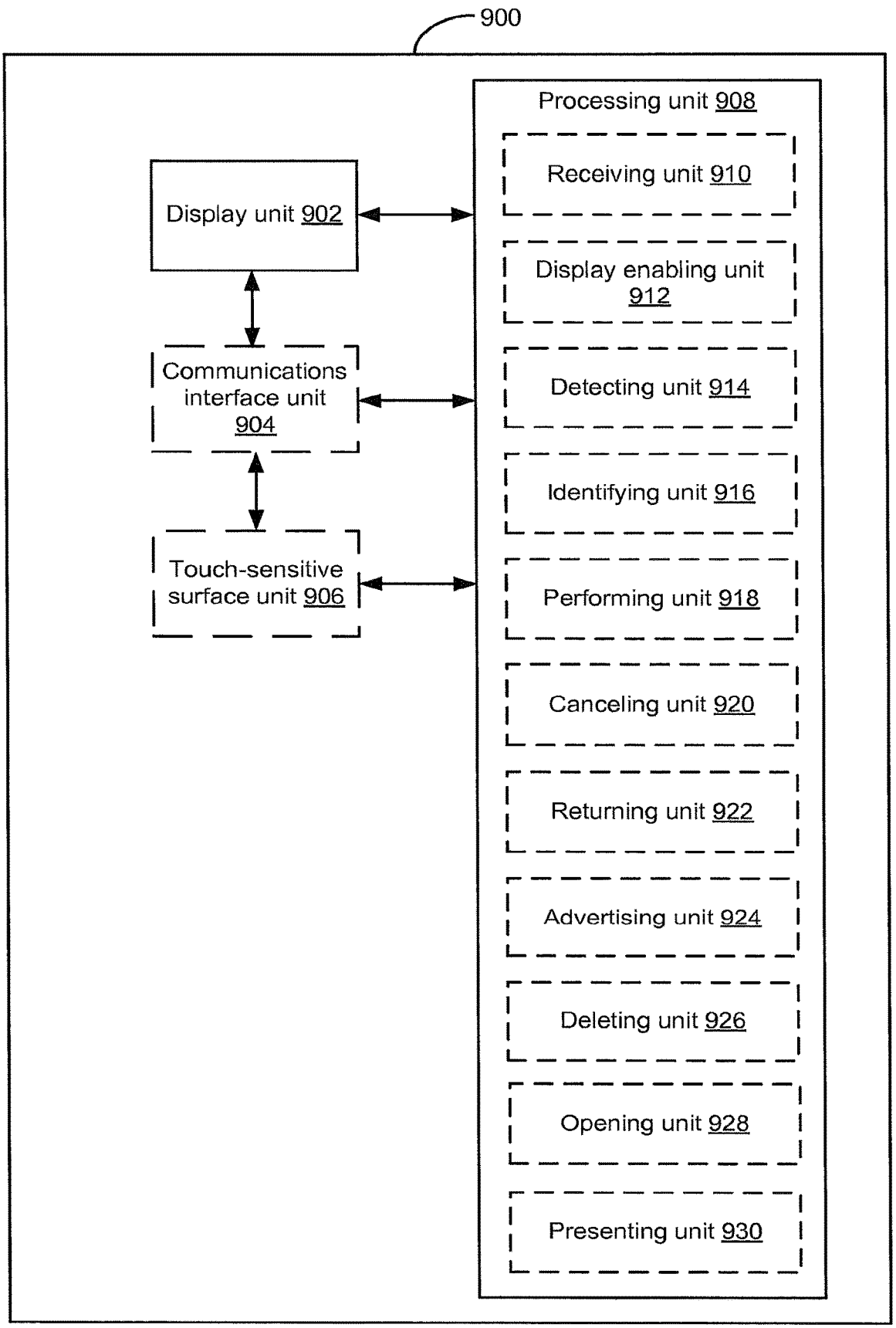
FIG. 9 is a functional block diagram of an electronic device in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a display unit 902, which, when activated, causes the device to display a user interface for a first application. In some embodiments, electronic device 900, optionally, includes a communications interface unit 904 configured to communicate with one or more other electronic devices different from electronic device 900 and a touch-sensitive surface unit 906 configured to receive one or more touch inputs. Electronic device 900 also includes a processing unit 908 coupled to display unit 902 (and, optionally, coupled to communication interface unit 904 and touch-sensitive surface unit 906). In some embodiments, processing unit 908 includes a receiving unit 910, a display enabling unit 912, a detecting unit 914, an identifying unit 916, a performing unit 918, a canceling unit 920, a returning unit 922, an advertising unit 924, a deleting unit 926, an opening unit 928, and a presenting unit 930.

While displaying the user interface for the first application on display unit 902, processing unit 908 is configured to receive (e.g., with receiving unit 910) a sharing request to share respective content with electronic device 900 that was initiated by another device, where the respective content is not compatible with the first application. In response to receiving the sharing request, processing unit 908 is configured to: enable display of (e.g., with display enabling unit 912) a sharing confirmation dialog that includes a plurality of options for responding to the sharing request; and detect (e.g., with detecting unit 914) activation of a respective option of the plurality of options for responding to the sharing request. In accordance with a determination that the respective option is an option to accept the sharing request, processing unit 908 is configured to identify (e.g., with identifying unit 916) one or more applications that are compatible with the respective content and perform (e.g., with performing unit 918) a preparatory operation that prepares electronic device 900 to display the respective content on the display using an application that is compatible with the respective content. In accordance with a determination that the respective option is an option to deny the sharing request, processing unit 908 is configured to cancel sharing of (e.g., with canceling unit 920) the respective content with electronic device 900 and return to (e.g., with returning unit 922) the user interface for the first application.

In some embodiments, prior to receiving the sharing request, processing unit 908 is configured to advertise (e.g., with advertising unit 924) the availability of electronic device 900 to receive sharing requests from nearby devices.

In some embodiments, prior to detecting activation of the respective option for responding to the sharing request, processing unit 908 is configured to receive (e.g., with receiving unit 910) at least a first portion the respective content.

In some embodiments, in response to detecting the activation of the respective option, processing unit 908 is configured to: in accordance with a determination that the respective option is an option to accept the sharing request, enable display of (e.g., with display enabling unit 912) a progress indicator that indicates progress toward completion of receiving the respective content that takes into account the first portion of the respective content that has already been received; and in accordance with a determination that the respective option is an option to deny the sharing request, delete (e.g., with deleting unit 926) the first portion of the respective content.

In some embodiments, in accordance with a determination that electronic device 900 does not have an application that is compatible with the respective content, the preparatory operation includes displaying a prompt for the user to download or install an application that is compatible with the respective content.

In some embodiments, the preparatory operation includes receiving the respective content from the sender.

In some embodiments, in accordance with a determination that electronic device 900 started to receive the respective content prior to detecting activation of the respective option, the preparatory operation includes: continuing to receive the respective content; and setting a trigger to launch the application when the respective content has been fully received.

In some embodiments, after performing the preparatory operation, processing unit 908 is configured to: receive (e.g., with receiving unit 910) the respective content; and in response to receiving the respective content, open (e.g., with opening unit 928) a respective application that is compatible with the respective content and presenting the respective content in the respective application.

In some embodiments, electronic device 900 includes a plurality of applications that are compatible with the respective content. After performing the preparatory operation, processing unit 908 is configured to: receive (e.g., with receiving unit 910) the respective content; and enable display of (e.g., with display enabling unit 912) an application-selection user interface that includes affordances for selecting between the plurality of applications that are compatible with the respective content. Processing unit 908 is also configured to: detect (e.g., with detecting unit 914) selection of a respective affordance for a respective application of the plurality of applications; and in response to detecting selection of the respective affordance, present (e.g., with presenting unit 930) the respective content in the respective application.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6E and 7A-7C are, optionally, implemented by components depicted in FIGS. 1A-1B or FIGS. 8-9. For example, detecting operations 610 and 632, displaying operation 612, initiating operations 634 and 644, receiving operation 704, detecting operation 716, identifying and performing operation 718, and canceling and returning operation 726 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device with a display and one or more input devices:
displaying, on the display, an application user interface for a first application that includes a sharing affordance that is associated with sharing respective content from the first application;
while displaying the application user interface for the first application on the display, detecting, via the one or more input devices, a first input that corresponds to selection of the sharing affordance;
in response to detecting the first input, displaying, on the display, a sharing interface that includes:
a first predefined region including one or more user affordances corresponding to one or more users that satisfy proximity criteria to the electronic device; and
a second predefined region separate from the first predefined region, the second predefined region including a plurality of protocol affordances corresponding to a plurality of other applications on the electronic device that are distinct from the first application, wherein the plurality of other applications are available for sharing the respective content from the first application;
wherein the sharing interface further includes a third predefined region separate from the first predefined region and the second predefined region, the third predefined region including a plurality of functionality affordances distinct from the plurality of protocol affordances, the plurality of functionality affordances corresponding to a plurality of functionalities available to be performed on the respective content from the first application.

2. The method of claim 1, wherein the sharing interface is displayed over at least a portion of the application user interface for the first application.

3. The method of claim 1, wherein the plurality of functionality affordances displayed in the third predefined region are selected based on a type of the respective content from the first application for sharing.

4. The method of claim 1, wherein the sharing interface is available for displaying in response to detecting requests for sharing content from different applications respectively.

5. The method of claim 1, wherein the sharing interface further includes a cancel affordance, and the method further comprises:
while displaying the sharing interface on the display, detecting, via the one or more input devices, a second input that corresponds to selection of the cancel affordance; and
in response to detecting the second input:
causing the electronic device to dismiss the sharing interface; and
redisplaying the application user interface for the first application.

6. The method of claim 1, wherein the proximity criteria include one or more wireless communication ranges for respective wireless communication protocols used between the electronic device and one or more other devices associated with the one or more users respectively.

7. The method of claim 6, wherein the wireless communication protocols include one or more selected from the group consisting of Bluetooth, Wireless Fidelity (Wi-Fi), and near field communication (NFC).

8. The method of claim 1, including:
while displaying the sharing interface, detecting selection of an affordance in the sharing interface; and
in accordance with a determination that the affordance is a respective user affordance for a respective user, initiating a process for directly sharing the respective content with the respective user.

9. The method of claim 1, further comprising:
while displaying the sharing interface, detecting selection of an affordance in the sharing interface;
in accordance with a determination that the affordance is a respective protocol affordance for a respective application distinct from the first application, initiating a process for sharing the respective content using the respective application, wherein the process for sharing the respective content using the respective application includes:
after the respective protocol affordance has been selected, providing options for selecting a set of one or more users to share the respective content with using the respective application; and
after receiving a selection of the set of one or more users to share the respective content with, sharing the respective content with the set of one or more users using the respective application.

10. A non-transitory computer readable storage medium storing one or more programs, the one or more programs comprising instructions, which when executed by an electronic device with a display and one or more input devices, cause the electronic device to:

display, on the display, an application user interface for a first application that includes a sharing affordance that is associated with sharing respective content from the first application;

while displaying the application user interface for the first application on the display, detect, via the one or more input devices, a first input that corresponds to selection of the sharing affordance;

in response to detecting the first input, display, on the display, a sharing interface that includes:

a first predefined region including one or more user affordances corresponding to one or more users that satisfy proximity criteria to the electronic device; and a second predefined region separate from the first predefined region, the second predefined region including a plurality of protocol affordances corresponding to a plurality of other applications on the electronic device that are distinct from the first application, wherein the plurality of other applications are available for sharing the respective content from the first application;

wherein the sharing interface further includes a third predefined region separate from the first predefined region and the second predefined region, the third predefined region including a plurality of functionality affordances distinct from the plurality of protocol affordances, the plurality of functionality affordances corresponding to a plurality of functionalities available to be performed on the respective content from the first application.

11. The non-transitory computer readable storage medium of claim 10, wherein the sharing interface is displayed over at least a portion of the application user interface for the first application.

12. The non-transitory computer readable storage medium of claim 10, wherein the plurality of functionality affordances displayed in the third predefined region are selected based on a type of the respective content from the first application for sharing.

13. The non-transitory computer readable storage medium of claim 10, wherein the sharing interface is available for displaying in response to detecting requests for sharing content from different applications respectively.

14. An electronic device, comprising:
a display;
one or more input devices;
one or more processors;
memory; and
one or more programs, wherein the one or more programs are stored in the memory and configured to be executed by the one or more processors, the one or more programs including instructions for:
displaying, on the display, an application user interface for a first application that includes a sharing affordance that is associated with sharing respective content from the first application;
while displaying the application user interface for the first application on the display, detecting, via the one or more input devices, a first input that corresponds to selection of the sharing affordance;
in response to detecting the first input, displaying, on the display, a sharing interface that includes:
a first predefined region including one or more user affordances corresponding to one or more users that satisfy proximity criteria to the electronic device; and a second predefined region separate from the first predefined region, the second predefined region including a plurality of protocol affordances corresponding to a plurality of other applications on the electronic device that are distinct from the first application, wherein the plurality of other applications are available for sharing the respective content from the first application;

wherein the sharing interface further includes a third predefined region separate from the first predefined region and the second predefined region, the third predefined region including a plurality of functionality affordances distinct from the plurality of protocol affordances, the plurality of functionality affordances corresponding to a plurality of functionalities available to be performed on the respective content from the first application.

15. The electronic device of claim 5, wherein the sharing interface is displayed over at least a portion of the application user interface for the first application.

16. The electronic device of claim 14, wherein the plurality of functionality affordances displayed in the third predefined region are selected based on a type of the respective content from the first application for sharing.

17. The electronic device of claim 5, wherein the sharing interface is available for displaying in response to detecting requests for sharing content from different applications respectively.

18. The method of claim 1, wherein the first predefined region, concurrently displayed with the second predefined region, is a region for displaying user affordances and includes only user affordances corresponding to the one or more users that satisfy proximity criteria to the electronic device.

19. The method of claim 1, wherein the plurality of functionality affordances displayed in the third predefined region correspond to functionalities associated with the first application.

20. The non-transitory computer readable storage medium of claim 10, wherein the sharing interface further includes a cancel affordance, and the one or more programs include instructions, which when executed by the electronic device, cause the electronic device to:
while displaying the sharing interface on the display, detect, via the one or more input devices, a second input that corresponds to selection of the cancel affordance; and
in response to detecting the second input:
cause the electronic device to dismiss the sharing interface; and
redisplay the application user interface for the first application.

21. The non-transitory computer readable storage medium of claim 10, wherein the proximity criteria include one or more wireless communication ranges for respective wireless communication protocols used between the electronic device and one or more other devices associated with the one or more users respectively.

22. The non-transitory computer readable storage medium of claim 21, wherein the wireless communication protocols include one or more selected from the group consisting of Bluetooth, Wireless Fidelity (Wi-Fi), and near field communication (NFC).

23. The non-transitory computer readable storage medium of claim 10, wherein the one or more programs include instructions, which when executed by the electronic device, cause the electronic device to:

while displaying the sharing interface, detect selection of an affordance in the sharing interface; and in accordance with a determination that the affordance is a respective user affordance for a respective user, initiate a process for directly sharing the respective content with the respective user.

24. The non-transitory computer readable storage medium of claim 10, wherein the one or more programs include instructions, which when executed by the electronic device, cause the electronic device to:

while displaying the sharing interface, detect selection of an affordance in the sharing interface;

in accordance with a determination that the affordance is a respective protocol affordance for a respective application distinct from the first application, initiate a process for sharing the respective content using the respective application, wherein the process for sharing the respective content using the respective application includes:

after the respective protocol affordance has been selected, providing options for selecting a set of one or more users to share the respective content with using the respective application; and after receiving a selection of the set of one or more users to share the respective content with, sharing the respective content with the set of one or more users using the respective application.

25. The non-transitory computer readable storage medium of claim 10, wherein the first predefined region, concurrently displayed with the second predefined region, is a region for displaying user affordances and includes only user affordances corresponding to the one or more users that satisfy proximity criteria to the electronic device.

26. The non-transitory computer readable storage medium of claim 10, wherein the plurality of functionality affordances displayed in the third predefined region correspond to functionalities associated with the first application.

27. The electronic device of claim 14, wherein the sharing interface further includes a cancel affordance, and the one or more programs include instructions for:

while displaying the sharing interface on the display, detecting, via the one or more input devices, a second input that corresponds to selection of the cancel affordance; and in response to detecting the second input:
causing the electronic device to dismiss the sharing interface; and
redisplaying the application user interface for the first application.

28. The electronic device of claim 14, wherein the proximity criteria include one or more wireless communication ranges for respective wireless communication protocols used between the electronic device and one or more other devices associated with the one or more users respectively.

29. The electronic device of claim 28, wherein the wireless communication protocols include one or more selected from the group consisting of Bluetooth, Wireless Fidelity (Wi-Fi), and near field communication (NFC).

30. The electronic device of claim 14, wherein the one or more programs include instructions for:

while displaying the sharing interface, detecting selection of an affordance in the sharing interface; and in accordance with a determination that the affordance is a respective user affordance for a respective user, initiating a process for directly sharing the respective content with the respective user.

31. The electronic device of claim 14, wherein the one or more programs include instructions for:

while displaying the sharing interface, detecting selection of an affordance in the sharing interface;

in accordance with a determination that the affordance is a respective protocol affordance for a respective application distinct from the first application, initiating a process for sharing the respective content using the respective application, wherein the process for sharing the respective content using the respective application includes:

after the respective protocol affordance has been selected, providing options for selecting a set of one or more users to share the respective content with using the respective application; and after receiving a selection of the set of one or more users to share the respective content with, sharing the respective content with the set of one or more users using the respective application.

32. The electronic device of claim 14, wherein the first predefined region, concurrently displayed with the second predefined region, is a region for displaying user affordances and includes only user affordances corresponding to the one or more users that satisfy proximity criteria to the electronic device.

33. The electronic device of claim 14, wherein the plurality of functionality affordances displayed in the third predefined region correspond to functionalities associated with the first application.

\* \* \* \* \*

UNITED STATES PATENT AND TRADEMARK OFFICE
CERTIFICATE OF CORRECTION

| | | |
|---|---|---|
| PATENT NO. | : 11,409,414 B2 | Page 1 of 1 |
| APPLICATION NO. | : 16/181205 | |
| DATED | : August 9, 2022 | |
| INVENTOR(S) | : Shaw et al. | |

It is certified that error appears in the above-identified patent and that said Letters Patent is hereby corrected as shown below:

In the Claims

Claim 15, Column 56, Line 18, please delete "claim 5," and insert --claim 14,--;

Claim 17, Column 56, Line 25, please delete "claim 5," and insert --claim 14,--.

Signed and Sealed this
Twenty-fifth Day of October, 2022

*Katherine Kelly Vidal*

Katherine Kelly Vidal
*Director of the United States Patent and Trademark Office*